US006728660B2

(12) United States Patent
Bjornson

(10) Patent No.: US 6,728,660 B2
(45) Date of Patent: Apr. 27, 2004

(54) APPARATUS AND METHOD FOR MONITORING AND MAINTAINING PLANT EQUIPMENT

(75) Inventor: Carl C. Bjornson, Tiverton, RI (US)

(73) Assignee: Northeast Equipment, Inc., Fall River, MA (US)

( * ) Notice: Subject to any disclaimer, the term of this patent is extended or adjusted under 35 U.S.C. 154(b) by 0 days.

(21) Appl. No.: 10/205,938

(22) Filed: Jul. 26, 2002

(65) Prior Publication Data

US 2003/0004656 A1 Jan. 2, 2003

Related U.S. Application Data

(63) Continuation of application No. 09/255,511, filed on Feb. 22, 1999.

(51) Int. Cl.[7] .......................... G06F 11/30; G06F 15/00

(52) U.S. Cl. ...................................................... 702/185

(58) Field of Search ................................ 702/185, 184, 702/183, 35; 700/110; 714/25, 26, 46

(56) References Cited

U.S. PATENT DOCUMENTS 5,210,704 A * 5/1993 Husseiny ..................... 702/34
5,787,190 A 7/1998 Peng et al.
5,817,958 A * 10/1998 Uchida et al. ............ 73/865.9

FOREIGN PATENT DOCUMENTS

EP 0 288 979 A 11/1988
EP 0 557 628 A 1/1993
JP 10 221161 A 8/1998

OTHER PUBLICATIONS

Dunn, Richard L., editor, "Our Biggest Challenge," Plant Engineering, Editorial, Sep. 1998, p. 8.

Purvis, Mark, editor, "Calling Pump Makers to Account," Wold Pumps, Aug. 1998, p. 3.

Author Unknown, "Life Cycle Cost Analysis for Pumping Systems," World Pumps, Special Feature, Aug. 1998, pp. 28–32.

Thurston, Garth G., editor, "Durco and BW/IP Merger to Form Flowserve Corporation," FacetoFace, Winter 1997/1998, pp. 2–7 and back cover of publication.

Motion Industries advertisement, Plant Engineering, Sep. 1998, p. 103.

Applied Industrial Technologies advertisement, date unknown, 1 page.

Lau, Constantine, "Weighing the Pros and Cons of Advanced Control Solutions," Chemical Processing, Mar. 1998, pp. 70–73 and 75.

(List continued on next page.)

*Primary Examiner*—John Barlow
*Assistant Examiner*—Demetrius Pretlow
(74) *Attorney, Agent, or Firm*—Kenneth P. Robinson

(57) ABSTRACT

A computer system implements a process for gathering, synthesizing, and analyzing data relating to a pump and/or seal or other rotating equipment failure. Data indicating the current state of the equipment is gathered and verified prior to a failure occurring so that accurate information is available. After a failure or problem occurs, data about the problem or failure are methodically gathered to aid in the determination of the root cause of the failure. In particular, visual images of failure modes are provided to the user to ensure that proper and accurate data are obtained. After data relating to the problem or failure has been gathered, the data are synthesized and an analysis is performed to determine the root cause of the failure or problem. These various methods and apparatus allow a non-specialist to properly identify and diagnose a failure or problem associated with a mechanical seal and pump.

66 Claims, 54 Drawing Sheets

OTHER PUBLICATIONS

Hammock, Cliff and Schultz, John, "Reliability: Big Opportunity or Big Distraction?" Pumps And Systems Magazine, Nov. 1998, pp. 16–23.

Jones, Randall, "AlliedSignal GeismarWorks," Pumps and Systems Magazine, Aug. 1998, pp. 30–32.

Buchanan, Leigh, "Killer Apps," FacetoFace, May 1998, pp., 92, 94 and 96.

Yeager, Robert L., "MillWide Information: The Pulp & Paper 'Killer App,'" Prima's Papermaker, Jul. 1998, p. 34.

Booklet by John Crane, Inc., entitled: "Identifying Causes of Seal Leakage," date unknown, pp. 1–32.

Booklet entitled: "Troubleshooting," date unknown, pp. 66–77.

MTBPM Seminar, "A User's Guide to Mechanical Seal Failure Analysis—Part I," FacetoFace, vol. IV, No. 2, date unknown, pp. 4–5.

MTBPM Seminar, "A User's Guide to Mechanical Seal Failure Analysis—Part II," FacetoFace, vol. IV, No. 3, date unknown, pp. 4–5.

MTBPM Seminar, "A User's Guide to Mechanical Seal Failure Analysis—Part III," FacetoFace, vol. IV, No. 4, date unknown, pp. 4–5.

MTBPM Seminar, "A User's Guide to Mechanical Seal Failure Analysis—Part IV," FacetoFace, vol. V, No. 1, date unknown, pp. 4–5.

Huuskonen, P., et al., "Explanation Based on Contexts", Proceedings of the Eighth Conference on Artificial Intelligence for Applications, IEEE Comp., Soc. Press, Mar. 2, 1992, pp. 179–185.

Esser, J., "Diagnosesystem Fur Hydraulikpumpen" Olhydraulik und Pneumatik , de, Krausskopf Verlag Fur Wirtschaft GMBH, Mainz, vol. 36, No. 3, Mar. 1, 1992, pp. 176–181.

Isermann, R., et al., "Process Fault Diagnosis Based on Process Model Knowledge", Journal A, vol. 31, No. 4, Dec. 1900, Antwerp BE, pp. 58–64.

* cited by examiner

Form 001

Customer Information 001.001
402

UserID
CustID
Name
Phone
Fax
Other Info.

Plant Location 001.002
404

Plant Location
Site Condition ☐xxx ☐xxx ☐xxx ☐xxx ☐xxx ☐xxx
Plant Area
Position Number
Installed Spare Position # (xxxxxxxxxxxxxxxxxxxx)
Other Info.

Equipment Information 001.003
406

Equipment ID#
Serial#
Equipment Type
Pump Mfg
Ref#
Pump Model
Frame/Group
Variation
Bore Type
Sleeve Type
Pump Sizes
Impeller Diameter
Casing/Wet End Matl of Construction
Shaft Rotation of Equipment as Seen From Driver ○ xx ○ xxxx
Other info.
Other Info.

Equipment Verification
Has manufacturer, model, frame or group and pump sizes been verified as correct? ○ xx ○ xxx
Source of Information
Other Info.

FIG. 4A

| | Process Fluid | 001.004 |

Primary
Secondary
Additional
　　　　　　　　　　　　　　　　　　　408

Concentration　　　　　xx
Specific Gravity
Vapor Pressure　　　　xxxx
Viscosity　　　　　　　xxx
% of Solids
Dissolved
Undissolved　　xxxxx
　　　　　　　　xxxxxx
Barrier Fluid
Other Info.

Warning Notes/Safety Considerations

Other Info.

Process Fluids Additional Information

Hazardous Materials　　　　　　　　　　　　　　　　　　　　OxxOxx
Are there any system cleaning chemicals used in system?OxxOxx
If yes, verify they are included in the process fluids　　　　OxxOxx
shown above

| | Operating Conditions | 001.005 |

410

Temperature　　　　　　xxxx
Shaft Speed　　　　　　xxxx
Box Pressure　　　　　　xxxx
SuctionPressure　　　　 xxxx
DischargePressure　　　xxxx
How does equipment operate?  O xxxxxxx  O xxxxxxx
Other Info.

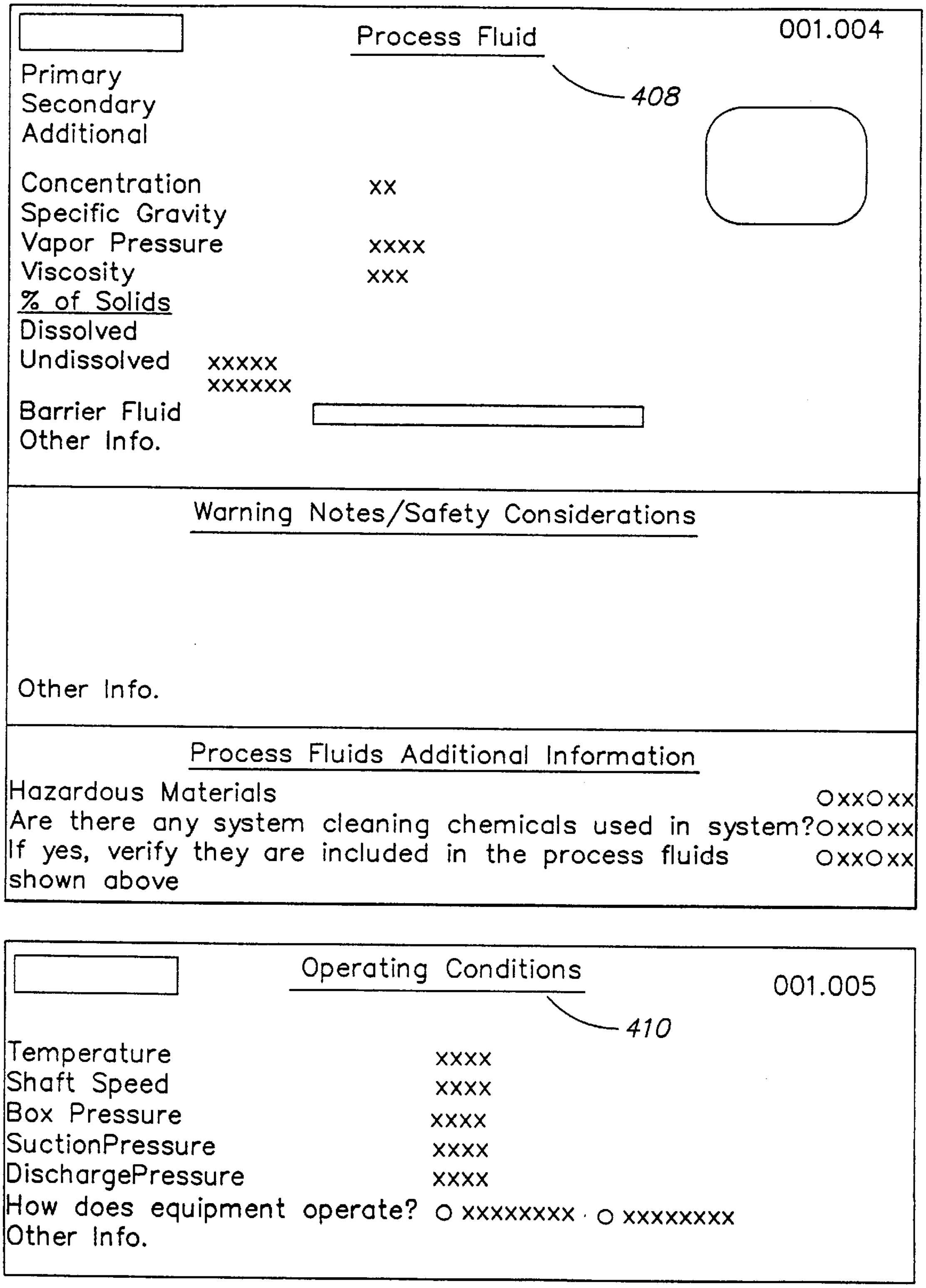

FIG. 4B

Operating Conditions Information

Other Info.

Drive Motor  001.006
412
Mfg
RPM
Amps
HP
Phase
Enclosure
Volts
Seal Type    ○ xxxxxxx    ○ xxxxxxx    ○ xxxxxxx
Other Info.

Coupling  001.007
414
Mfg
Model
Type
Other Info.

Bearings  001.008
416
Mfg
Type
Seal Type        ○ xxxxx    ○ xxxxx    ○ xxxxx
Lubricator Type  ○ xxxxx    ○ xxxxx    ○ xxxxx    ○ xxxxx    ○ xxxxx
Other Info.

Mechanical Packing  001.009
○ xxx    ○ xxxxx             418
Size
Type/Seal
Other Info.

| | Mechanical Seal Information | 001.010 |
|---|---|---|
| | ○ xxxx    ○ xxxx    —420 | |

Seal Mfg
Seal Model
Seal Type         ○ xxxx    ○ xxxx    ○ xxxx    ○ xxxx
Seal Style        ○ xxxx    ○ xxxx
Seal Lubrication  ○ xxxx    ○ xxxx
Seal Description
Gland Features
Seal Stock Room ID
Seal Qty
Seal Vendor
Seal Mfg Part#
Unit Cost Each
Spcl. Gld. Features ☐ xxxxxx    ☐ xxxxxx    ☐ xxxxxx
Optional Features   ☐ xxxxxx    ☐ xxxxxxxxxx  ☐ xxxxxx
Seal Gland Type
Seal Sleeve Type
Seal Size
Serial Number
Dwg/Bill of Materials#
Material Code
Mat. of Const.
I/B Rotary Face
O/B Rotary Face
I/B Stat Face
O/B Stat Face
I/B Elastomer
O/B Elastomer
Internal Use Only
Other Info.

Seal Engineering Specifications xxxxxxxxxxxxxxxxxxxxxxxxx

Equipment Modifications Related to Seal

Has pump been modified? ○ xxxx  ○ xxxx  ○ xxxx
(Any modification in the seal area that would effect a seal?) If Yes, Explain:
How were pump/equipment dimensions obtained? ☐

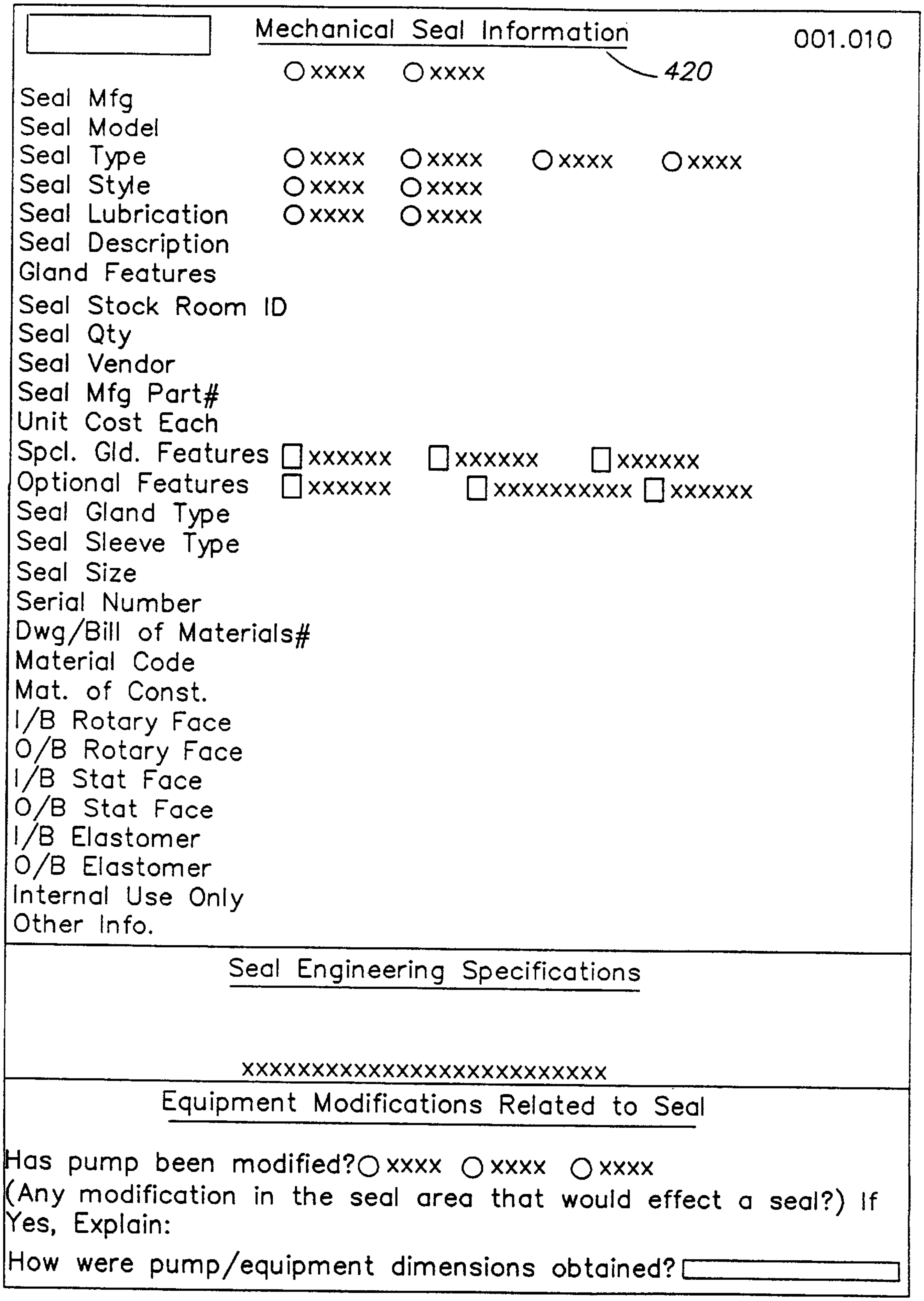

*FIG. 4D*

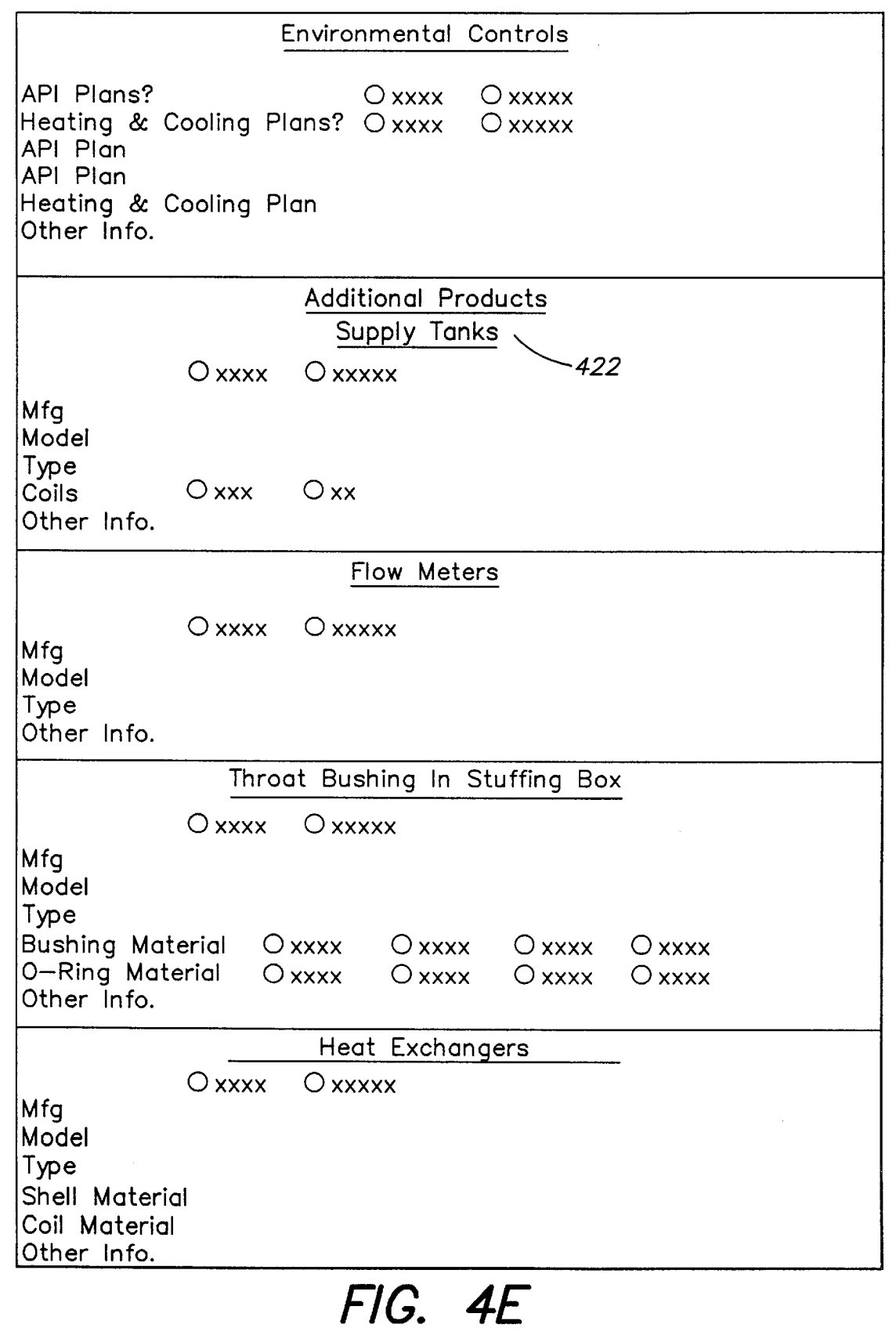

Environmental Controls

API Plans? ○ xxxx ○ xxxxx
Heating & Cooling Plans? ○ xxxx ○ xxxxx
API Plan
API Plan
Heating & Cooling Plan
Other Info.

Additional Products

Supply Tanks

422

○ xxxx ○ xxxxx
Mfg
Model
Type
Coils ○ xxx ○ xx
Other Info.

Flow Meters

○ xxxx ○ xxxxx
Mfg
Model
Type
Other Info.

Throat Bushing In Stuffing Box

○ xxxx ○ xxxxx
Mfg
Model
Type
Bushing Material ○ xxxx ○ xxxx ○ xxxx ○ xxxx
O-Ring Material ○ xxxx ○ xxxx ○ xxxx ○ xxxx
Other Info.

Heat Exchangers

○ xxxx ○ xxxxx
Mfg
Model
Type
Shell Material
Coil Material
Other Info.

FIG. 4E

Cyclone Separator
○ xxxx  ○ xxxxx

Mfg
Model
Type
Material
Other Info.

Pressure Regulator
○ xxxx  ○ xxxxx

Mfg
Model
Type
Material
Other Info.

Low Level Alarm
○ xxxx  ○ xxxxx

Mfg
Model
Type
Material
Other Info.

Pressure Switch
○ xxxx  ○ xxxxx

Mfg
Model
Type
Material
Other Info.

○ xxxx  ○ xxxxx

Mfg
Model
Type
Material
Other Info.

| EQUIPMENT IDENTIFIER | PROCESS FLUID | SEAL | PIPING | BEARINGS | COUPLING | MRO | FAILURES | MTBF | LCC |
|---|---|---|---|---|---|---|---|---|---|
| 602 | 604 | 606 | 608 | 610 | 612 | 614 | 616 | 618 | 620 |

600

| PROCESS FLUID IDENTIFIER | NAME | VISCOSITY | Ph | COMPATABILITY DATA |
|---|---|---|---|---|
| 702 | 704 | 706 | 708 | 710 ... 712 |

| 802 | 804 | 806 | 808 | 810 | 812 | |
|---|---|---|---|---|---|---|
| EQUIPMENT IDENTIFIER | FAILURE MODE 1 | VISUAL IMAGE 1 | ROOT CAUSE 1 | 1st CORRECTIVE ACTION | 2nd CORRECTIVE ACTION | ... |
| | FAILURE MODE 2 | VISUAL IMAGE 2 | ROOT CAUSE 2 | 1st CORRECTIVE ACTION | 2nd CORRECTIVE ACTION | ... |
| | ... | | ... | | | |

FIG. 8

Seal Parts Inspection

Seal Failure Photo Analysis

XXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXX

Place an "X" in the boxes that best identify the conditions you are experiencing.

Cartridge Seal: Environment

| Yes ⊙ | No ◯ | |
|---|---|---|
| | | |

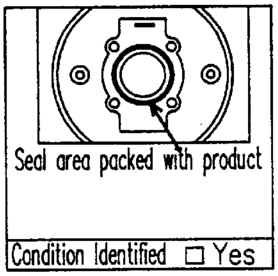

Seal area packed with product

Condition Identified ☐ Yes

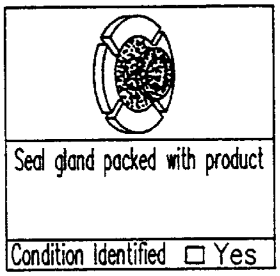

Seal gland packed with product

Condition Identified ☐ Yes

If safety issues allow, inspect parts before and after cleaning as photos require.

| Yes ⊙ | No ◯ | |
|---|---|---|
| | | |

Cartridge & Component Seal: Glands

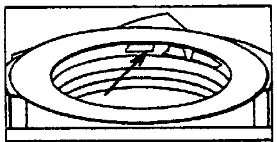

Rubbing on inside diameter of gland (less than 360 degree area)

Condition Identified ☐ Yes

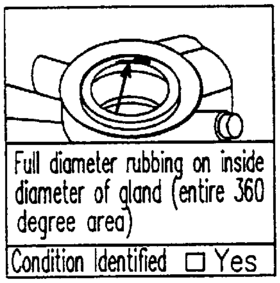

Full diameter rubbing on inside diameter of gland (entire 360 degree area)

Condition Identified ☐ Yes

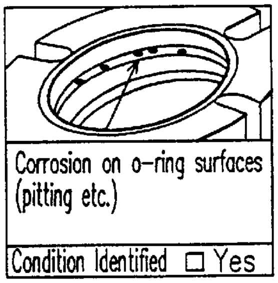

Corrosion on o-ring surfaces (pitting etc.)

Condition Identified ☐ Yes

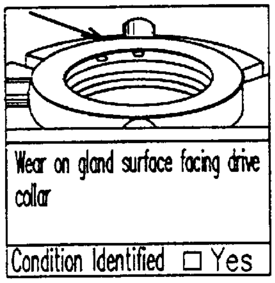

Wear on gland surface facing drive collar

Condition Identified ☐ Yes

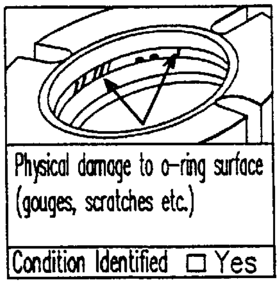

Physical damage to o-ring surface (gouges, scratches etc.)

Condition Identified ☐ Yes

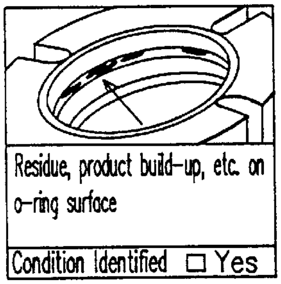

Residue, product build-up, etc. on o-ring surface

Condition Identified ☐ Yes

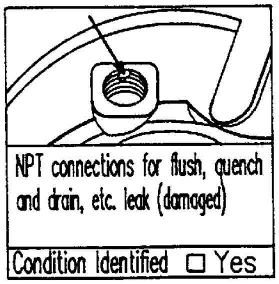

NPT connections for flush, quench and drain, etc. leak (damaged)

Condition Identified ☐ Yes

FIG. 10B

003–Mechanical Seal Leakage Problems – Maintenance 008.001

| ⊙ Yes | 08110 | 1 | 5 |
|---|---|---|---|
| ○ No | | | |

| | Mechanical Seal Information: 1. Original Design Seal | 2. Change Entries To Reflect Actual/Current Design Seal | 3. Change Entries To Reflect Seal Installed At Time Of Failure | 4. Entries in column 3 match entries in column 1 Not Checked, Yes, No, Not Sure | | | | 5. Did change relate to failure? | | 6. Actions recommended: None, Repair, Replace, Engineering Analysis Other | | | | |
|---|---|---|---|---|---|---|---|---|---|---|---|---|---|---|
| | | | | NC OH TK D | YES | NO | NS OU TR E | YES | NO | NONE | REPR | REPL | ENGR | OTHER |
| Mech Seal | xxxx | | | ○ | ○ | ○ | ○ | ○ | ○ | ○ | ○ | ○ | ○ | ○ |
| Mfg | xxxx | | | ○ | ○ | ○ | ⊙ | ○ | ⊙ | ○ | ○ | ○ | ○ | ○ |
| Model | xxxx | | | ○ | ○ | ○ | ○ | ○ | ○ | ○ | ○ | ○ | ○ | ○ |
| Type | xxxx | | | ○ | ⊙ | ○ | ○ | ○ | ○ | ⊙ | ○ | ○ | ⊙ | ○ |
| Style | xxxx | | | ○ | ○ | ○ | ○ | ○ | ○ | ○ | ○ | ○ | ○ | ○ |
| Lubrication | | | | ○ | ○ | ○ | ○ | ○ | ○ | ○ | ○ | ○ | ○ | ○ |
| Description | | | | ○ | ○ | ○ | ○ | ○ | ○ | ○ | ○ | ○ | ○ | ○ |
| Qty | x | | | ○ | ○ | ○ | ⊙ | ○ | ⊙ | ○ | ○ | ○ | ○ | ○ |
| StockRmID | | | | ○ | ○ | ○ | ○ | ○ | ○ | ○ | ○ | ○ | ○ | ○ |
| Vendor | xxxx | | | ○ | ⊙ | ○ | ○ | ○ | ○ | ⊙ | ○ | ○ | ⊙ | ○ |
| MfgPArt# | xxxx | | | ○ | ○ | ○ | ○ | ○ | ○ | ○ | ○ | ○ | ○ | ○ |
| Spcl.Gld.Features | | | | ○ | ○ | ○ | ⊙ | ○ | ⊙ | ○ | ○ | ○ | ○ | ○ |
| Optional Features | | | | ○ | ○ | ○ | ○ | ○ | ○ | ○ | ○ | ○ | ○ | ○ |
| Seal Size | xxxx | | | ○ | ⊙ | ○ | ○ | ○ | ○ | ⊙ | ○ | ○ | ⊙ | ○ |
| Serial Number | | | | ○ | ○ | ○ | ○ | ○ | ○ | ○ | ○ | ○ | ○ | ○ |
| Dwg#/BM# | | | | ○ | ○ | ○ | ⊙ | ○ | ⊙ | ○ | ○ | ○ | ○ | ○ |
| Material Code | xxxx | | | ○ | ○ | ○ | ○ | ○ | ○ | ○ | ○ | ○ | ○ | ○ |
| Mat.Of Const. | xxxx | | | ○ | ⊙ | ○ | ○ | ○ | ○ | ⊙ | ○ | ○ | ⊙ | ○ |
| I/B Rot. Face | xxxx | | | ○ | ○ | ○ | ○ | ○ | ○ | ○ | ○ | ○ | ○ | ○ |
| I/B Stat Face | xxxx | | | ○ | ○ | ○ | ⊙ | ○ | ⊙ | ○ | ○ | ○ | ○ | ○ |
| I/B Elastomer | xxxx | | | ○ | ○ | ○ | ○ | ○ | ○ | ○ | ○ | ○ | ○ | ○ |
| O/B Rot. Face | xxxx | | | ○ | ⊙ | ○ | ○ | ○ | ○ | ⊙ | ○ | ○ | ⊙ | ○ |
| O/B Stat Face | xxxx | | | ○ | ○ | ○ | ○ | ○ | ○ | ○ | ○ | ○ | ○ | ○ |
| O/B Elastomer | xxxx | | | ○ | ○ | ○ | ⊙ | ○ | ⊙ | ○ | ○ | ○ | ○ | ○ |
| Internal Use Only | | | | ○ | ○ | ○ | ○ | ○ | ○ | ○ | ○ | ○ | ○ | ○ |
| Other Info. | | | | ○ | ⊙ | ○ | ○ | ○ | ○ | ⊙ | ○ | ○ | ⊙ | ○ |

FIG. 11A

XXXXXXXXXXXXXX
XXXXXXXXXXXXXX
XXXXXXXXXXXXXX
XXXXXXXXXXXXXX
XXXXXXXXXXXXXX 008.002

Seal Engineering Specifications xxxxxxxxxxxxxxxxx xxxxxxxxxxxxxxxxxxxxxxxxxxxxxxxxxxxxxxx Equipment Modifications Related to Mechanical Seal

| | | | |
|---|---|---|---|
| ⊙Yes | 08120 | 1 | 5 |
| ○ No | | | |

XXXXXXXXXXXXXX
XXXXXXXXXXXXXX
XXXXXXXXXXXXXX
XXXXXXXXXXXXXX
XXXXXXXXXXXXXX

| Questions | 4. Not Checked, Yes, No, Not Sure | | | | 5. Did condition relate to failure? | | 6. Actions recommended: None, Repair, Replace, Engineering Analysis Other | | | | |
|---|---|---|---|---|---|---|---|---|---|---|---|
| | NOT CHECKED | YES | NO | NOT SURE | YES | NO | NONE | REPR | REPL | ENGR | OTHER |
| Has equipment been modified in the seal area? | ○ | ○ | ○ | ○ | ○ | ○ | ○ | ○ | ○ | ○ | ○ |

Mechanical Seal Leakage Identification ○Yes ○No

| | | | |
|---|---|---|---|
| ⊙Yes | 01510 | 4 | 1 |
| ○ No | | | |

Equipment Uses A Mechanical Seal? ⊙Yes ○No

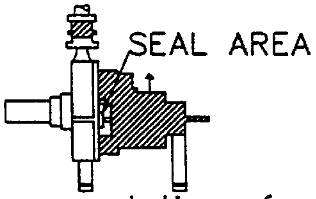

Further Details

Representation of a Centrifugal Pump

FIG. 11B

| | | | |
|---|---|---|---|
| ⊙ Yes | 01530 | 1 | 1 |
| ○ No | | | |

Leakage Point Identification 008.003

XXXXXXXXXXXXXXXXXXXXXXXXXXXXXXXXXXXXXX

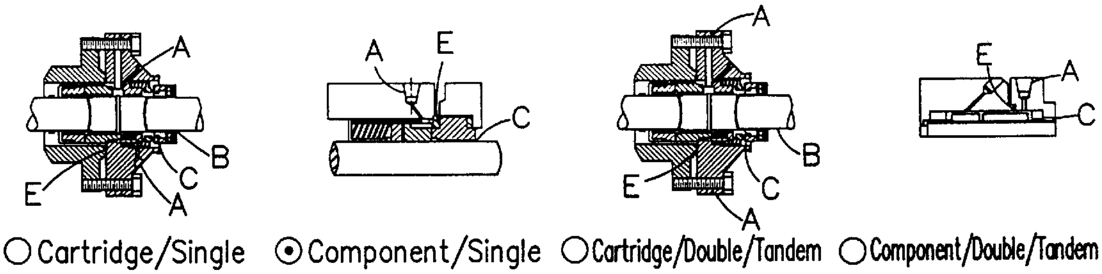

○ Cartridge/Single ⊙ Component/Single ○ Cartridge/Double/Tandem ○ Component/Double/Tandem Please Click The Point of Leakage Point of Leakage Letters Correspond to the Drawings Shown Above More than one point may be selected ☐A. Threaded Fittings Leak ☐C. Seal Internals ☐Other ☐B. Between Shaft & Seal Sleeve ☐E. Gland Gasket Leaks Seal Failure Information

XXXXXXXXXXXXXXXXXXXX
XXXXXXXXXXXXXXXXXXXXXXXXXXXXXXXXXXXXXX

| | | | |
|---|---|---|---|
| ⊙ Yes | 01600 | 4 | 1 |
| ○ No | | | |

Time Frame of Initial Leakage

XXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXX
XXXXXX
XXXXXXX
XXXXXX

| | | | |
|---|---|---|---|
| ⊙ Yes | 01650 | 4 | 1 |
| ○ No | | | |

Initial Amount of Leakage

XXXXXXXXXXXXXXX

| | | | |
|---|---|---|---|
| ⊙ Yes | 01700 | 4 | 1 |
| ○ No | | | |

Initial Leakage Pattern

XXXXXXXXXXXX
XXXXXXXXXXXXX
XXXXXXXXXXX

| | | | |
|---|---|---|---|
| ⊙ Yes | 01900 | 4 | 1 |
| ○ No | | | |

Leakage Pattern Since Initial Leakage Was Detected

XXXXXXXXXXXXX

| | | | |
|---|---|---|---|
| ⊙ Yes | 01910 | 4 | 1 |
| ○ No | | | |

Double Seal Leakage Information

XXXXXXXXXXXXX

| | | | |
|---|---|---|---|
| ⊙ Yes | 01930 | 4 | 1 |
| ○ No | | | |

Failed Mechanical Seal Information

XXXXXXXXXXXXX

| | | | |
|---|---|---|---|
| ⊙ Yes | 01940 | 4 | 1 |
| ○ No | | | |

Repaired Mechanical Seals Only

XXXXXXXXXXXXX

| | | | |
|---|---|---|---|
| ⊙ Yes | 01950 | 4 | 1 |
| ○ No | | | |

Pressure Testing of Mechanical Seal

XXXXXXXXXXXXX XXXXXXX

*FIG. 11C*

Mechanical Seal Additional Information 008.004

| Questions | 4. Not Checked, Yes, No, Not Sure | | | | 5. Did condition relate to failure? | | 6. Actions recommended: None, Repair, Replace, Engineering Analysis Other | | | | |
|---|---|---|---|---|---|---|---|---|---|---|---|
| | NOCHKD | YES | NO | NOTSURE | YES | NO | NONE | REPR | REPL | ENGR | OTHER |
| ⦿ Yes ○ No \| 01751 \| 4 \| 1 — The pump and mechanical seal did not run dry. xxxxxxxxxxxx xxxxxxx; xxxxxxxxxxxxxx xxxxxxxxxxxx xxxxxxxxxxxxxx | ○ | ○ | ○ | ○ | ○ | ○ | ○ | ○ | ○ | ○ | ○ |
| ⦿ Yes ○ No \| 01752 \| 4 \| 1 — There was not squealing from the seal area during operation. xxxxxxxxxxxx xxxxxxx; xxxxxxxxxxxxxx xxxxxxxxxxxx xxxxxxxxxxxxxx | ○ | ○ | ○ | ⦿ | ○ | ○ | ○ | ○ | ○ | ○ | ○ |
| ⦿ Yes ○ No \| 01753 \| 4 \| 1 — There were no popping sounds (flashing) coming from the seal area. xxxxxxxxxxxx xxxxxxx; xxxxxxxxxxxxxx xxxxxxxxxxxx xxxxxxxxxxxxxx | ○ | ○ | ○ | ⦿ | ○ | ○ | ○ | ○ | ○ | ○ | ○ |

| Seal Temperature Readings | 1. Original Design Operating Temperature | 2. Change Entries To Reflect Actual/Current Design Operating Temperature | 3. Change Entries To Reflect Temperature At Time Of Failure | 4. Entries in column 3 match entries in column 1 Not Checked, Yes, No, Not Sure | | | | 5. Did condition relate to failure? | | 6. Actions recommended: None, Repair, Replace, Engineering Analysis Other | | | | |
|---|---|---|---|---|---|---|---|---|---|---|---|---|---|---|
| ⊙Yes 01800 4 1<br>○No | | | | NOT CHKD | YES | NO | NOT SURE | YES | NO | NONE | REPR | REPL | ENGR | OTHER |
| Seal Chamber | F C | F C | F C | ○ | ○ | ○ | ○ | ○ | ○ | ○ | ○ | ○ | ○ | ○ |
| Gland | F C | F C | F C | ○ | ○ | ○ | ⊙ | ○ | ⊙ | ○ | ○ | ○ | ○ | ○ |
| Piping from seal gland | F C | F C | F C | ○ | ○ | ○ | ○ | ○ | ○ | ○ | ○ | ○ | ○ | ○ |
| Piping to seal gland | F C | F C | F C | ○ | ○ | ○ | ⊙ | ○ | ⊙ | ○ | ○ | ○ | ○ | ○ |

xxxxxxxxxxxxxxxxxxxxxxxx
xxxxxxxxxxxxxxxxxxxxxxxxxxx
xxxxxxxxxxxxxxxxxxxxx
xxxxxxxxxxxxxxxxxxxxxxxx

*FIG. 11D(B)*

General Mechanical Seal Questions 008.005

| Item | # | Location/Description | 1. Original Design | 2. Change Entries To Reflect Actual/Current Design | 3. Change Entries To Reflect Condition At Time Of Failure | 4. Entries in column 3 match entries in column 1 Not Checked, Yes, No, Not Sure | | | | | 5. Did condition relate to failure? | | 6. Actions recommended: None, Repair, Replace, Engineering Analysis Other | | | | |
|---|---|---|---|---|---|---|---|---|---|---|---|---|---|---|---|---|---|
| | | | | | | NOT CHKD | YES | NO | NOT SURE | | YES | NO | NONE | REPR | REPL | ENGR | OTHER |

Items Physically Located On The Piping Connected to And Leading Away From The Mechanical Seal

| ⊙Yes ○No | 08210 | 4 | 1 | | Settings | | | | | | | | | | | | |
|---|---|---|---|---|---|---|---|---|---|---|---|---|---|---|---|---|---|
| Valves #1 | | | | XXXXX XXXXX XXXXX | XXXXX XXXXX XXXXX | XXXXX XXXXX XXXXX | O | O | O | O | | O | O | O | O | O | O | O |
| Valves #2 | | | | XXXXX XXXXX XXXXX | XXXXX XXXXX XXXXX | XXXXX XXXXX XXXXX | O | O | O | ⊙ | | O | ⊙ | O | O | O | O | O |
| Valves #3 | | | | XXXXX XXXXX XXXXX | XXXXX XXXXX XXXXX | XXXXX XXXXX XXXXX | O | O | O | ⊙ | | O | ⊙ | O | O | O | O | O |

xxxxxxxxxxxxxxxxxxxxx
xxxxxxxxxxxxxxxxxxxxxxx
xxxxxxxxxxxxxxxxxxx

| ⊙Yes ○No | 08220 | 4 | 1 | | Readings | | | | | | | | | | | | |
|---|---|---|---|---|---|---|---|---|---|---|---|---|---|---|---|---|---|
| Temperature Gauges #1 | | | | F   C | F   C | F   C | O | O | O | O | | O | O | O | O | O | O | O |
| Temperature Gauges #2 | | | | F   C | F   C | F   C | O | O | O | ⊙ | | O | ⊙ | O | O | O | O | O |

xxxxxxxxxxxxxxxxxxxxx
xxxxxxxxxxxxxxxxxxxxxxx
xxxxxxxxxxxxxxxxxxx

| ⊙Yes ○No | 08230 | 4 | 1 | | Readings | | | | | | | | | | | | |
|---|---|---|---|---|---|---|---|---|---|---|---|---|---|---|---|---|---|
| Pressure Gauges #1 | | | | PSIG | PSIG | PSIG | O | O | O | O | | O | O | O | O | O | O | O |
| Pressure Gauges #2 | | | | PSIG | PSIG | PSIG | O | O | O | ⊙ | | O | ⊙ | O | O | O | O | O |

xxxxxxxxxxxxxxxxxxxxx
xxxxxxxxxxxxxxxxxxxxxxx
xxxxxxxxxxxxxxxxxxx

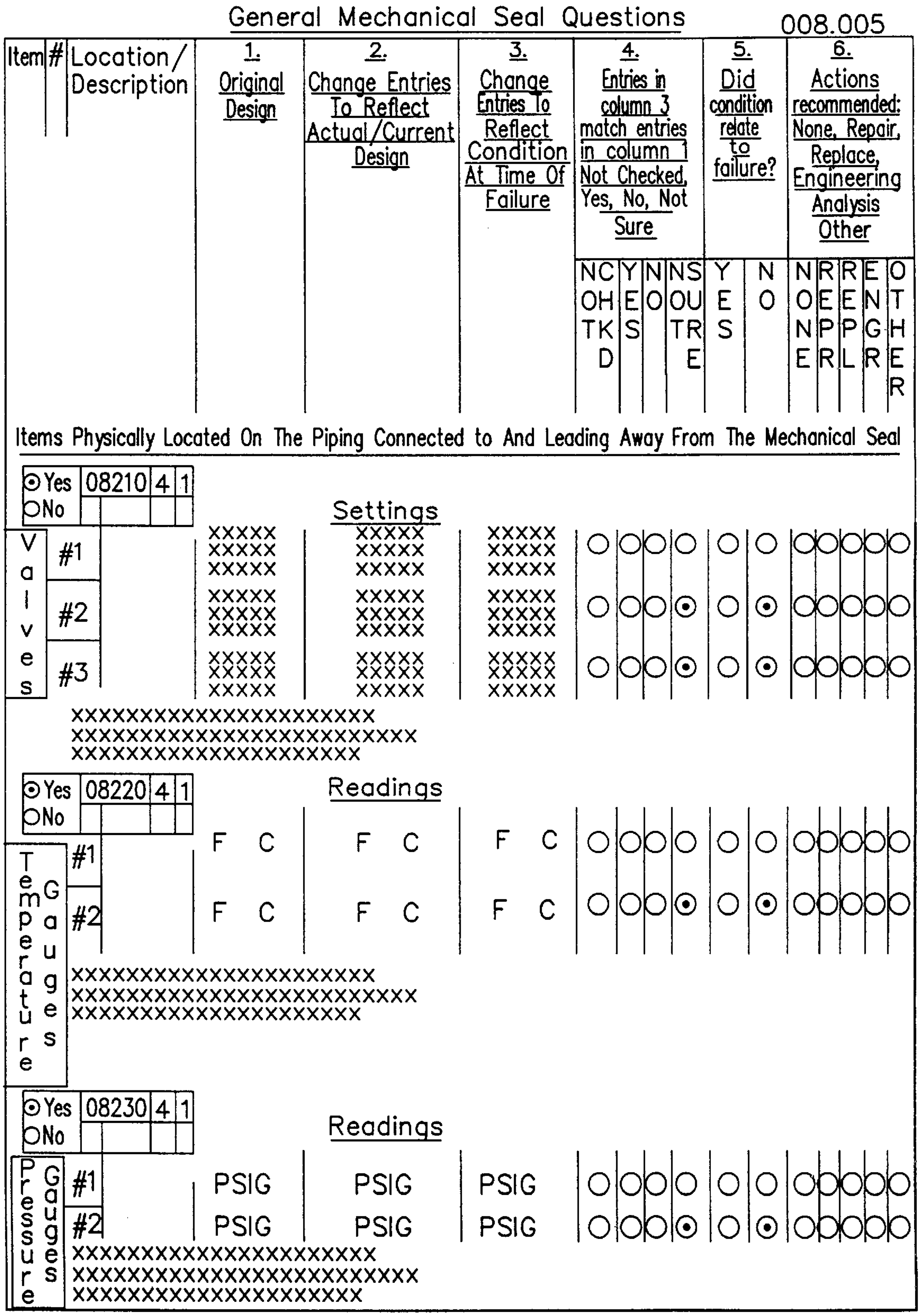

*FIG. 11E*

General Mechanical Seal Questions    008.006

| Item | # | Location/ Description | 1. Original Design | 2. Change Entries To Reflect Actual/Current Design | 3. Change Entries To Reflect Condition At Time Of Failure | 4. Entries in column 3 match entries in column 1 Not Checked, Yes, No, Not Sure | | | | 5. Did condition relate to failure? | | 6. Actions recommended: None, Repair, Replace, Engineering Analysis Other | | | | |
|---|---|---|---|---|---|---|---|---|---|---|---|---|---|---|---|---|
| | | | | | | NOT CHCKD | YES | NO | NOT SURE | YES | NO | NONE | REPR | REPL | ENGR | OTHER |

Items Physically Located On The Piping Connected to And Leading Away From The Mechanical Seal

| | ⊙Yes ONo | 08240 | 4 | 1 | | Settings | | | | | | | | | | |
|---|---|---|---|---|---|---|---|---|---|---|---|---|---|---|---|---|
| Pressure Regulator | #1 | | | | PSIG | PSIG | PSIG | O | O O | O | O | O | O O | O O | O | |
| | #2 | | | | PSIG | PSIG | PSIG | O | O O | O | O | O | O O | O O | O | |

xxxxxxxxxxxxxxxxxxxxxxxx
xxxxxxxxxxxxxxxxxxxxxxxxxx
xxxxxxxxxxxxxxxxxxxxxxxx

| | ⊙Yes ONo | 08250 | 4 | 1 | | % Of Flow | | | | | | | | | | |
|---|---|---|---|---|---|---|---|---|---|---|---|---|---|---|---|---|
| Filters Strainers & | #1 | | | | % | % | % | O | O O | O | O | O | O O | O O | O | |
| | #2 | | | | % | % | % | O | O O | O | O | O | O O | O O | O | |

xxxxxxxxxxxxxxxxxxxxxxxx
xxxxxxxxxxxxxxxxxxxxxxxxxx
xxxxxxxxxxxxxxxxxxxxxxxx

Ⓐ                                      Ⓑ

| FIG. 11F(A) |
|---|
| FIG. 11F(B) |

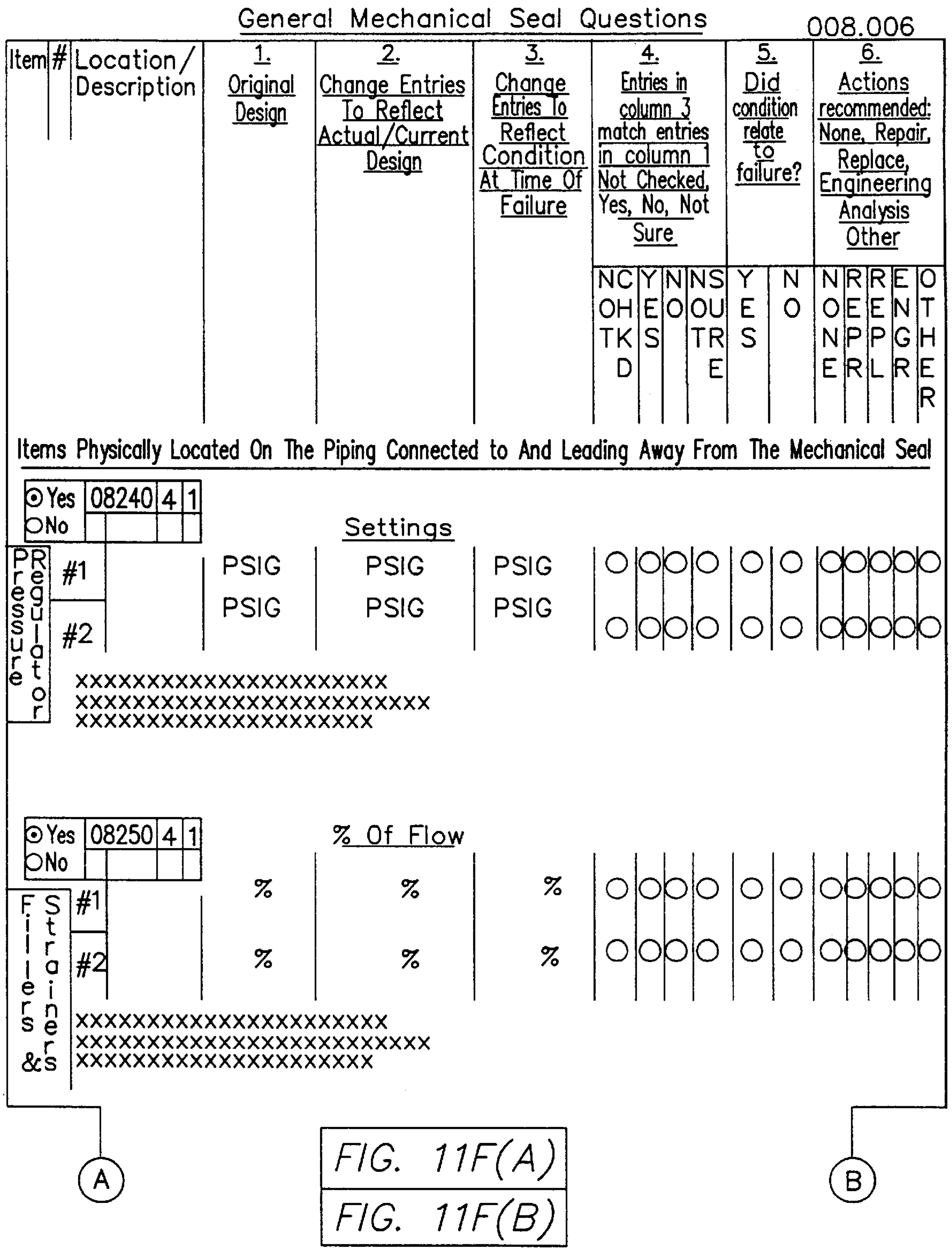

FIG. 11F(A)

Graphic Checklist

| Failure Mode Identified | | | 0101 | 0102 | 0103 | 0201 | 0202 | 0203 | 0204 |
|---|---|---|---|---|---|---|---|---|---|
| | Seal Failure Analyzer Results | | x | | | | x | | |
| | Human, Equipment, System Analysis | | | | | | | | |
| | xxx | Initial Problem Identification 1202 | | | | 1218 | | | |
| | xxx | Mechanical Problems Identification | | | | | | | |
| | xxx | xx xxxxxxxxxx | | | | | | | |
| | xxx | Hydraulic Problems Identification | | | | | | | |
| | xxx | xx xxxxxxxxxx | | | | | | | |
| | xxx | Equipment Leakage Other Than Seal/Stuffing Box Area Identification | | | | | | | |
| | xxx | xx xxxxxxxxxx | | | | | | | |
| | xxx | Excessive Packing/Stuffing Box Leakage Identification | | | | | | | |
| | xxx | xx xxxxxxxxxx | | | | | | | |
| | xxx | Mechanical Seal Leakage Identification | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | Time Frame of Initial Leakage of Mechanical Seal | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | Initial Amount of Mechanical Seal Leakage | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | Initial Mechanical Seal Leakage Pattern | | | | | | | |
| | xxx | xx xxxxxxxxxx | | | | | | | |

FIG. 12A

Graphic Checklist

| Failure Mode Identified | | | 0101 | 0102 | 0103 | 0201 | 0202 | 0203 | 0204 |
|---|---|---|---|---|---|---|---|---|---|
| | Seal Failure Analyzer Results | | x | | | | x | | |
| | xxx | XX XXXXXXXXXX | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | | | | | | | | | |
| | xxx | Mechanical Seal Additional Information | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | | | | | | | | | |
| | xxx | Mechanical Seal Temperature Information | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | | | | | | | | | |
| | xxx | Leakage Pattern Information | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | | | | | | | | | |
| | | | | | | | | | |
| | xxx | Double Seals Only | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | | | | | | | | | |
| | | | | | | | | | |
| | xxx | Supply Tank Refill Information | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | | | | | | | | | |
| | xxx | Barrier/Buffer Fluid Information | | | | | | | |
| | xxx | XX XXXXXXXXXX | | | | | | | |
| | | | | | | | | | |
| | | | | | | | | | |
| | xxx | Mechanical Problems Identified —1204 | | | | | | | |
| | xxx | XX XXXXXXXXXX | | | | | | | |
| | xxx | XX XXXXXXXXXX | | | | | | | |

FIG. 12B

Graphic Checklist

| Failure Mode Identified | Seal Failure Analyzer Results | | 0101 | 0102 | 0103 | 0201 | 0202 | 0203 | 0204 |
|---|---|---|---|---|---|---|---|---|---|
| | | | x | | | | x | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | | | | | | | | | |
| | xxx | Hydraulic Problems Identified 1206 | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | | | | | | | | | |
| | | | | | | | | | |
| | xxx | Packing Problems Identified 1208 | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | | | | | | | | | |
| | | | | | | | | | |
| | xxx | Equipment Leakage Problems Identified 1210 | | | | | | | |
| | xxx | xx xxxxxxxxxx | | | | | | | |
| | xxx | xx xxxxxxxxxx | | | | | | | |
| | | | | | | | | | |
| | xxx | Operating Condition Analysis 1212 | | | | | | | |
| | xxx | Operating Condition Information | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | | | | | | | | |
| | | | | | | | | | |
| | xxx | Process Fluid Analysis 1214 | | | | | | | |
| | xxx | Process Fluid Information | | | | | | | |
| | xxx | xx xxxxxxxxxx | | | | | | | |
| | xxx | xx xxxxxxxxxx | | | | | | | |
| | | | | | | | | | |

FIG. 12C

Graphic Checklist

| Failure Mode Identified | | | 0101 | 0102 | 0103 | 0201 | 0202 | 0203 | 0204 |
|---|---|---|---|---|---|---|---|---|---|
| | Seal Failure Analyzer Results | | x | | | | x | | |
| | xxx | Mechanical Seal Analysis —1216 | | | | | | | |
| | xxx | Mechanical Seal Information | | | | | | | |
| | xxx | XX XXXXXXXXXX | | | | | | | |
| | xxx | XX XXXXXXXXXX | | | | | | | |
| | | | | | | | | | |
| | xxx | Items Connected to And Leading Away From Mechanical Seal | | | | | | | |
| | xxx | XX XXXXXXXXXX | | | | | | | |
| | | XX XXXXXXXXXX | | | | | | | |
| | xxx | XX XXXXXXXXXX | | | | | | | |
| | | XX XXXXXXXXXX | | | | | | | |
| | xxx | XX XXXXXXXXXX | | | | | | | |
| | | XX XXXXXXXXXX | | | | | | | |
| | xxx | XX XXXXXXXXXX | | | | | | | |
| | | XX XXXXXXXXXX | | | | | | | |
| | xxx | XX XXXXXXXXXX | | | | | | | |
| | | XX XXXXXXXXXX | | | | | | | |
| | xxx | XX XXXXXXXXXX | | | | | | | |
| | | XX XXXXXXXXXX | | | | | | | |
| | xxx | XX XXXXXXXXXX | | | | | | | |
| | | XX XXXXXXXXXX | | | | | | | |
| | xxx | XX XXXXXXXXXX | | | | | | | |
| | | XX XXXXXXXXXX | | | | | | | |
| | xxx | Mechanical Seal Installation | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | | | | | | | | | |
| | xxx | First API Plan I (if used) | | | | | | | |
| | xxx | API Plan I Information | | | | | | | |
| | xxx | XX XXXXXXXXXX | | | | | | | |
| | | | | | | | | | |
| | xxx | XX XXXXXXXXXX | | | | | | | |
| | | XX XXXXXXXXXX | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | | XX XXXXXXXXXX | | | | | | | |
| | xxx | XX XXXXXXXXXX | | | | | | | |
| | | XX XXXXXXXXXX | | | | | | | |
| | xxx | XX XXXXXXXXXX | | | | | | | |

FIG. 12D

Graphic Checklist

| Failure Mode Identified | Seal | Failure Analyzer Results | 0101 | 0102 | 0103 | 0201 | 0202 | 0203 | 0204 |
|---|---|---|---|---|---|---|---|---|---|
| | Seal | Failure Analyzer Results | x | | | | x | | |
| | xxx | Second API Plan II (if used) | | | | | | | |
| | xxx | API Plan II Information | | | | | | | |
| | xxx | XX XXXXXXXXXX | | | | | | | |
| | | | | | | | | | |
| | xxx | Recirculation lines to mechanical seal or equipment that | | | | | | | |
| | | carry process fluid and mix with the process stream | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | | XX XXXXXXXXXX | | | | | | | |
| | xxx | XX XXXXXXXXXX | | | | | | | |
| | | XX XXXXXXXXXX | | | | | | | |
| | xxx | XX XXXXXXXXXX | | | | | | | |
| | | | | | | | | | |
| | | | | | | | | | |
| | xxx | Heating and Cooling Plans (if used) | | | | | | | |
| | xxx | Heating and Cooling Plan Information | | | | | | | |
| | xxx | XX XXXXXXXXXX | | | | | | | |
| | | | | | | | | | |
| | xxx | Recirculation lines to mechanical seal or equipment that | | | | | | | |
| | | carry process fluid and mix with the process stream | | | | | | | |
| | xxx | XX XXXXXXXXXX | | | | | | | |
| | xxx | XX XXXXXXXXXX | | | | | | | |
| | | XX XXXXXXXXXX | | | | | | | |
| | xxx | XX XXXXXXXXXX | | | | | | | |
| | | XX XXXXXXXXXX | | | | | | | |
| | xxx | XX XXXXXXXXXX | | | | | | | |
| | | | | | | | | | |
| | | | | | | | | | |
| | | Additional Auxiliary Products | | | | | | | |
| | | | | | | | | | |
| | xxx | Barrier/Buffer Fluid Supply Tank | | | | | | | |
| | xxx | Supply Tank Information | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | xxx | XX XXXXXXXXXX | | | | | | | |
| | | XX XXXXXXXXXX | | | | | | | |
| | xxx | XX XXXXXXXXXX | | | | | | | |

FIG. 12E

Graphic Checklist

| Failure Mode Identified | Seal Failure Analyzer Results | | 0101 | 0102 | 0103 | 0201 | 0202 | 0203 | 0204 |
|---|---|---|---|---|---|---|---|---|---|
| | | | x | | | | x | | |
| | xxx | xx xxxxxxxxxx | | | | | | | |
| | xxx | xx xxxxxxxxxx | | | | | | | |
| | | | | | | | | | |
| | | Cooling Coils in Supply Tank | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | | | | | | | | | |
| | xxx | Low Level Alarm Switch in Supply Tank | | | | | | | |
| | | | | | | | | | |
| | xxx | xx xxxxxxxxxx | | | | | | | |
| | | | | | | | | | |
| | xxx | Pressure Switch/System Supply Tank | | | | | | | |
| | | | | | | | | | |
| | xxx | xx xxxxxxxxxx | | | | | | | |
| | | | | | | | | | |
| | xxx | Items Located on Supply Tank | | | | | | | |
| | | | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | | | | | | | | | |
| | xxx | Items Located on Piping Connected to and Leading Away From Supply Tank | | | | | | | |
| | | | | | | | | | |
| | xxx | xx xxxxxxxxxx | | | | | | | |
| | | xx xxxxxxxxxx | | | | | | | |
| | xxx | xx xxxxxxxxxx | | | | | | | |
| | | xx xxxxxxxxxx | | | | | | | |
| | | | | | | | | | |
| | xxx | Heat Exchangers | | | | | | | |
| | xxx | Heat Exchanger Information | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |

FIG. 12F

Graphic Checklist

| Failure Mode Identified | Seal Failure Analyzer Results | | 0101 | 0102 | 0103 | 0201 | 0202 | 0203 | 0204 |
|---|---|---|---|---|---|---|---|---|---|
| | | | x | | | | x | | |
| | xxx | Items Located on Heat Exchanger | | | | | | | |
| | xxx | xx xxxxxxxxxx | | | | | | | |
| | xxx | xx xxxxxxxxxx | | | | | | | |
| | xxx | Items Located on Piping to and From Heat Exchanger | | | | | | | |
| | xxx | xx xxxxxxxxxx | | | | | | | |
| | | xx xxxxxxxxxx | | | | | | | |
| | xxx | xx xxxxxxxxxx | | | | | | | |
| | | xx xxxxxxxxxx | | | | | | | |
| | xxx | xx xxxxxxxxxx | | | | | | | |
| | | xx xxxxxxxxxx | | | | | | | |
| | xxx | xx xxxxxxxxxx | | | | | | | |
| | | xx xxxxxxxxxx | | | | | | | |
| | xxx | Throat Bushings | | | | | | | |
| | xxx | Throat Bushing Information | | | | | | | |
| | xxx | xx xxxxxxxxxx | | | | | | | |
| | xxx | xx xxxxxxxxxx | | | | | | | |
| | xxx | Flow Meters | | | | | | | |
| | xxx | Flow Meter Information | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | Cyclone Separator | | | | | | | |
| | xxx | Cyclone Separator Information | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | Pressure Regulator | | | | | | | |

FIG. 12G

Graphic Checklist

| Failure Mode Identified | | | 0101 | 0102 | 0103 | 0201 | 0202 | 0203 | 0204 |
|---|---|---|---|---|---|---|---|---|---|
| | Seal Failure Analyzer Results | | x | | | | x | | |
| | xxx | Pressure Regulator Information | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | | | | | | | | | |
| | xxx | Other | | | | | | | |
| | xxx | Other Information | | | | | | | |
| | xxx | xx xxxxxxxxxx | | | | | | | |
| | | | | | | | | | |
| | | Site Inspection | | | | | | | |
| | | | | | | | | | |
| | xxx | Pipe Strain | | | | | | | |
| | xxx | xx xxxxxxxxxx | | | | | | | |
| | xxx | xx xxxxxxxxxx | | | | | | | |
| | xxx | Base Plate Rigidity | | | | | | | |
| | xxx | xx xxxxxxxxxx | | | | | | | |
| | xxx | xx xxxxxxxxxx | | | | | | | |
| | | | | | | | | | |
| | Equipment Inspection | | | | | | | | |
| | | | | | | | | | |
| | xxx | Verification of Settings | | | | | | | |
| | xxx | xx xxxxxxxxxx | | | | | | | |
| | xxx | xx xxxxxxxxxx | | | | | | | |
| | | | | | | | | | |
| | | | | | | | | | |
| | | Motor | | | | | | | |
| | xxx | Motor Information | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | | | | | | | | | |
| | xxx | Coupling | | | | | | | |
| | xxx | Coupling Information | | | | | | | |
| | xxx | xx xxxxxxxxxx | | | | | | | |
| | | | | | | | | | |
| | | | | | | | | | |

FIG. 12H

Graphic Checklist

| Failure Mode Identified | | | 0101 | 0102 | 0103 | 0201 | 0202 | 0203 | 0204 |
|---|---|---|---|---|---|---|---|---|---|
| | Seal Failure Analyzer Results | | x | | | | x | | |
| | xxx | xx xxxxxxxxxx | | | | | | | |
| | xxx | xx xxxxxxxxxx | | | | | | | |
| | xxx | xx xxxxxxxxxx | | | | | | | |
| | | | | | | | | | |
| | xxx | Bearings | | | | | | | |
| | xxx | Bearing Information | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | | | | | | | | | |
| | xxx | Oil Seals | | | | | | | |
| | xxx | Oil Seal Information | | | | | | | |
| | | | | | | | | | |
| | Seal Design Analysis | | | | | | | | |
| | xxx | Seal Design Analysis | | | | | | | |
| | xxx | Seal Design Information | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | | | | | | | | | |
| | Equipment Design Analysis | | | | | | | | |
| | xxx | Equipment Design Analysis | | | | | | | |
| | | xx xxxxxxxxxx | | | | | | | |
| | | xx xxxxxxxxxx | | | | | | | |
| | | | | | | | | | |
| | System Design Analysis | | | | | | | | |
| | xxx | System Design Analysis | | | | | | | |
| | | | | | | | | | |

*FIG. 12i*

Graphic Checklist

| Failure Mode Identified | | | 0101 | 0102 | 0103 | 0201 | 0202 | 0203 | 0204 |
|---|---|---|---|---|---|---|---|---|---|
| | Seal Failure Analyzer Results | | x | | | | x | | |
| | xxx | xx xxxxxxxxxx | | | | | | | |
| | xxx | Equipment Analysis | | | | | | | |
| | xxx | Equipment Information | | | | | | | |
| | | xx xxxxxxxxxx | | | | | | | |
| | | xx xxxxxxxxxx | | | | | | | |
| | xxx | Items Located on Pump or Equipment | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | Items Located on Piping to And From Equipment | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | | Impeller Settings | | | | | | | |
| | xxx | xx xxxxxxxxxx | | | | | | | |
| | xxx | Dial Indicator Check | | | | | | | |
| | xxx | xx xxxxxxxxxx | | | | | | | |
| | xxx | Major Parts Inspection | | | | | | | |
| | xxx | Major Parts Condition | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |
| | xxx | xx xxxxxxxxxx | | | | | | | |

FIG. 12J

DELTA O-RING CARTRIDGE SEAL ASSEMBLY AND INSTALLATION INSTRUCTIONS

INTRODUCTION:

xxxxxxxxxxxxxxxxxxxxxxxxxxxxxxxxxxxxxx
xxxxxxxxxxxxxxxxxxxxxxxxxxxxxxxxxxxxxxxx
xxxxxxxxxxxxxxxxxxxxxxxxxxxxxx
xxxxxxxxxxxxxxxxxxxxxxxxxxxxxxx
xxxxxxxxxxxxxxxxxxxxx
xxxxxxxxxxxxxxxxxxxxxxxxxxxxxxx
xxxxxxxxxxxxxxxxxxxxxxxxxxx
xxxxxxxxxxxxxxxxxxxxx

SAFETY NOTES:

xxxxxxxxxxxxxxxxxxxxxxxxxxxxxxxxxxxx
xxxxxxxxxxxxxxxxxxxxxxxxxxx
xxxxxxxxxxxxxxxxxxx
xxxxxxxxxxxxxxxxxxxxxxxxxxxxxxx
xxxxxxxxxxxxx

PRIOR TO STARTING EQUIPMENT:

xxxxxxxxxxxxxxxxxxxxxxxxxxxxxxxxxxxxxxxxxxx
xxxxxxxxxxxxxxxxxxxxxxxxxxxxxxxxxx
xxxxxxxxxxxxxx
xxxxxxxxxxxxxxxxxxxxxxxxxxxxx

AFTER EQUIPMENT HAS RUN:

xxxxxxxxxxxxxxxxxxxxxxxxxxxxxxxxxxxx
xxxxxxxxxxxxxxxxxxxxxxxxxxxxxxxxxx
xxxxxxxxxxxxxxxxxxxxxxxxxxxxxxxxxx

SEAL MAINTENANCE:

xxxxxxxxxxxxxxxxxxxxxxxxxxxxxxxxxxxx
xxxxxxxxxxxxxxxxxxxxxxxxxxxxxxxxxx
xxxxxxxxxxxxxxxxxxxxxxxxxxxxxxxxxx

DELTA QUALITY ASSURANCE:

xxxxxxxxxxxxxxxxxxxxxxxxxxxxxxxxxxxx
xxxxxxxxxxxxxxxxxxxxxxxxxxxxxxxxxx
xxxxxxxxxxxxxxxxxxxxxxxxxxxxxxxxxx

FIG. 13A

EQUIPMENT PREPARATION INSTALLATION

SHAFT/SEAL EXAMINATION:

xxxxxxxxxxxxxxxxxxxxxxxxxxxxxxxxxxxxxxxxxxx
xxxxxxxxxxxxxxxxxxxxxxxxxxxxxxxxxxxxxxxx
xxxxxxxxxxxxxxxxxxxxxxxxxxxxx
xxxxxxxxxxxxxxxxxxxxxxxxxxxxxxxxxxx
xxxxxxxxxxxxxxxxxxxxxxxxxx

STUFFING BOX/SEAL CHAMBER EXAMINATION:

xxxxxxxxxxxxxxxxxxxxxxxxxx
xxxxxxxxxxxxxxxxxxxxxxxxxxxxxxxx
xxxxxxxxxxxxxxxxxxxxxxxxxxx

PUMP/DRIVER ALIGNMENT:

xxxxxxxxxxxxxxxxxxxxxxxxxxxxxxxxxxx
xxxxxxxxxxxxxxxxxxxx

INSTALLING THE SEAL:

xxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxx
xxxxxxxxxxxxxxxxxxxxxxxxxxxxxxxxxxxxxxxxx
xxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxx
xxxxxxxxxxxxxxxxxxxxxxxxxxxxxxxxxxxxxxxxx
xxxxxxxxxxxxxxxxxxxxxxxxxxxxxxxxxxxxxxxxxxxx
xxxxxxxxxxxxxxxxxxxxxxxxxxxxxxxxxxxx
xxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxx
xxxxxxxxxxxxxxxxxxxxxxxxxxxxxxxxxxx
xxxxxxxxxx
xxxxxxxxxxxxxxxxxxxxxx
xxxxxxxxxxxxxxxxxxxxxxxxxxxxxxxxxxxxxxxxxxxxxxx
xxxxxxxxxxxxxxxxxxxxxxxxxxxxxxxxxxxxx
xxxxxxxxxxxxxxxxxxxxxxxxxxxxxxxxxxxxxxx
xxxxxxxxxxxxxxxxxxxxxxxxxxxxxxxxxxxxxxxxxx
xxxxxxxxxxxxxxxxxxxxxxxxxxxxxxxxxxxxxx

FIG. 13B

TYPICAL STYLE SEAL ARRANGEMENT

Seal Cutaway

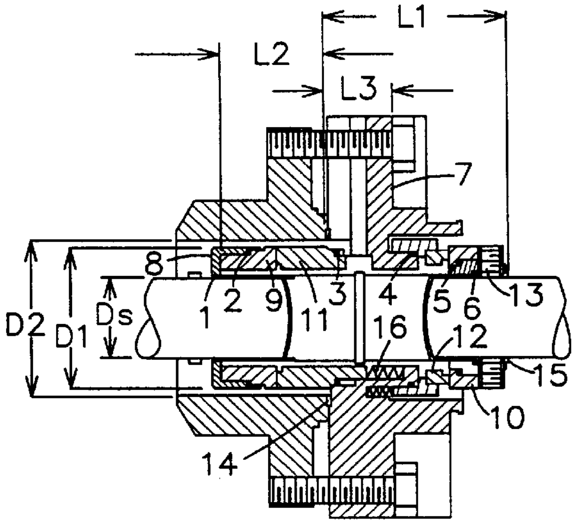

Seal Cutaway/Part Identification Key

| Item | Description | Part Number |
|---|---|---|
| 1 | XXXXX | |
| 2 | XXXXX | |
| 3 | XXXXX | |
| 4 | XXXXX | |
| 5 | XXXXX | |
| 6 | XXXXX | |
| 7 | XXXXX | |
| 8 | XXXXX | |
| 9 | XXXXX | |
| 10 | XXXXX | |
| 11 | XXXXX | |
| 12 | XXXXX | |
| 13 | XXXXX | |
| 14 | XXXXX | |
| 15 | XXXXX | |
| 16 | | |
| 17 | XXXXX | |
| 18 | | |
| 19 | | |
| 20 | | |

Gland Front View/Piping Arrangement

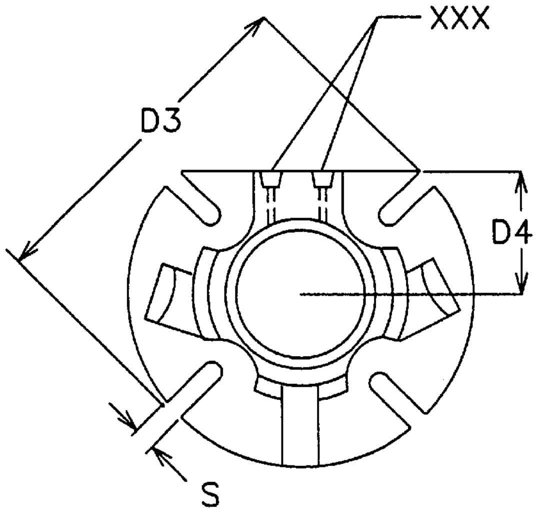

XXXXXXXXXXXXXXX

Additional Products

Suggested Environmental Controls

API Plan 52 API Plan

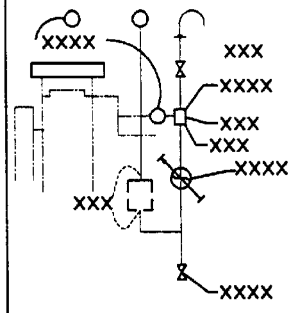

Plan 52
XXXXXXXXXXXXXXXXX
XXXXXXXXXXXXXXXXX
Heating/Cooling Plan

*FIG. 13C*

Piping Details

DOUBLE CARTRIDGE SEAL MODELS xxxxxxxxxxxxxxxxxxxxxxxxxxxxxxxxxxxxxxxxxxxxxxx
xxxxxxxxxxxxxxxxxxxxxxxxxxxxxxxxxxxx
xxxxxxxxxxxxxxxxx CONVECTION TANK SYSTEMS (API PLAN 52 AND 53, ETC.) PUMPING RING MODELS ARE RECOMMENDED xxxxxxxxxxxxxxxxxxxxxxxxxxxxxxxxxxxxxxxx

WHEN TWO PORTS ARE POSITIONED SIDE BY SIDE ON ONE SURFACE:

PORTS POSITIONED AT 12:00 O'CLOCK(PREFERRED POSITION):

xxxxxxxxxxxxxxxxxxxxxxxxxxxxxxxxxxxxxxxxxxxxxxxxxxx
xxxxxxxxxxxxxxxxxxxxxxxxxxxxxxxxxxxxxxx
xxxxxxxxxxxxxxxxxxxxxxxxxxxxxxx
xxxxxxxxxxxxxxxxxxxxxxxxxxxx

PORTS POSITIONED ON RIGHT SIDE AT 3:00 O'CLOCK:

xxxxxxxxxxxxxxxxxxxxxxxxxxxxxxxxxxxxxxxxxxx
xxxxxxxxxxxxxxxxxxxxxxxxxxxxxxxxxxx
xxxxxxxxxxxxxxxxxxxxxxxxxxx

PORTS POSITIONED ON LEFT SIDE AT 9:00:

xxxxxxxxxxxxxxxxxxxxxxxxxxxxxxxxxxxxxxxxxxxxxxx
xxxxxxxxxxxxxxxxxxxxxxxxxxxxxxxxxx
xxxxxxxxxxxxxxxxxxxxxxxxxxxxxxxx xxxxxxxxxxxxxxxxxxxxxxxxxxxxxxxxxxxxxx

*FIG. 13D*

SUPPLY TANK/CONVECTION TANK SYSTEM INFORMATION FOR API PLAN 52

SUPPLY TANK ASSEMBLIES XXXXXXXXXXXXXXXXXXXXXXXXXXXXXXXX
XXXXXXXXXXXXXXXXXXXXXXXXXXXXXXXXXXXXXXXXXXXXXXX

SUPPLY TANK SEALING SYSTEMS OFFER THE FOLLOWING ADVANTAGES

- XXXXXXXXXXXXXXXXXXXXXXXXXXX
  XXXXXXXXXXXXXXXXXXXXXXXXXXX
  XXXXXXXXXXXXXXXXXXXXXXXXXXX

API PLAN 52-TANDEM SEAL SYSTEM: XXXXXXXXXXXXXXXXXXXXXX
XXXXXXXXXXXXXXXXXXXXXXXXXXXXXXXX

COOLING FOR DUAL SEAL ARRANGEMENTS:

XXXXXXXXXXXXXXXXXXXXXXXXXXXXXXXXXXXX
XXXXXXXXXXXXXXXXXXXXXXXXXXXXX
XXXXXXXXXXXXXXXXXXXXXXXXXXXXXXXXXXXXX

TYPICAL PIPING SCHEMATIC

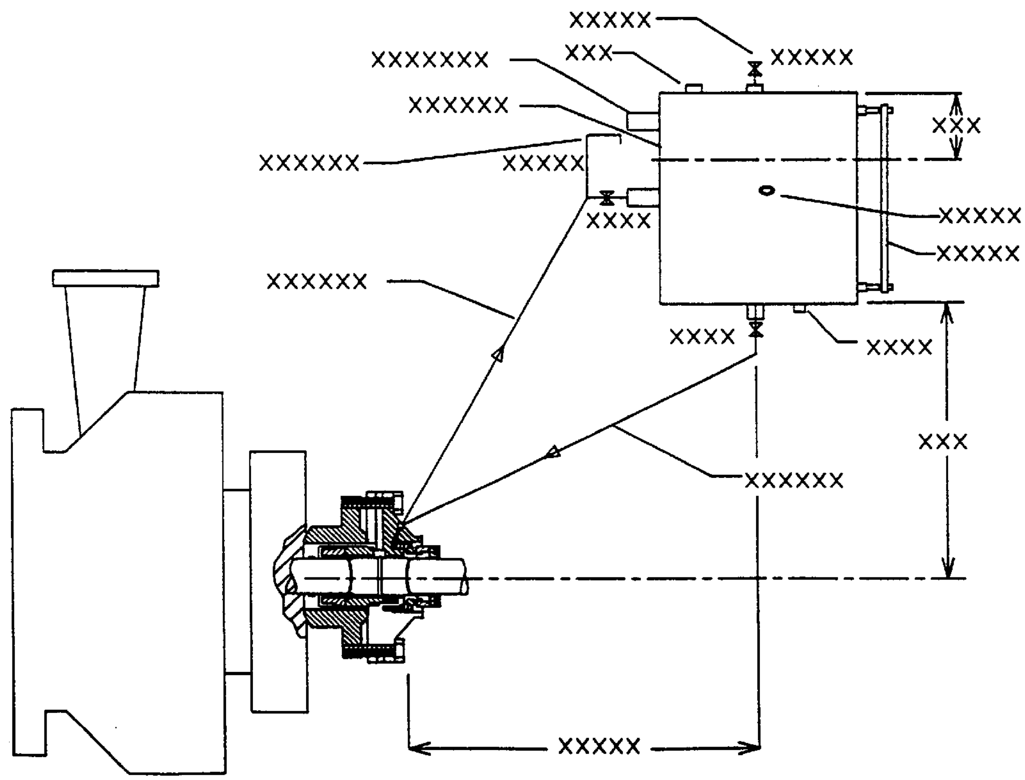

FIG. 13E

PIPING AND FITTINGS MATERIAL LIST:

xxxxxxxxxxxxxxxxxxxxxxxxxxxxxxxxxxxxxxxxxx
xxxxxxxxxxxxxxxxxxxxxxxxxxxxxxxxxxxxxxxxxxxxxx
xxxxxxxxxxxxxxxxxxxxxx

INSTALLATION AND STARTUP:

xxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxxxxxx
xxxxxxxxxxxxxxxxxxxxxxxxxxxxxxxxxxxxxxxxx
xxxxxxxxxxxxxxxxxxxxxxxxxxxxxxxxxxxxxxxxxxx
xxxxxxxxxxxxxxxxxxxxxxxxxxxxxxxxxxxxxxxx
xxxxxxxxxxxxxxxxxxxxxxxxxxxxxxxxxxx
xxxxxxxxxxxxxxxxxxxxxxxxxxxxxxxxxxxxxxxxx
xxxxxxxxxxxxxxxxxxxxxxxxxxxxxxxxxxxxx
xxxxxxxxxxxxxxxxxxxxxxxxxxxx
xxxxxxxxxxxxxxxxxxxxxxxxxxxxxxxxxxxxxxxxxxxxx
xxxxxxxxxxxxxxxxxxxxxxxxxxxxxxxxxxxxxxxxxx

SYSTEM VENTING PROCEDURE:

xxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxxxxx
xxxxxxxxxxxxxxxxxxxxxxxxxxxxxxxxxxxxx
xxxxxxxxxxxxxxxxxxxxxxxxxxxxxxxxxxxxxxxxxxx
xxxxxxxxxxxxxxxxxx
xxxxxxxxxxxxxxxxxxx
xxxxxxxxxxxxxxxxxxxxxxxxxxxxx
xxxxxxxxxxxxxxx

STARTUP:

xxxxxxxxxxxxxxxxxxxxxxxxxxxxxxxxxxxxxxxxxxxxxxx
xxxxxxxxxxxxxxxxxxxxxxxxxxxxxxxxxxxxx
xxxxxxxxxxxxxxxxxxxxxxxxxxxxxxxxxxxxxxxxx
xxxxxxxxxxxxxxxxxxxxxxxxxxxxxxxxxxxxxxxxxxxxxxxxxxxxxxxxxxx
xxxxxxxxxxxxxxxxxxxxxxxxxxxxxxxxxxxxxxxxx
xxxxxxxxxxxxxxxxxxxxxxxxxxxxxxxxxxxxxxxxxxx
xxxxxxxxxxxxxxxxxxxxxxxxxxx

FIG. 13F

Assign Department

| Key<br>xxx xxx xxx<br>xxx xxx xxx<br>xxx xxx<br>xxx xxx<br>Tasks(In Order Performed) | View Task | System Recommends Task | Tasks Recommended By Reliability Manager Click on "x" to remove from task list | Dept. or group Recommended by system to perform task | Dept. or group Recommended By Reliability manager to perform task Change if desired | Person Recommended By Reliability manager to perform task |
|---|---|---|---|---|---|---|
| xxx xxxxxxxxxxx | | x | x | 4 | 4 | |
| xxx xxxxxxxxxxx | | x | x | 4 | 4 | |
| xxx xxxxxxxxxxx | | x | x | 4 | 4 | |
| xxx xxxxxxxxxxx | | x | x | 4 | 4 | |
| | | | | | | |
| Items located in piping to and from equipment | | | | | | |
| xxx xxxxxxxxxxx | | x | x | 4 | 4 | |
| xxx xxxxxxxxxxx | | x | x | 4 | 4 | |
| xxx xxxxxxxxxxx | | x | x | 4 | 4 | |
| xxx xxxxxxxxxxx | | x | x | 4 | 4 | |
| xxx xxxxxxxxxxx | | x | x | 4 | 4 | |
| xxx xxxxxxxxxxx | | x | x | 4 | 4 | |
| | | | | | | |
| Hydraulic problems identified (300 series) | | | | | | |
| xxx xxxxxxxxxxx | | x | x | 4 | 4 | |
| | | | | | | |
| Critical Seal Failure Information Analysis | | | | | | |
| xxx xxxxxxxxxxx | | | | | | |
| xxx xxxxxxxxxxx | | | | | | |
| xxx xxxxxxxxxxx | | | | | | |
| xxx xxxxxxxxxxx | | | | | | |
| | | | | | | |
| Mechanical Seal Additional Information | | | | | | |
| xxx xxxxxxxxxxx | | | | | | |
| xxx xxxxxxxxxxx | | | | | | |
| xxx xxxxxxxxxxx | | | | | | |
| xxx xxxxxxxxxxx | | | | | | |
| | | | | | | |
| General Seal Temperature Information | | | | | | |
| xxx xxxxxxxxxxx | | | | | | |
| xxx xxxxxxxxxxx | | | | | | |
| xxx xxxxxxxxxxx | | | | | | |
| xxx xxxxxxxxxxx | | | | | | |
| Double Seals Only | | | | | | |
| xxx xxxxxxxxxxx | | | | | | |
| xxx xxxxxxxxxxx | | | | | | |
| xxx xxxxxxxxxxx | | | | | | |
| | | | | | | |
| xxx xxxxxxxxxxx | | | | | | |
| xxx xxxxxxxxxxx | | | | | | |
| xxx xxxxxxxxxxx | | | | | | |

*FIG. 15*

APPARATUS AND METHOD FOR MONITORING AND MAINTAINING PLANT EQUIPMENT

This is a continuation of pending application Ser. No. 09/255,511, filed Feb. 22, 1999.

BACKGROUND

A mechanical seal is a shaft sealing device that contains process fluids within a pump or other type of rotating equipment. There are generally three types of mechanical seals: component seals made of several pieces; cartridge seals, made of one piece; and split seals. Cartridge seals generally are preferred over component seals because cartridge seals may be installed without significant training and may be tested before shipping to ensure reliability.

Pumps and mechanical seals are utilized by many industries and serve a variety of functions by moving process fluids throughout a plant. For example, pulp and paper manufacturing, chemical processing, petroleum, chemical and oil refining, utilities, and food processing, are among the more significant industries that utilize significant numbers of pumps and associated mechanical seals. Within a large processing plant there may be thousands of different pumps and associated seals, moving a variety of process fluids throughout the plant. The loss of any individual pump within the plant may cause a degradation in the plant output, profitability and efficiency. It also is common for a plant to be reconfigured either to process different products or to provide a work around to avoid a damaged pump. This reconfiguration may result in incompatible combinations of equipment and process fluids and an increased likelihood of failure.

Proper selection, installation, maintenance, operation and failure analysis of rotating equipment, and in particular pumps and mechanical seals, within a processing plant are factors in the reliability, productivity, efficiency and profitability of a processing plant, but are difficult. For example, the selection process of a seal involves the consideration of several factors, such as the operating conditions of the pump, the process fluid to be moved, the type of pump on which the seal is to be installed, and the environmental conditions under which the pump and seal operates. Other factors include the cost and quality of the seal and its ease of installation.

The selection process typically involves a seal or pump manufacturer's trained sales engineers with factory support to ensure that a proper seal is selected. Several standards have been promulgated to establish guidelines for seal selection. These standards include the Society of Tribologists and Lubricating Engineer (STLE) SP-30 1990 and its updated version in April 1994, the CMA/STLE "Mechanical Seal Application Guide" (1994), and the American Petroleum Institute (API) Mechanical Seal Standard 1994. The sales engineer typically has training in mechanical or chemical engineering and is provided by the manufacturer with at least some of the technical data corresponding to the seal or pump products. The sales engineer's effectiveness also may relate to experience in a particular industry. For example, a sales engineer that is experienced in the petroleum industry may not be as effective as proposing solutions for a food processing plant.

Often the selection process is a manual process, prone to errors in communication and understanding between supplier and customer. In addition to communications problems, the different levels of experience among the sales engineers may lead to confusion when different sales engineers working for the same manufacturer make different recommendations based on their experience and understanding of the equipment.

Even if the selection process is accurate for given conditions, improper installation, operation or maintenance of the pump and seals may degrade the operation. A lack of trained personnel often is a factor in improper installation, operation and maintenance of a mechanical seal or pump. In particular, it is possible that a sales engineer without proper training may select an improper seal.

Performance of equipment also should be monitored. To ensure that equipment is operating with acceptable performance, a disciplined, problem solving approach to pump and seal operation and maintenance is used. This disciplined problem solving approach can be divided into eight areas.

The first area is defining an acceptable seal performance metric. By choosing a performance metric that is appropriate for an installation seal, performance can be measured and determined. A performance metric may be, for example, a federal, state, or local government regulation, e.g., limiting emissions from the seal, or the metric may be a measure of frequency or cost of failure, such as a mean time between failures.

The second area is troubleshooting the equipment in the field. Visual observations of the equipment and seal, the seal support system, the piping system, etc. can provide important information and data for later analysis. It also may be possible to provide corrective actions for solving the problem or failure without shutting the equipment down. Examples of such corrective actions include tightening gland bolts and adjusting a quench.

The third area is reviewing the current process and equipment data, along with the repair history for the equipment. This information can provide data on changing conditions that have negatively impacted seal reliability. Because the configuration of the processing plant changes often, it is difficult to maintain data about the configuration of the plant up to date. Modifications to equipment and changes to process fluids commonly occur. Processing plant reliability managers commonly do not have a convenient and timely method of determining the current state of equipment in a plant. In addition, because of the lack of information regarding the current state of equipment within the plant, the plant reliability manager often has inadequate information for cost and failure analysis. Life cycle costs (LCC) and mean time between failure (MTBF) are commonly used metrics to determine the efficiency and productivity of plant equipment. LCC involves tracking the costs associated with a particular pump and/or seal over a given period of time. MTBF involves tracking the time between failures of the particular piece of machinery. Without accurate up to date information on the current state of a piece of equipment, however, these measures cannot be computed accurately.

The fourth area is proper selection of pumps and seals. As pointed out above, seal selection generally is a technically difficult and manual process.

The fifth area is investigating the operational history of the pump and mechanical seal and related equipment. Such an investigation may reveal operating conditions that are incompatible with a seal or pump or other equipment. For example, operating conditions such as pressure, environmental or process fluid temperatures, etc. may deviate significantly from normal operating conditions. By analyzing these deviations from normal operating conditions, the cause of a failure may be determined to have been due to the operating conditions and not due to a mechanical failure. In addition to any data from instrumentation, the personnel responsible for operating the equipment may provide valuable data about any deviations that have occurred and why these deviations occurred.

The sixth area is performing seal analysis after a failure. Disassembly and inspection of a seal helps to understand the failure mode of the seal. There may be mechanical, thermal, or chemical damage to the seal. Information about the failure mode helps to understand the underlying root cause of the failure.

The seventh area is performing a root cause analysis to assign the ultimate underlying cause of the failure based on gathered failure data. The data that has been gathered is analyzed and, based on individual experience and scientific analysis, the root cause of the failure is determined.

The eighth area is implementing a corrective action plan and providing drawings, installation, operation procedures and training to personnel. Monitoring the work performed and updating the equipment databases also may be included in an action plan.

Failure analysis of a rotating equipment therefore is a complex and difficult activity. Often, the processing plant is dependent upon the seal or pump manufacturer to aid in this analysis. The involvement of a manufacturer in the analysis of the cause of a failure of equipment may lead to biased results.

There are other problems with current methods of failure analysis. Even without bias, the analysis is still dependent upon knowledge and experience of the analyst, and thus involves training and retaining personnel. Failure analysis performed in a plant also may fail to consider the pump and seal as part of a system, because a failure typically is examined as an isolated event independent of other considerations. Because of the level of human involvement in the failure analysis, the analysis tends to be experiential rather than scientific. Thus, the analysis is only as good as the experience and insight of the people involved. Without a disciplined approach to gathering data and a scientific basis for analysis, only the symptoms of the failure are addressed and not the underlying root cause of the problem.

SUMMARY

The various limitations of the conventional mechanical seal failure analysis methods are overcome by providing a scientifically based process for gathering, synthesizing, and analyzing data relating to equipment failure. In particular, data indicating the current state of the equipment is gathered and verified prior to a failure occurring so that accurate information is available. After a failure or problem occurs, data about the problem or failure are methodically gathered to aid in the scientific determination of the root cause of the failure. In particular, visual images of failure modes are provided to the user to ensure that proper and accurate data are obtained. A user also is directed to gather other data about the failure and the system. After data relating to the problem or failure has been gathered, the data are synthesized and a scientific analysis is performed to determine the root cause of the failure or problem. These various methods and apparatus allow a non-specialist to properly identify and diagnose a failure or problem associated with a mechanical seal and pump.

After the root cause of the problem or failure in the system has been determined, the system suggests corrective actions and plans for implementing a corrective action. Installation instructions, training and safety information can be provided to the user to ensure proper execution of the selected corrective action.

A plant reliability manager also may monitor progress and verify that installation, maintenance and failure correction are performed correctly. The plant reliability manager also may track problems or failures by each individual or department to determine if additional training is needed.

In one aspect, a method for analyzing leakage in a piece of rotating equipment involves providing a user with data representative of a plurality of failure modes corresponding with the piece of rotating equipment. Data representative of at least one failure mode that corresponds to the failure in the piece of rotating equipment is received from the user. The selected data is analyzed to determine a root cause data. The root cause data is analyzed to determine corrective action data. Stored data characterizing the piece of rotating equipment is updated with data indicative of the root cause and corrective action.

In another aspect, a method is disclosed of analyzing a plant performance utilizing failure analysis data corresponding to a piece of rotating equipment. The method involves determining a responsible party for undertaking corrective action, tracking the reliability of the responsible party for undertaking the corrective action in subsequent failures of the piece of rotating equipment, tracking subsequent failures of the corrective action taken in subsequent failures of the piece of rotating equipment, determining maintenance data for quantifiably determining the reliability of the piece of rotating of equipment, and storing the maintenance data corresponding to the piece of rotating equipment.

In another aspect, a method for generating a proposal for replacement parts required to take a corrective action to resolve a failure of a piece of rotating equipment involves providing data indicative of a corrective action to be undertaken to resolve a failure in the piece of rotating equipment, providing a template for the data, creating a report by placing the data indicative of a corrective action into the template, and preparing the report for transmission is disclosed.

In another aspect, an apparatus is disclosed for analyzing a failure in mechanical seal. The apparatus comprises an equipment data module storing data indicative of a characteristic of a piece of rotating equipment, a problem/failure database storing problem/failure data indicative of a characteristic of a failure mode of a mechanical seal associated with the piece of rotating equipment, a seal failure analysis module receiving input data indicative of a characteristic of a failure of a particular mechanical seal associated with a particular piece of equipment. The seal failure analysis module is coupled to the problem/failure database and queries the problem/failure database for failure mode data corresponding to the input data and receives a query response of data indicative of a failure mode of the particular mechanical seal. The seal failure analysis module also is coupled to the equipment data module, and provides the equipment data module with data indicative of the failure mode of the particular mechanical seal to be associated and stored with the particular piece of equipment. A data analyzer is coupled to the seal failure analysis module and receives data from the seal failure analysis module indicative of a failure mode of the particular mechanical seal. The data analyzer is coupled to the problem/failure database and queries the problem/failure database with the failure mode of the particular mechanical seal and receives query response data indicative of a root cause of the failure mode of the particular mechanical seal.

In another aspect, an apparatus for performing failure analysis on a piece of equipment includes an equipment database containing data indicative of the characteristics of a piece of equipment, and a database of system failure mode data. A first data input module coupled to the database of system failure mode data receives data indicative of a failure mode of the particular piece of equipment and has an input of an observed failure data and provides a first query as to the data indicative of the failure mode of the particular piece of equipment that corresponds to the observed failure data and receives data corresponding to the first query. A second data input module provides a second query as to a condition extant in the failure of the mechanical seal and receives data corresponding to the second query results. The second data gathering module provides output data indicative of the condition extant in the failure of the particular piece of equipment. A system failure analyzer receives the data corresponding to the first and second queries and associates the data corresponding to the first and second query. The system failure analyzer selects data indicative of a failure mode of the particular piece of equipment that corresponds to the association of the first and second query results.

In another aspect, a method for providing information regarding plant reliability involves storing the information regarding plant reliability as a searchable collection of information, receiving requests for information regarding rotating equipment in the plant, accessing the collection of information to retrieve the information for the rotating equipment, and sending the retrieved information.

In another aspect, a method for directing requests for quotes regarding equipment relating to rotating equipment between plants containing the rotating equipment and sources of service, sales or manufacture, of rotating equipment involves receiving information provided by the plant defining the request for quote, accessing a database in response to the request for quote to retrieve data to prepare a quote, preparing the quote using the retrieved data, and sending the prepared quote to the plant.

In another aspect, a method for detecting design deficiencies involves receiving input data corresponding to a piece of equipment, receiving problem/failure data associated to the piece of equipment, comparing the input data with the problem/failure data and providing an indication of a positive match, providing the matched input data and the problem/failure data as an output, and storing the problem/failure data and associating the problem failure data with the piece of equipment.

These and other aspects and advantages of the present invention are set forth in the following detailed description.

BRIEF DESCRIPTION OF THE DRAWINGS

Illustrative embodiments will be described by way of example with reference to the accompanying drawings, in which:

FIGS. 4*a*–4*g* are a representation of a screen display which prompts a user to enter customer information and equipment information;

FIG. 8 is a schematic representation of data stated in the problem/failure database according to one embodiment of the failure analysis system shown in FIG. 1;

FIGS. 10*a*–10*b* are example visual images used in the system analyzer processor according to one aspect of the failure analysis system as shown in FIG. 1;

FIGS. 11*a*–11*f* are a representation of a screen display which prompts a user to enter equipment information and operating environment information;

FIGS. 12*a*–12*j* are a representation of the data utilized by one embodiment of the system:

FIGS. 13*a*–13*g* are a representation of a screen display that provides a user with installation, training and safety instructions according to one aspect of the failure analysis system as shown in FIG. 1;

FIG. 15 is a representation of a screen display providing a user with plant performance information according to one aspect of the failure analysis system as shown in FIG. 1;

DETAILED DESCRIPTION

Failure analysis of rotating equipment is performed using a computer system that guides data collection, synthesizes collected data, and automates data analysis for analyzing failure of the rotating equipment. Rotating equipment includes pumps and seals and associated parts. Examples of associated parts include the drive motor, any mechanical coupling, bearings, mechanical packing, environmental controls, supply tanks, flow meters, throat bushings in stuffing box, heat exchangers, cyclone separators, pressure regulators, low level alarms, and pressure switches. The computer system automates the root cause analysis of the failure using a methodical process of data collection and analysis. A corrective action corresponding to the root cause of the failure for repairing or replacing the rotating equipment also is determined. The computer system also provides an automated Request for Quote (RFQ) function through which the computer system provides engineering and other data to suppliers or consultants. These suppliers or consultants may respond electronically to the RFQ with recommendations, price quotes, or actual offers for sale of equipment to undertake the corrective action. The computer system also may provide installation instructions, engineering drawings, safety data, and training information for personnel. The apparatus also may provide plant performance data, for example for the system, equipment and personnel. Quantifiable plant performance data for the system, equipment and personnel can be obtained by tracking failures of individual pieces of equipment, and by tracking the work performed by individual departments and the individuals within those departments. Thus, the personnel responsible for the installation, operation, maintenance and repair of rotating equipment provide the data for assessing plant performance. The collected performance data may be analyzed so that problems in equipment, training or performance may be identified and addressed.

Figure 1:
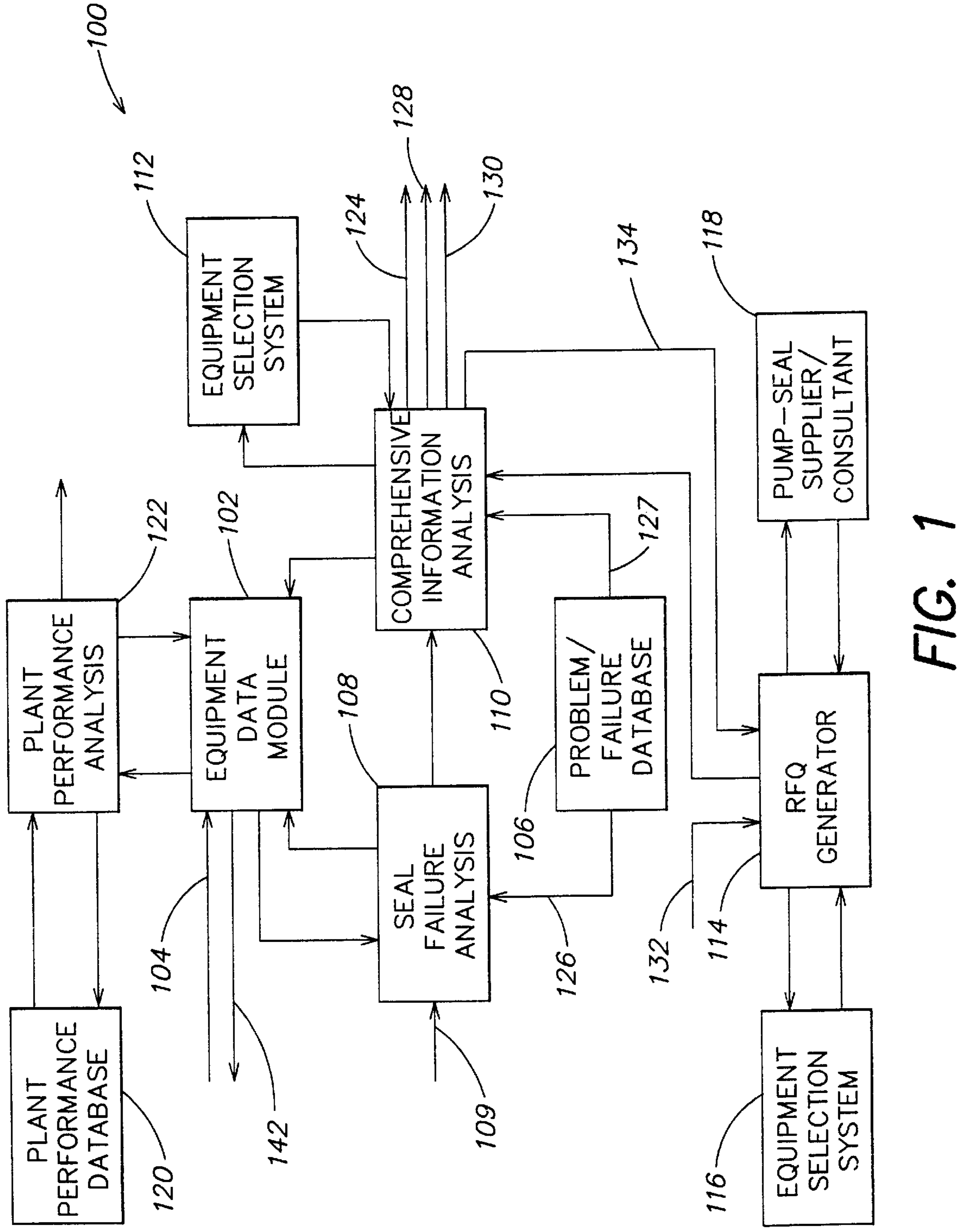
FIG. 1 is a block diagram of a failure analysis system according to one embodiment.

FIG. 1 shows a block diagram of one embodiment of a plant reliability system 100. As will be explained in more detail below, equipment data module 102 stores data indicative of, for example, the characteristics of a piece of equipment, the operational environment in which the equipment operates, and the maintenance history and life cycle costs associated with a piece of equipment. New equipment data, or changes to existing equipment data, are provided to the equipment data module through input 104. Output 142 can provide a user or external device with an output of all or a part of the stored data associated with a piece of equipment. As will be explained in more detail below, the problem/failure database 106 includes a comprehensive listing of failure modes that may be associated with equipment failures, problems, or other leakage modes of auxiliary equipment attached to the mechanical seal or pump, a list of root causes corresponding to the various failure modes, and a list of corrective actions corresponding to the list of root causes. Thus, if data indicates a characteristic of a failure of rotating equipment, a failure mode can be identified, a root cause of the failure mode can be determined, and a corrective action can be determined to correct the failure.

The seal failure analysis module 108 receives data indicative of the characteristics of the failure or problem through input 104. As will be explained in more detail below, this data may include failure mode data or data collected by the user about the rotating equipment. The seal failure analysis module 108 is coupled to the problem/failure database 106 via connection 126 and receives the problem/failure data from the data base 106. The problem/failure data that is most consistent with the input data is selected. The seal failure analysis module 108 determines the failure mode from the problem/failure analysis data. A comprehensive information analysis module 110 receives the failure mode data for further analysis. The comprehensive information analysis module 110 accesses the problem/failure database 106 through connection 127 and selects at least one root cause of the failure corresponding to the identified failure mode which is provided on output 124. Data indicative of a proposed corrective action corresponding to the identified root cause can be provided on data output 126. Data for implementing the corrective action is output at 128.

A request for quote generator (RFQ) module 114 also may be provided to forward engineering data to a consultant or seal or pump supplier 118 or an external equipment seal selection program 116 such as that described in U.S. patent application Ser. No. 09/179,506, filed Oct. 27, 1998, and assigned to Northeast Equipment, Inc. and which is hereby incorporated by reference. The engineering data can be provided by an external source on input 132, or may be provided by the comprehensive information analysis module 110 on input 134. As will be explained in more detail below, the RFQ module 114 formats and provides the engineering data in a standard format to a supplier or consultant 118, or to an equipment selection system 116. The results and recommendations then may be provided to the comprehensive information analysis module 110 and utilized for determining the corrective action and for planning the proper implementation plan for the corrective action.

A plant performance analysis module 122 is coupled to the equipment data module 102 and the plant performance database 120. As will be explained in more detail below, the plant performance analysis module 122 utilizes the data associated with a piece of equipment stored in the equipment data module to provide quantitative data about the performance of both the equipment and the personnel.

Figure 2:
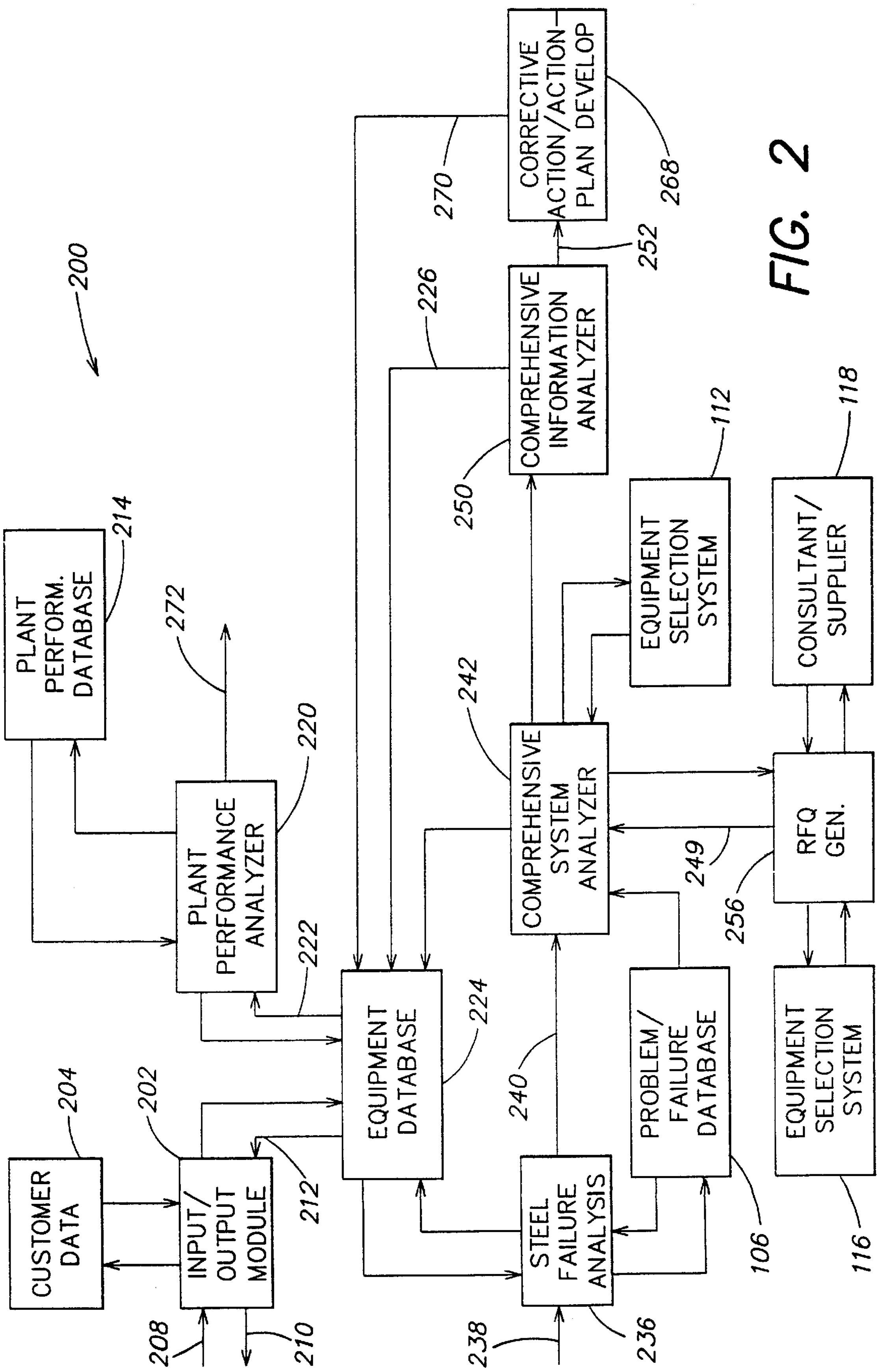
FIG. 2 is a more detailed block diagram of a failure analysis system shown in FIG. 1.

FIG. 2 shows a more detailed block diagram of a failure analysis system 200 according to one embodiment. A customer and equipment data input/output module 202 receives data 208 indicative of customer identifying data, or newly installed, modified, or repaired equipment data. The customer data is provided to the customer database 204 to be stored along with other information associated with the customer. Example customer data includes the name, address, phone and fax numbers, e-mail address, user identification and passwords. In one embodiment a purchase history, details of the customer's preferences, and any other data may be included. The input equipment data may be entered into the equipment data database 224 for storage with other data associated with a piece of equipment. The input module also may provide query data to the equipment database to retrieve all or part of the equipment profile data stored in the equipment database 224 over connection 212. The input module also provides data 210 that is indicative of the equipment profiles stored within the equipment database 224 to a user or other external system.

A seal failure analysis module 236 receives an input 238 of equipment failure data and in one embodiment queries and receives all or part of the data stored in the problem/failure database 106 that is indicative of an equipment failure mode. The seal failure analysis module 236 receives observed failure mode data via input 238, which is compared to the failure mode data stored in the problem/failure database 106. The failure mode data corresponding to the observed failure data is selected and provided on output 240 to the comprehensive system analyzer module 242. The seal failure analysis mode 236 also may provide the failure mode data to the equipment database to be stored with data associated with the rotating equipment that has failed.

The comprehensive system analyzer 242 receives the failure mode data from the seal failure analysis module 236 over connection 240. The comprehensive system analyzer 242 collects the failure mode data, other observed failure data, and any other data associated with the failed equipment that may be stored in the equipment database 224. The comprehensive system analyzer 242 then synthesizes this data into a coherent data set and provides this collection of failure data to the comprehensive information analyzer 250.

The comprehensive information analyzer module 250 uses the synthesized failure data received from the comprehensive system analyzer 242 to determine the root cause of the failure. The data/information processor determines the cause data corresponding to the one or more failure modes determined by the seal failure analysis module 236. As will be explained below, in one embodiment, a probability weight may be assigned to the various root causes determined to aid a user in deciding upon which root cause to correct. In this way, one or more root causes may be suggested and, in one embodiment may be ranked by likelihood of occurrence. The comprehensive information analyzer 250 provides this root cause data to the corrective action plan development module 268 via input 252 and to the RFQ process module 256. The RFQ generator module 256, as explained in more detail below, provides engineering data to a supplier, consultant or automated equipment selection system. In response, the RFQ generator module 256 can provide data on a proper selection of equipment and corrective actions via output 249. The comprehensive information analyzer module 250 also may provide data indicative of the root cause of the equipment failure to the equipment database 224 via output data 226 in order to update the data profile associated with the equipment.

In another embodiment the comprehensive information analyzer 250 may be coupled to an automated equipment selection system 112, such as a seal selection system. In this embodiment, the automated equipment selection system receives the root cause data and returns specifications for equipment. The corrective action/action plan development module 268 then determines an action plan corresponding to the root cause data and provides this corrective action data via output 270. The action plan is designed to correct the root cause of the failure identified by the comprehensive information analyzer module 250.

Additionally, in one embodiment, a plant performance analyzer module 220 is coupled to a plant performance reliability database 214 and receives input data from the plant performance reliability database 214 that includes maintenance data, operations data, engineering data, and process changes to the corresponding equipment profile data stored in the equipment database 224. The plant performance analyzer module 220 also receives data via input 222 that is indicative of equipment data profiles stored in the equipment database 224. As will be explained in more detail below, the plant performance analyzer module 220 includes data on output 272 indicative of the analyzed and quantified plant reliability data stored within the plant performance database 214.

Figure 3A:
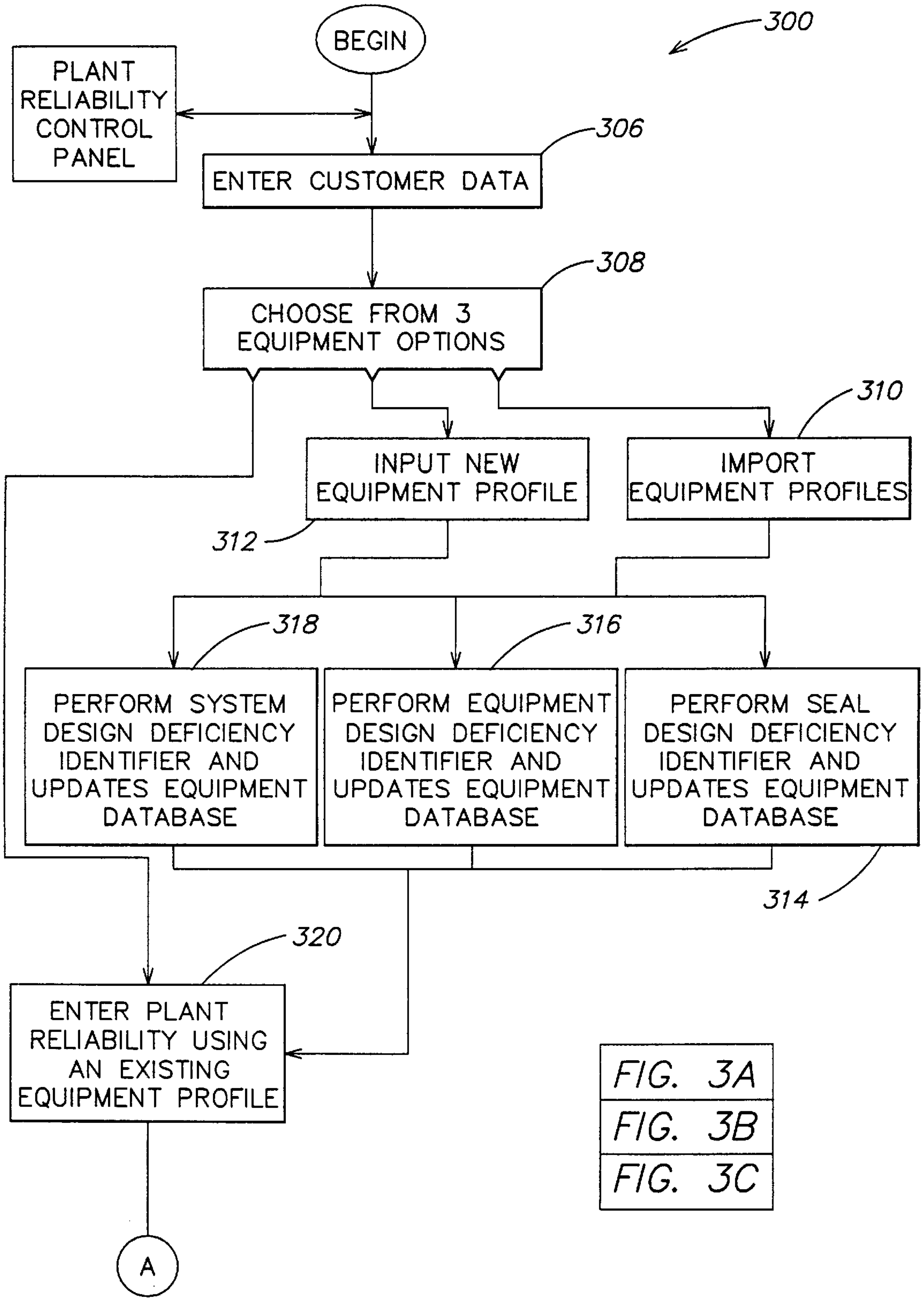
FIGS. 3*a* and 3*b* together comprise a flowchart illustrating, according to one embodiment, a process performed by the failure analysis system shown in FIG. 1.
Figure 3B:
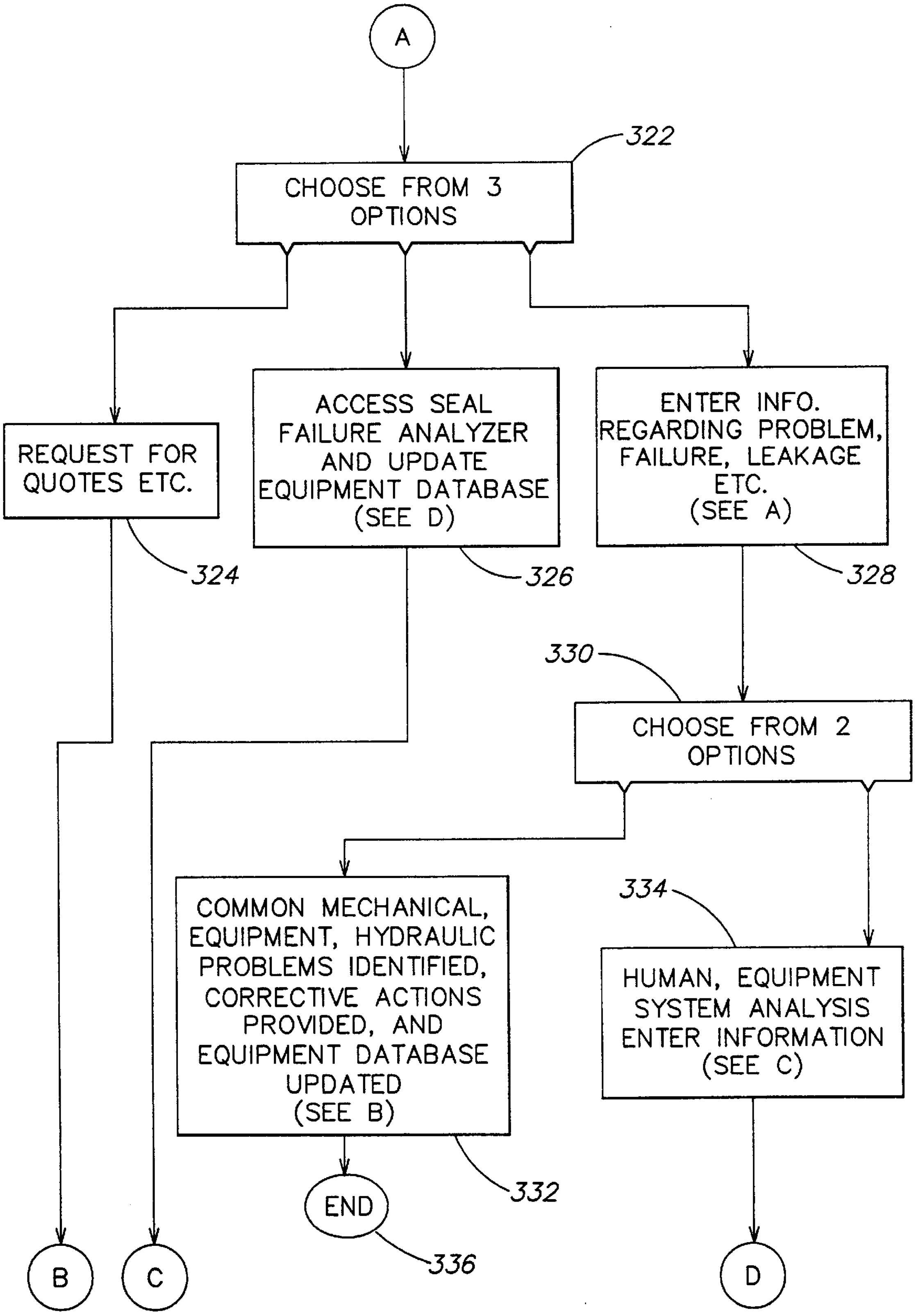
Figure 3C:
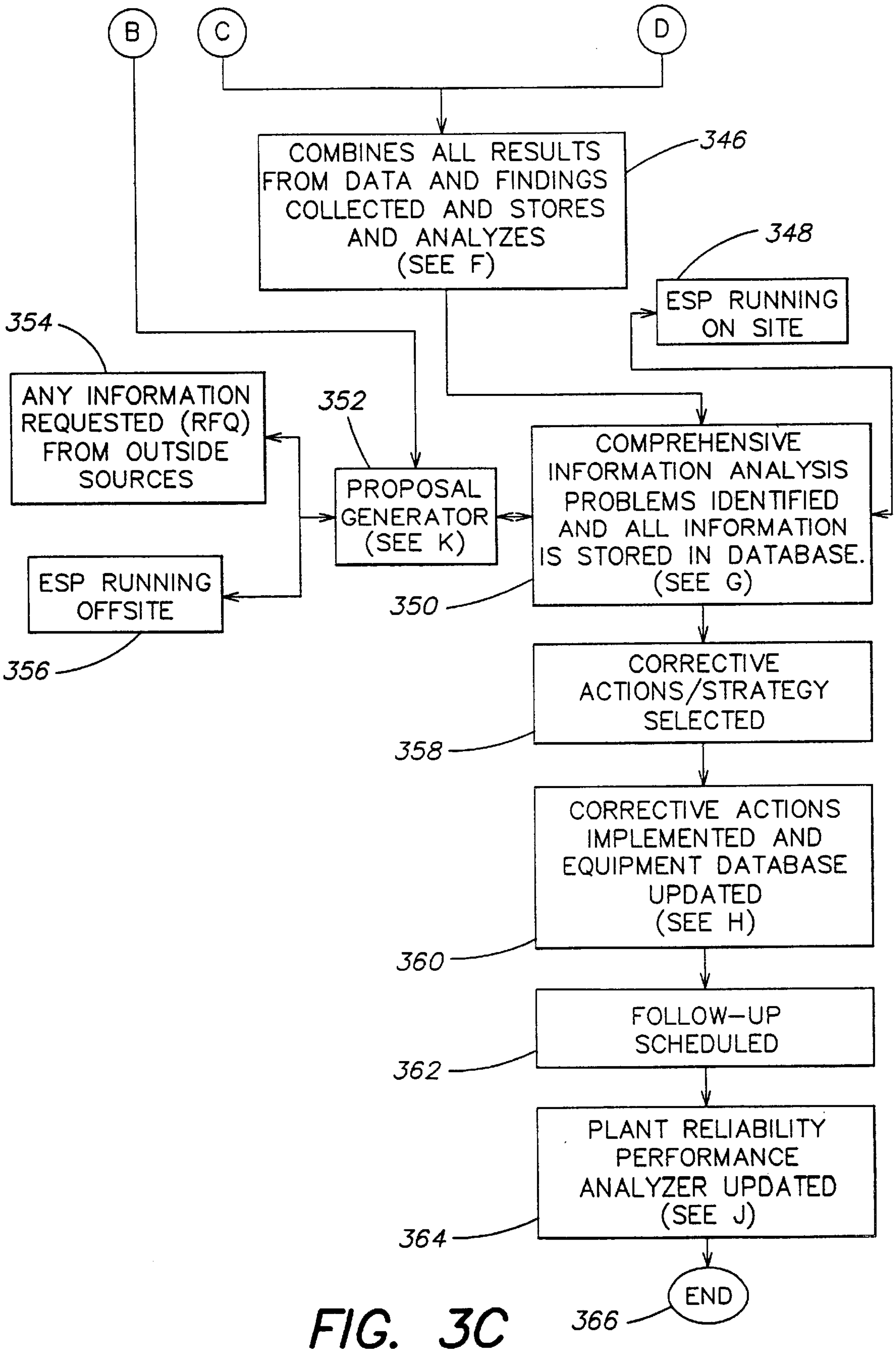

FIGS. 3A and 3B together comprise a flow chart illustrating, according to one embodiment, a process performed by the failure analysis system shown in FIG. 1. Customer data is entered in step 306 and one of three analysis options is selected in step 308. Step 312 and step 310 represent two different modes for entering data into the equipment profile database. In step 312 a user inputs new equipment profile data, or equipment profile data can be imported from another computer file such as a plant database in step 310. Steps 314. 316 and 318 are design deficiency identifying steps. In one embodiment, step 314 is seal design deficiency identification, step 316 is equipment design deficiency identification, and step 318 is system design deficiency identification. In each of these design deficiency identification steps, 314, 316 and 318, deficiencies in the design based on the new equipment profile data entered can be identified. The identified deficiencies can be provided to the equipment database in order to update the equipment profile data with the potential design deficiencies. In addition, the design deficiency data can be entered into the plant reliability database by using an existing equipment profile, step 320. In step 322, there are three options from which to choose. Step 324 is initiating a request for a quote, step 326 is accessing the seal failure analysis and updating equipment database module, and step 328 guides the user into entering information regarding a problem, failure, or leakage of a piece of equipment entered in the equipment database. If step 324, a request for quote, is selected, then, in step 352, a proposal generator is initiated to provide information to an outside source, step 354, or to a seal or equipment selection system, such as described above, that is designed to recommend and purchase mechanical seals in step 356. If step 326 is selected, the next step 346 combines the results from data and findings collected and provides them in an organized manner to a comprehensive information analysis module, in step 350. The comprehensive information analysis mode identifies the problems and root causes and stores problem and root cause data in a database. In one embodiment, the problem and root cause data are provided to the proposal generator as described above. The failure and root cause data are provided to the corrective action/strategy selection in step 358 that determines the required corrective action. In step 360, the corrective action or actions, are implemented and the equipment database updated to ensure that all modifications and changes to equipment are entered so that the equipment database is up to date. The plant reliability performance analyzer is also updated at this point, step 364, whereupon the process ends, step 366.

If step 328 is selected, the user can select from two options in step 330. In step 332, for common mechanical equipment hydraulic problems are identified with corrective actions provided and the equipment database is updated as described below, in step 332, and the process ends in step 336. Step 334 may also be selected from step 330 in which case, the human equipment systems analysis module directs the user to enter information pertinent to the failure or problem identified. As described above in step 346 through step 366, the data entered in step 334 is then collected and analyzed in order to determine the cause of the problem or failure, to determine corrective action and strategy to correct the failure, and to implement those corrective actions and provide an up to date equipment database and plant reliability performance analyzer database with current data.

Figure 4C:
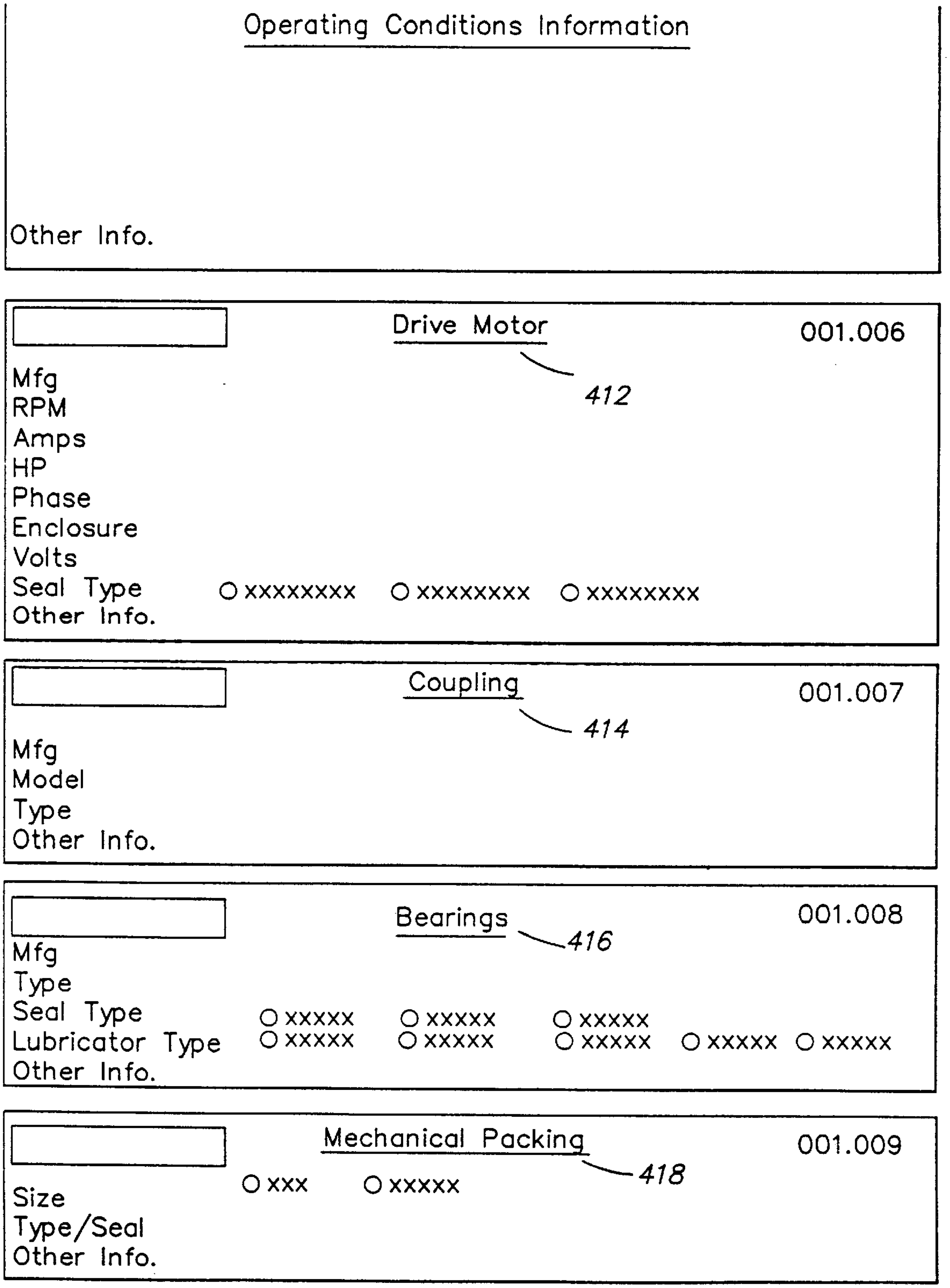
Figure 4F:
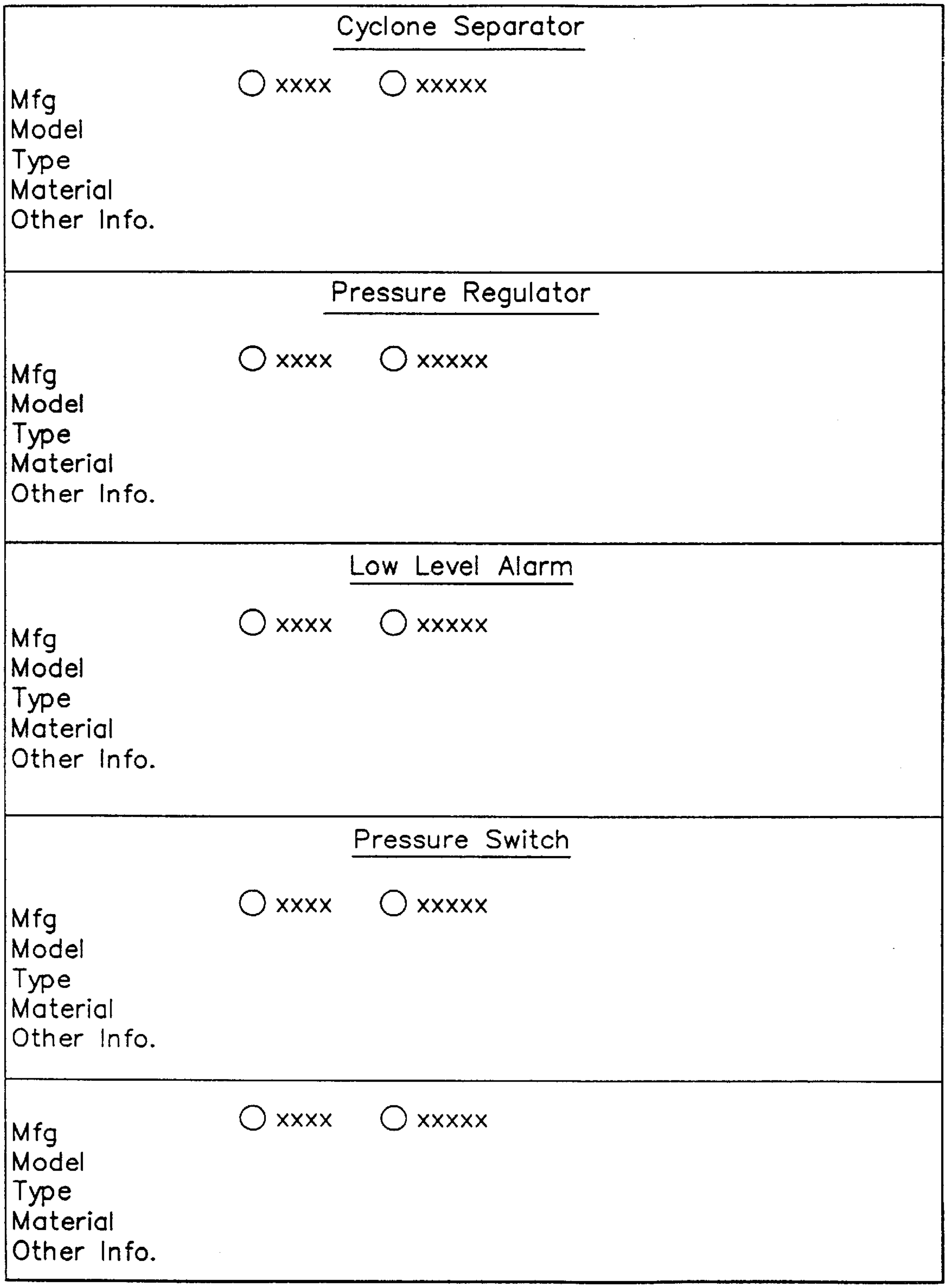
Figure 4G:
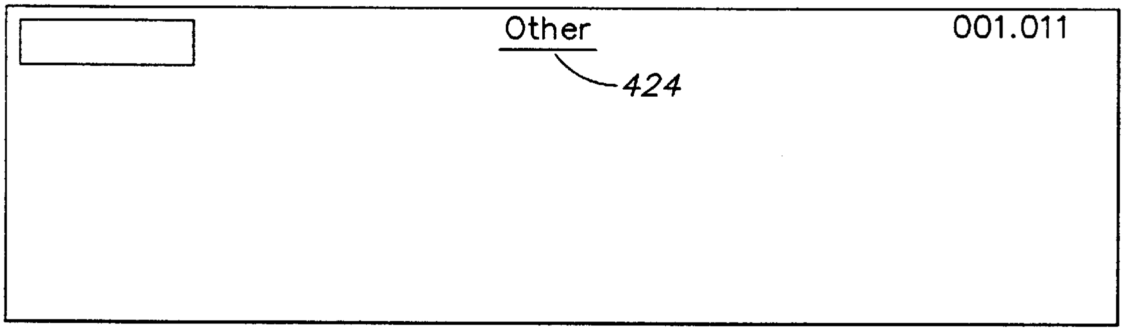

FIG. 4 illustrates one embodiment of an input screen used for collecting customer and equipment information to be stored in the equipment and customer databases. It should be understood that these groupings and queries are only examples and not intended to be limiting.

In this embodiment the information is entered into fields that are grouped together according to function. For example, customer information is entered in area 402 and can include the customer name or other identification, phone and fax numbers, and other information about the customers. Area 404 can include information related to plant location such as environmental conditions at the plant. Area 406 can include information related to particular pieces of equipment. The equipment identification number, serial number, type, manufacturer, model, and other physical characteristics may be entered here. In addition, this information may include a field that indicates whether the manufacturer, model, and other characteristics of the equipment have been verified, and if so who verified the information. This verification allows a user such as the plant reliability manager to monitor the quality of the work performed. If for example, a later failure of a piece of equipment was shown to be caused by a condition that existed despite having been verified as not existing, the system has kept track of the individual responsible for verification. Thus, any deficiencies in training that may have caused the erroneous information to be entered can be addressed.

Area 408 describes the process fluid used in the system. The data may include physical characteristics such as concentration, specific gravity, and viscosity among other data and also may include any warning and safety information. In one embodiment, this data may be linked to a database containing information about the chemicals in process fluids. In this embodiment the data would only be entered by a user only if the chemical was not previously entered into the database.

The area 410 allows for input of operating conditions of the equipment. In one embodiment, a user enters whether the equipment operates continuously or intermittently and provides data about the frequency of use. Other information about operating conditions also may be added.

The area 412 allows for input of information about the drive motor of rotating equipment. Area 414 is for information concerning the coupling of the drive motor. Area 416 is for information on the particular bearings. Area 418 is for information on whether mechanical packing, is used and prompts the user for a type or style of the packing.

Area 420 is for information on any mechanical seal used with the equipment. Information such as a seal manufacturer, seal model, sealed type, lubrication and other characteristics of the seal are entered in the area. Engineering specifications also may be entered and verified. The user also may be asked if any equipment modifications related to the seal have been made. If modifications have been made an explanation of modifications is requested and the person or persons responsible for obtaining the new dimensions are identified. As pointed out above, this identification of individuals allows a plant reliability manager to track the quality of the work performed in order to identify problems and workmanship or training among the personnel.

Area 422 requests information if additional products, such as flow meters, throat bushing, heat exchangers or other auxiliary equipment, are being used with the piece of equipment. Area 424 provides the user with the opportunity to enter other information about the equipment.

Figure 5:
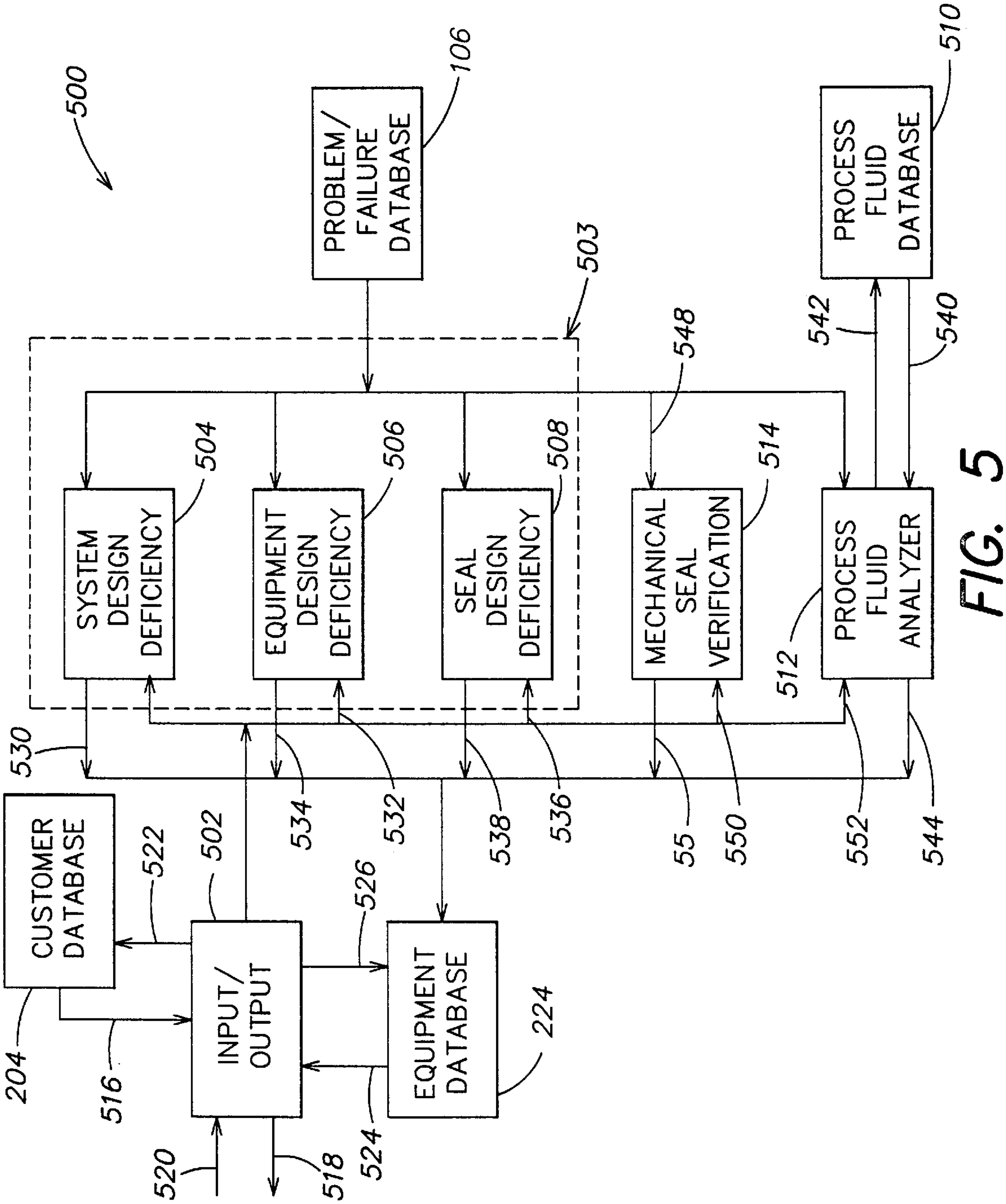
FIG. 5 is a block diagram of a process providing input data to the failure analysis system shown in FIG. 1.

FIG. 5 is a block diagram of one embodiment of an input data module 500 that includes a customer data and equipment data input module 502 receiving customer or equipment data that is new or has been changed on input 520. The input data module 502 in one embodiment can also provide output customer or equipment data to a user or external device on output 518. A customer data database 204 is coupled to the input process module by connection 516 and 522. Input 522 provides a new/changed customer data to be entered into the customer database 204. Output 516 provides customer data retrieved from the customer database 204 to the input process module 502.

The input process module 502 is coupled to the equipment database 224 input 526 and output 524. Input 526 provides new/changed equipment data to the equipment profile database 224 for storage with the associated piece of equipment, and output 524 provides equipment data retrieved from the equipment database 224 to the input/output process module 502. Input process module 502 also provides new/changed equipment data to the design deficiency module 503.

In one embodiment, the design deficiency module 503 includes one or more modules, where each module can analyze a particular function. In one embodiment, the design deficiency analyzer 503 has three modules: a system design deficiency module 504, an equipment design deficiency module 506, and a seal design deficiency module 508.

System design deficiency module 504 is coupled to the problem/failure database 106 and performs a system level analysis of any deficiencies or problems that may exist or be caused by the new or changed equipment that is being added to the system. For example, problems with the interactions between pump systems, the auxiliary equipment, the piping systems, or other higher level problems may be identified by this module. Module 504 uses the input equipment data in conjunction with the equipment data stored in the equipment database 224 and compares the equipment data to problem/failure data stored in the problem/failure database 106. System design deficiency module 504 also has an output 530 for providing system design deficiency data to be added to the equipment profile database 224 for the associated pieces of equipment for further analysis. In another embodiment, the system design deficiency module may provide system design deficiency data directly to a user.

Equipment design deficiency model 506 is coupled to the problem/failure database 106 and receives problems/failure data on input 532. The equipment design deficiency module 506 determines if any deficiencies exist or problems may exist between the new and changed equipment that is being added to the equipment profile database. Equipment design deficiency module 506 has a data output 534 providing equipment design efficiency data to the equipment database 224 to be stored in an appropriate location for further analysis. In another embodiment, the equipment design deficiency data may be provided directly to a user.

The seal design deficiency module 508 determines if any deficiencies exist or problems likely will occur due to the seal design that is being entered or changed. The seal design deficiency module 508 receives an input of new/changed equipment data on output 536 and provides an output of seal design efficiency data to the equipment database 224 via output 538 providing the seal design deficiency data to the equipment database 224 to be stored in an appropriate location for further analysis. In another embodiment, the seal design deficiency data could be provided directly to a user.

In one embodiment, the process fluid analyzer module 512 is coupled to a process fluid database 510 and determines whether any deficiencies exist, or problems likely will occur with any new or changed equipment data and the process fluids used within the pump or system. The process fluid analyzer 512 is coupled to the process fluid database 510 via query input 542 and receives data indicative of characteristics of the process fluid from the process fluid database 510 via output 540. In addition, the process fluid analyzer module 512 receives a new/changed equipment data via input 552. The process fluid analyzer module compares the data indicative of the characteristics of the process fluid with the equipment data stored in the equipment database 224 to determine if any incompatibilities exist. The process fluid analyzer module 512 provides process fluid problem data to the equipment database 224 for storage with the associated equipment via output 544.

In one embodiment, a mechanical seal verification module 514 receives new/changed equipment data via input 550. The mechanical seal verification module 514 is also coupled to the problem/failure database 106 via input 548 where it receives data indicative of deficiencies or problems that may occur with the mechanical seal. The mechanical seal verification module determines the actual characteristics and technical capabilities of a mechanical seal that is new or being changed within the system. In one embodiment, the mechanical seal verification module 514 accomplishes this function by decoding the product number of the seal and updates the equipment database 224 via data line 55.

In another embodiment, data concerning a pump or a component of a pump such as the pump bearings could be analyzed and the performance verified by similarly decoding a product number and accessing stored data.

Figure 6:
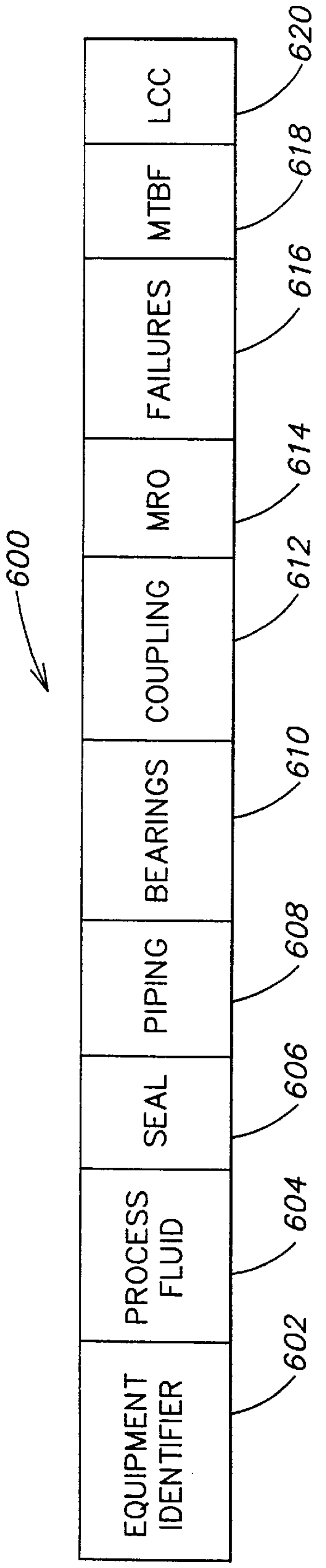
FIG. 6 is a schematic representation of data stored in the equipment database according to one aspect of the failure analysis system shown in FIG. 1.

FIG. 6 is a schematic diagram of an example structure of the data 600 stored within the equipment database 224. Each piece of equipment has a unique equipment identifier 602 and data indicative of the process fluid or fluids used with the rotary equipment or contained by a seal 604, which seal is used or installed on a particular piece of rotary equipment 606, the piping configuration 608, motor bearing data 610, motor coupling data 612, maintenance repair and operation data 614, failure findings 616, mean time between failure (MTBF) 618, and life cycle costs associated with the equipment 620. It should be understood by one of ordinary skill in the art that this example structure and set of data is merely illustrative. Other data sets and structures may be used for this and the other databases.

Figure 7:
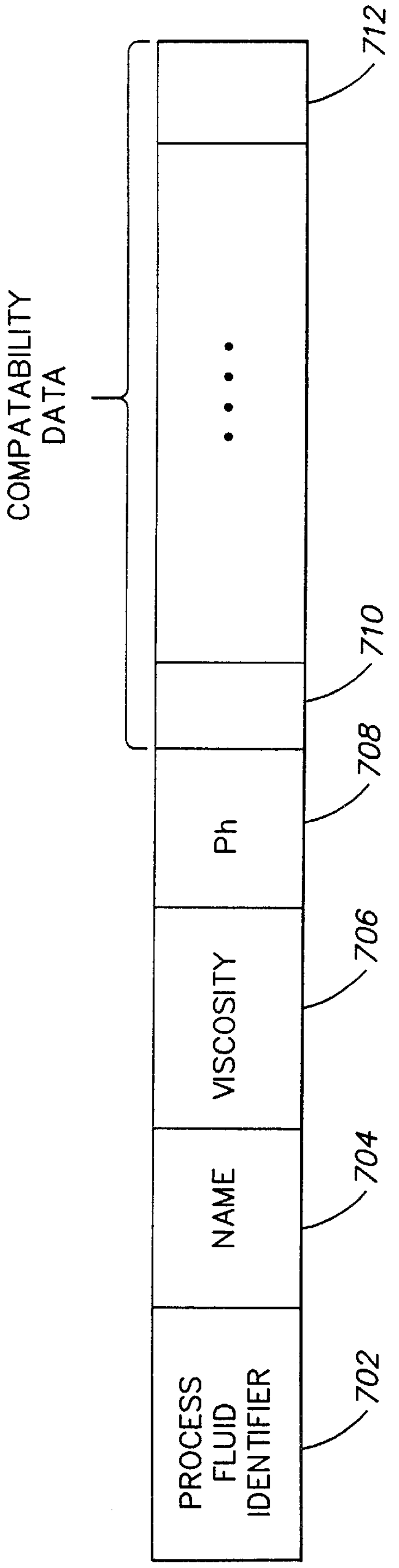
FIG. 7 is a schematic representation of data stored in the process fluid database according to one aspect of the failure analysis system shown in FIG. 1.

FIG. 7 is a schematic representation of example data stored in the process fluid database 410. Each process fluid has a unique identifier 702 and associated with the identifier 702 are included the process fluid name 704, and the viscosity 706 and pH 708 of the process fluid. The compatibility of the identified process fluid with all of the various pipes, rotary equipment, pumps, seals, etc., also may be ranked and the ranking levels are stored in boxes 710 . . . 712. This ranking may be done in any manner.

FIG. 8 is a schematic representation of example structure of and data stored in the problem/failure/leakage database, in one embodiment of the failure analysis system. For each piece of equipment, there is an equipment identifier 802. Associated with the equipment identifier may be a failure mode 804, an image of the failure mode 806, a root cause of the failure mode 808, and first corrective action 810, and a second corrective action 812. There may be multiple failure modes associated with each equipment identifier and potentially multiple images of a particular failure mode. Multiple causes of a particular failure mode and multiple corrective actions also may be stored for each failure mode.

Figure 9:
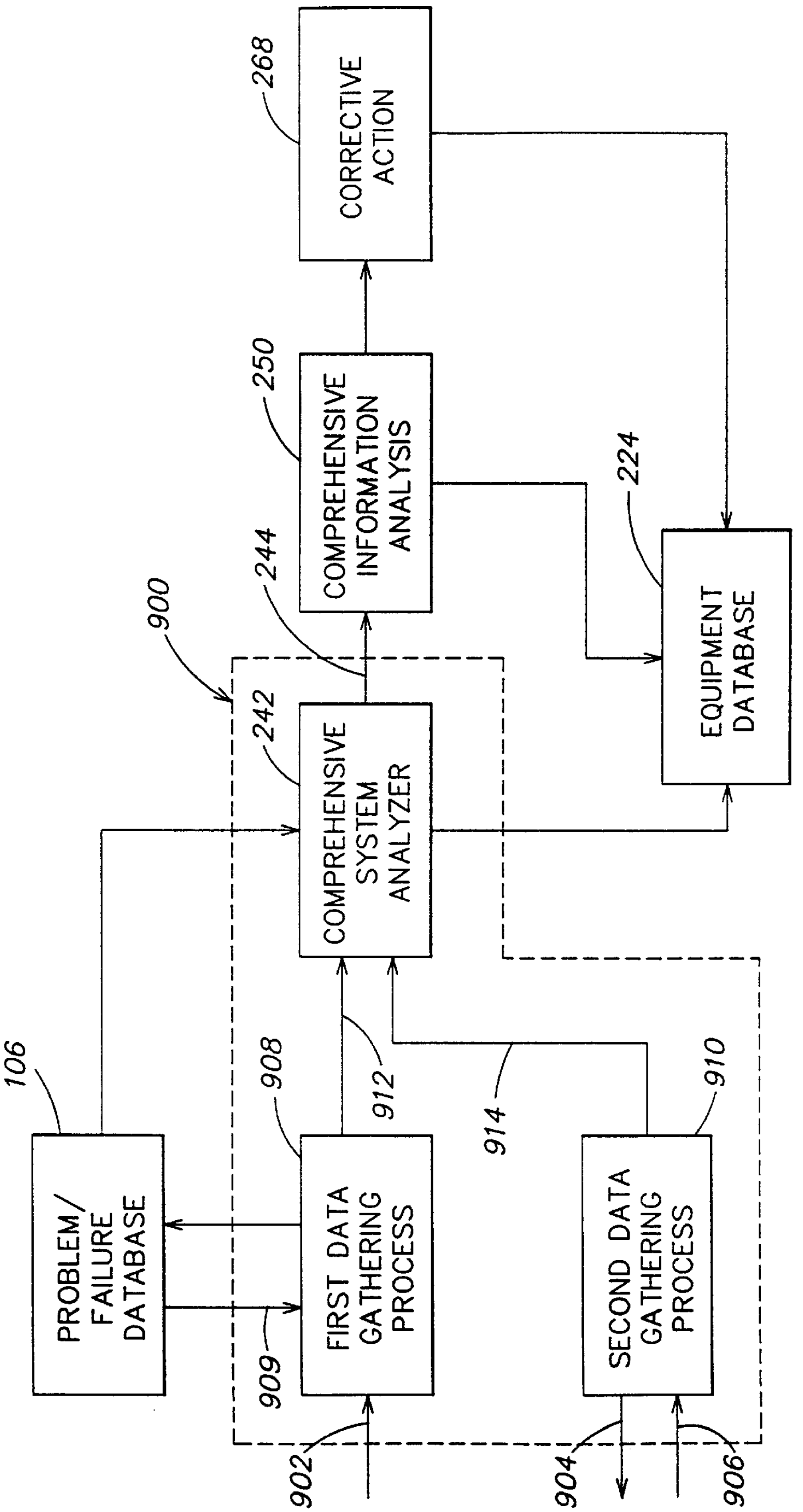
FIG. 9 is a block diagram of the system analyzer and data/information analyzer processes according to one aspect of the failure analysis system as shown in FIG. 1.

FIG. 9 is a block diagram of one embodiment of the system failure analyzer 900 and comprehensive information analysis module 250 according to one embodiment of a plant reliability system. The seal failure analysis module 900 comprises a first data gathering process 908 that is coupled to the problem/failure database 106 and which receives failure mode data from the database 106 through input 909. In one embodiment, the first data gathering process 908 is designed to select a failure mode of the system by comparing failure mode data provided by the problem/failure mode data database 106 with externally provided failure data.

In one embodiment, the first data gathering process 908 receives failure mode data from the problem/failure database 106 and converts the failure mode data received on input 909 into a visual image. The visual image can be displayed to the user who then compares the displayed image of a failure mode with their own observations of the failure of the particular piece of equipment. The user selects, via input 902, the picture or pictures corresponding to the failure mode, or to various failure modes, observed. The visual data provided to the first data gathering process 908 may be a digitized photograph or other scanned image, or a computer generated drawing. The image may be provided to a user in many forms, such as on a computer display or in printed form.

In one embodiment, the second data gathering process 910 provides for a data output 906 to provide data to a user for guiding or instructing the user to gather failure data. The user can be instructed to obtain the desired data through direct observation and/or measurement of the failed system. The gathered data is then provided to the second data gathering process 910 via input 904. The first data gathering process provides the data corresponding to the failure mode, or failure modes, selected by the user via output 912 to the system analyzer 242. The second data gathering process 910 provides the user obtained data to the system analyzer 242 via output 914.

The system analyzer 242 in one embodiment provides for synthesizing the data obtained from the first and second data gathering processes into a coherent format which provides not only for the determination of a root cause of the failure, but also provides a method for verifying the accuracy and completeness of the information obtained. The system analyzer 242 achieves both of these results by matching the selected failure modes represented by the selected visual images with the user obtained data. Each of the individual failure modes represented by a selected visual image and the data obtained and provided by the user have corresponding predefined characteristics associated with them. As explained in more detail below, by matching the failure mode data to the user obtained data, predetermined associations between the visually identified failure modes and user obtained data can be used to determine a root cause of the problem identified by the matched data. As will be explained in more detail below, there may be some cases in which the expected association between the failure modes represented by the visual images and the user obtained data does not arise. In this case, the lack of an expected match in the input data may indicate that contradictory data was entered and that the quality of the collected data is suspect.

There may be multiple intersections between the selected failure modes and the user obtained and gathered data. In these instances, there may be more than one root cause identified for the failure, and a probabilistic weighting factor may be assigned for each intersection and the corresponding root cause. For the root causes identified by the multiple intersections, probabilities for the identified causes may be combined according to the weighting factors in order to assign a particular probability to each root cause. Various methods may be used to assign probabilities to the root causes identified by the intersecting data. This data may be gathered empirically over a period of time as historical data and the probability weighting functions may be updated using this data. In another embodiment, the various probabilistic weights may be determined mathematically using functions and data based on the experience of the various users.

The system analyzer 242 also is coupled to the equipment database 224 and provides the equipment database with the root cause or causes of the failure of the piece of equipment to ensure that the data profile of the piece of equipment that has failed stored in the equipment database 124 is updated.

The comprehensive information analysis module 250 receives the root cause data on input 144. The comprehensive information analysis module 250 receives the corrective action data associated with each root cause provided by the system analyzer. The data information analysis module then provides corrective action data to a user for analysis and approval or to an automated equipment/program. The comprehensive information analysis module 250 may provide the corrective action data to an automated equipment selection routine, such as the seal selection system described above that provides automated seal selection based on provided engineering data. The data information analysis module may provide corrective action and engineering data to the proposal generator to generate a request for quote report. Such a report may be provided to either an automated equipment selection processor, such as the seal selection system described above, or to corporations, consultants, manufacturers, or other third parties that may provide further analysis of the data. In one embodiment, the seal selection system responds with a particular seal selection. The seal selection system then may provide manufacturing data directly to a design center of the manufacturer and in one embodiment, download the data for manufacturing the particular seal. The offline activities of either the seal selection system or the consultants, manufacturers, or corporations may provide their own analysis of the data to provide engineering data to the user.

The user may select the desired corrective action, whether the data is generated by a local or remote seal selection system, a consultant, or other users. This corrective action data is provided to the corrective action implementation and repair processor 268, as well as the equipment database 224 in order to update the equipment profiles with the selected repairs or modifications. As will be described in more detail below, the corrective action, implementation and repair process 268 in one embodiment, can provide information for the installation, repair, setup, safety procedures to be used, and training packages to effectuate the desired corrective action. The corrective action implementation and repair process 268 provides the installation and setup instructions to the equipment database 224 in order to update the equipment profile of the failed piece of equipment.

Figure 10A:
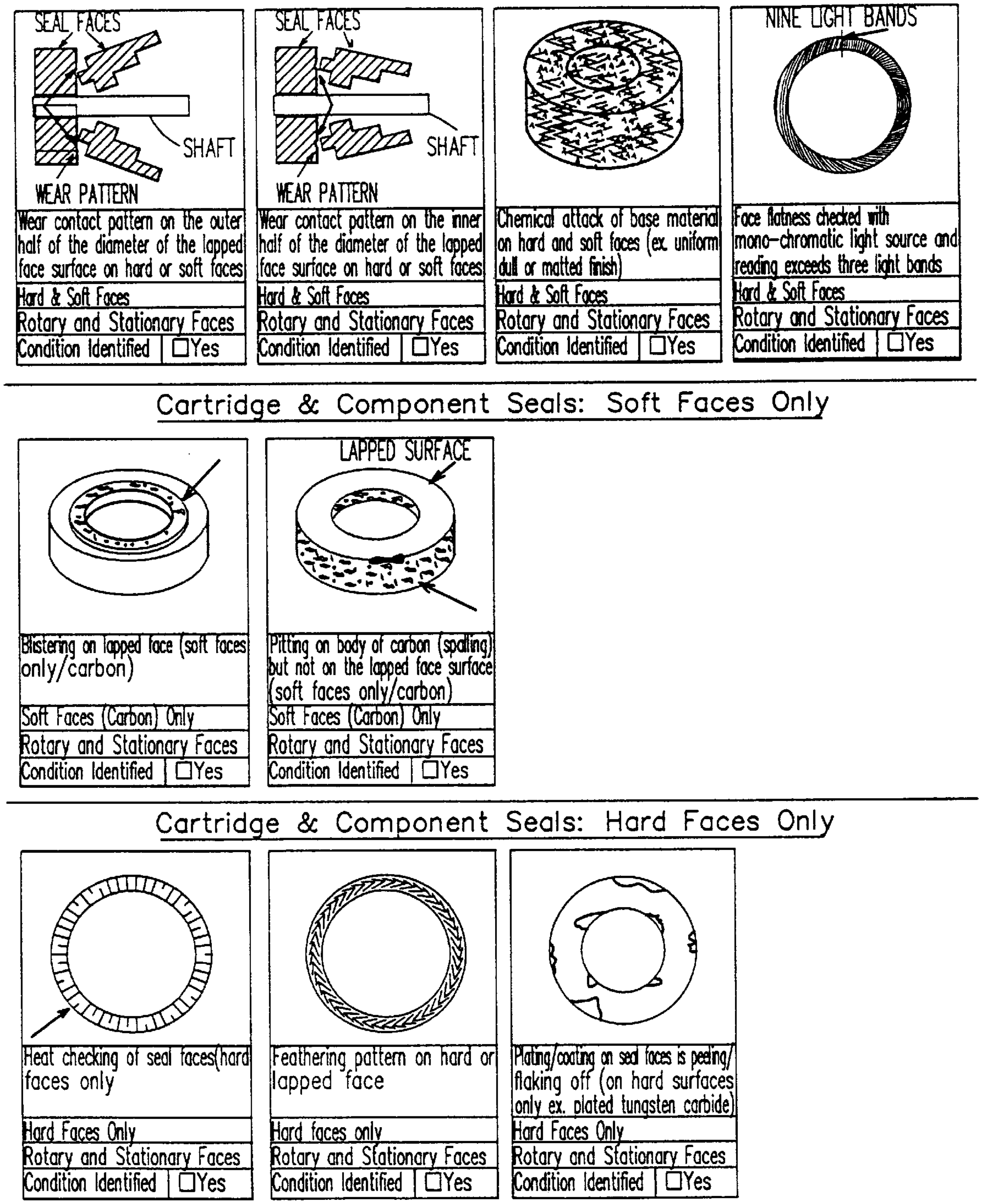

FIGS. 10*a* and 10*b* represent, in one embodiment, an example of the visual images used to identify a failure mode of the seal. These images shown in FIGS. 10*a* and 10*b* include photographs taken of actual seals and components that have failed, and drawings of seals and components representative of actual parts that have failed. A user is instructed using either on-screen photographs or printed sheets containing the photographs, to observe the seal and provide an indication in a condition identify box in every instance in which the user observes a corresponding symptom in the failed seal or pump. Identifying an existing condition in the seal or pump by selecting a photograph or drawing can identify a failure mode of the pump or seal. There are other visual images corresponding to other failure modes than the example representations shown in FIGS. 10*a* and 10*b*. Thus, the plant reliability program is not limited to these example visual images. Other types of computer generated visual information could be used to identify the failure modes of a seal or pump. Example forms of the visual information include computer generated engineering drawings, computer generated three dimensional images, computer animation, or any other computer readable visual image, including photographs and digitally captured still images.

Figure 11F:
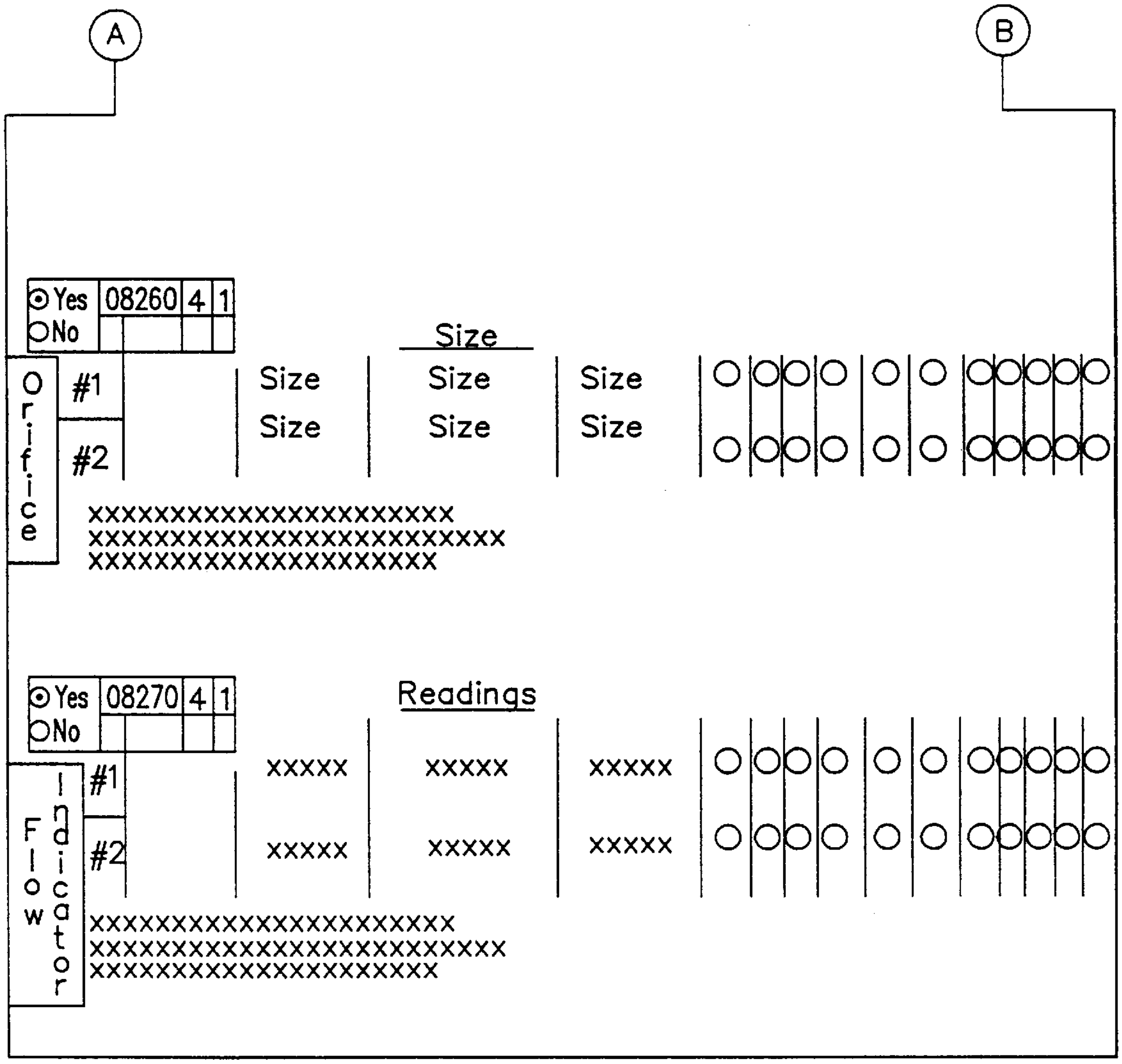
Figure 13G:
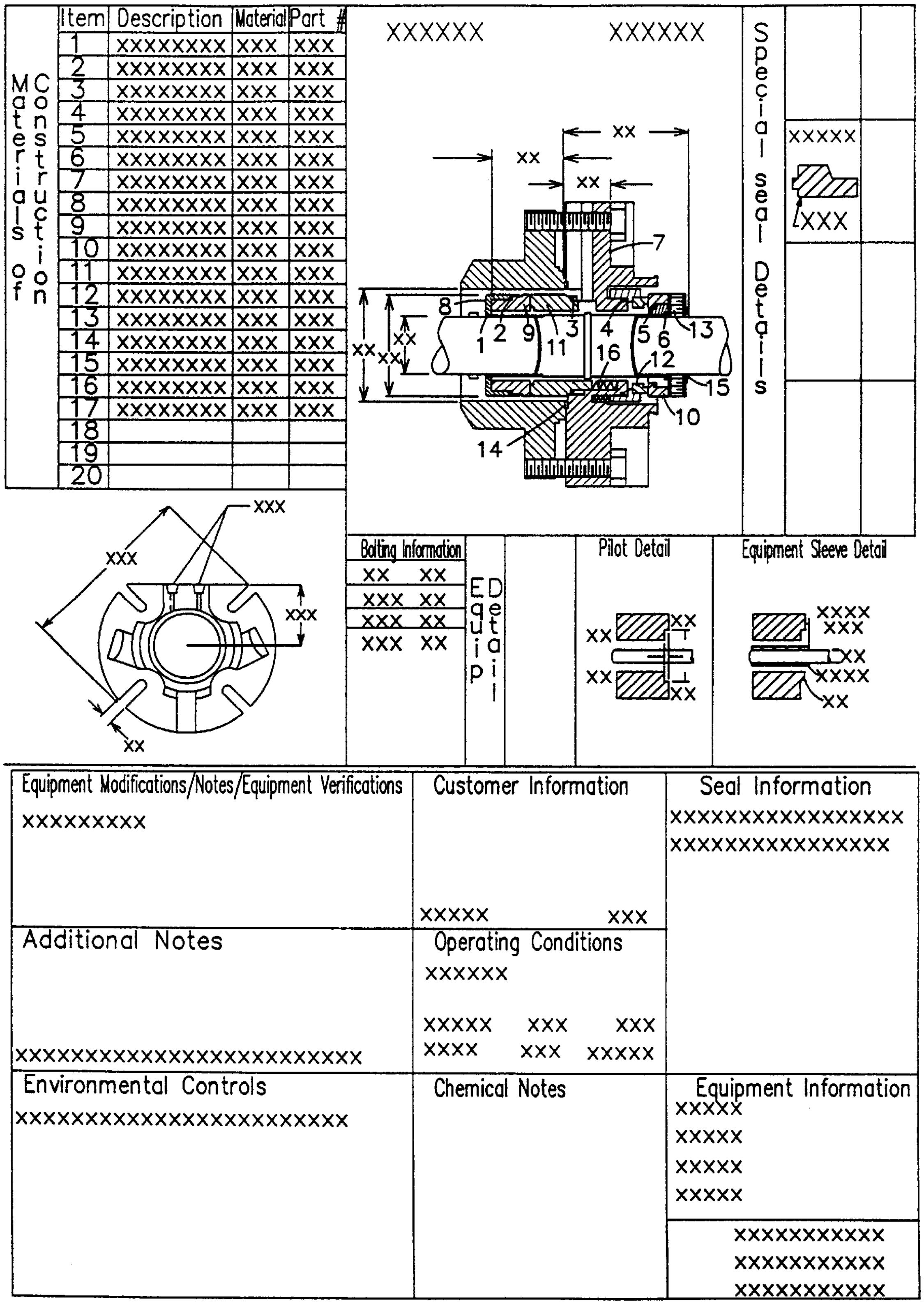

FIGS. 11*a*–11*f* provide an example of the type and format of the instructions provided to a user for gathering data by observing or measuring the rotating equipment. In one embodiment, as shown in FIG. 11*a*, the equipment profile as originally designed is provided to a user. The user is then instructed to observe any changes in the current configuration from the original or previous configuration of the rotating equipment and to note them. This data can be used to verify the past work that has been performed on the rotating equipment as well as provide an opportunity to update the equipment profile database and predict any possible weaknesses or failures that may occur. The user also may be asked to determine if the change is related to the failure and if so to explain how. In one embodiment shown in FIGS. 11*b*–11*f*, the user is guided through identifying the seal type, and is instructed which information to provide. For example, in one embodiment, the user could be asked to identify the seal type, where the leakage occurred and how much leakage first occurred, and the operating conditions under which the leakage occurred.

The questions generally have two parts. The first question is asked and, depending on a yes or no answer, other information is then requested. Under some conditions this additionally requested information then triggers a third or fourth question in order to adequately identify further data about a configuration of failure and in some case the responsible party of that piece of equipment. The plant reliability program is not limited merely to the questions provided in the example figures. The data to be gathered, the form of the questions to be asked, and the follow-up questions may come in many forms.

FIGS. 12*a*–12*i* illustrate one embodiment of the synthesizing of the data obtained by the second data gathering process, the failure mode data, and other analyzed data. As shown in FIGS. 12*a*–12*i*, the data obtained by the second data gathering process can be subdivided and stored in a plurality of subsections. The data entered into different subsections may be defined by different groups of personnel or different departments within the plant, to allow a plant reliability manager to verify the quality of the data gathered. By scientifically analyzing the collected data and cross referencing the collected data to the failure modes identified by the system, erroneous data collected by one group of personnel or one department can be identified with data collected by a different group of personnel or department. This control of the input reduces the likelihood of erroneous data that is provided.

In the description that follows the organization and grouping of the data to be collected is but one embodiment, and is to be considered only an example. The data to be collected could be grouped in many different ways, and also that entire other sets of data could be selected. The initial problem identification section 1202 is used to gather data that occurs shortly after a problem, such as a seal failure, occurs. For example, data to be analyzed can include identifying the mechanical seal leakage, the time frame of initial leakage of a mechanical seal, the initial mechanical seal leakage pattern, and mechanical seal temperature information.

Mechanical problems are identified in section 1204, hydraulic problems are identified in section 1206, packing problems are identified in 1208, and equipment leakage problems are identified in section 1210. As an example of the separation of the data collection process in section 1206 hydraulic problems are identified by the maintenance department, the engineering department, and the operations department. As pointed out above by having separate departments collecting overlapping data the accuracy and completeness of the data may be determined. Other sections in which data collected include the operating conditions 1212, process fluid analysis 1214, mechanical seal analysis 1216.

In one embodiment of the plant performance and reliability apparatus, the system analyzer module 124 utilizes a structure as shown in FIGS. 12*a*–12*i* to synthesize the collected data with the failure mode data and any design deficiency data, if provided. The numbers 1218 listed across the top of the FIGS. 12*a*–12*i* each represent a single graphical/visual image corresponding to a failure mode of the equipment. The system analyzer module 124 synthesizes all of the collected data within this spreadsheet like format. As described above, the human, equipment, system analysis corresponding to the second data gathering process 910 directs the user to collect certain data from various parts of the rotating equipment and system using questions, examples of which are provided in FIGS. 11 *a*–11*f*. The user collects data from various subsystems identified in FIGS. 12*a*–12*i*. In addition, any data from the design deficiency modules 503 also are provided and automatically entered into this form.

The form shown in FIGS. 12*a*–12*i* is arranged so that each intersection between the failure mode data and the user data gathered, located along the left side of the sheet, is associated with data indicative of a possible root cause of a failure. As the data is automatically entered into the form the matches between the failure mode data and the data gathered by the user or derived from other analysis modules are noted. These matches represent candidate root causes of the equipment failure. The candidate root causes of the failure, in one embodiment, as described above can be provided with a probability weighting factor so that a user will be able to judge the most likely cause based on the data. In one embodiment, the probability assigned to a candidate root cause may be determined empirically from historical failure data. In this embodiment these probabilities may be updated as new failure data is obtained. In another embodiment, the probability may be derived mathematically from known formulas and using standard techniques. The root cause data may be provided to the user in any format. The association of the root cause data with the intersections between the failure mode data and the user obtained and derived data can be determined from many sources including industry provided information. For example the John Crane Company publishes information on seal failure analysis in a pamphlet entitled "Identifying causes of seal leakage" and incorporated herein by reference. Additionally, a four part series entitled "A user's guide to mechanical seal failure analysis", parts I–IV was published in the journal *Face to Face*, Vol. IV No. 2–4 and Vol. V, No. I also incorporated herein by reference.

Both matches and situations in which a match would be expected to occur may provide valuable information. In one embodiment, as the root cause data is determined a cross reference can be performed to determine if data is missing or was entered erroneously. In this embodiment, the plant reliability manager would be able to identify data that would be expected to be observed for a given root cause of a failure, but has not been entered. This disconnect between expected and actual data may be due to several problems relating to personnel, such as a lack of training. As noted above, the user collected data is obtained by separate personnel, organizations or departments within the plant thus, providing for the independent collection of overlapping data. Thus, the cross referencing of root cause failure data with the observed collected failure mode data, permits deficiencies in training or other personnel problems to be identified.

FIGS. 13*a*–13*g* provide, in one embodiment, an example of the installation instructions, engineering drawings, setup and safety information that can be provided by the plant reliability system. In the example figures provided, the information provides detailed installation and setup instructions, and also may provide additional information such as piping plans, supply tank connection information, and safety and training information to properly install the equipment. The number and complexity of the instructions vary with the types of equipment, the uses of the equipment, and the level of mechanical complexity of the equipment. Thus, the plant reliability system should not be construed to be limited to the example instructions provided in the figures.

Figure 14:
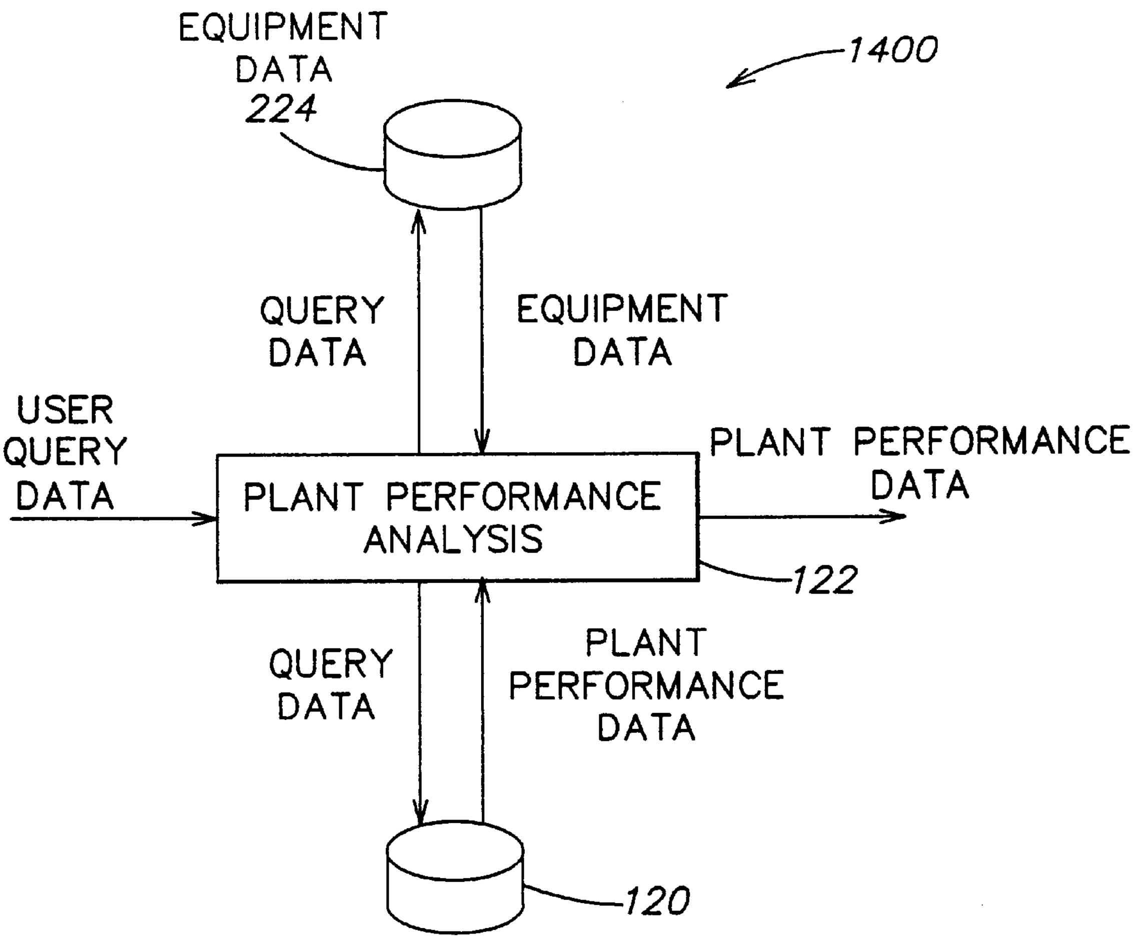
FIG. 14 is a block diagram of the plant performance process according to one aspect of the failure analysis system as shown in FIG. 1.

FIG. 14 illustrates one embodiment of the plant performance analysis package associated with the plant reliability program. The plant performance operation 1400 includes plant performance module 126 that is coupled to the equipment database 224 and to the plant performance database 120. The plant reliability database 120 receives equipment profile data from the equipment database 224. Using the historical failure data associated with the piece of equipment, plant performance data may be calculated and stored in the plant performance database 120. The plant performance analyzer may calculate the mean time between failures, the maintenance, repair and operation data for a piece of equipment, the life cycle costs associated with the piece of equipment, cost associated with equipment downtime, or measures of equipment performance and the performance of the maintenance, operations, engineering and purchasing departments.

The data may be stored in any manner which permits the associations among the data to be maintained and retrieved and searched. For example, the data may be stored in a database, such as a relational database, object-oriented database, unstructured database or other database. A database may be constructed using a flat file system, for example by using files with character-delimited fields, such as in FileMaker Pro and in early versions of dBASE, now known as Visual dBASE from Inprise Corp. of Scotts Valley, Calif. formerly Borland International Corp. Example relational databases include Oracle 8*i* from Oracle Corporation of Redwood City, Calif., Informix Dynamic Server from Informix Software. Inc. of Menlo Park, Calif., DB2 from International Business Machines of Yorktown Heights, N.Y. and Access from Microsoft Corporation of Redmond, Wash. An example object-oriented database is ObjectStore from Object Design of Burlington, Mass. An example unstructured database is Notes from the Lotus Corporation, of Cambridge, Mass. Data also may be stored in standard data files according to a data structure defined in a computer program, such as an array, a list, a tree, a linked list, or other structure permitting data association.

Figure 17:
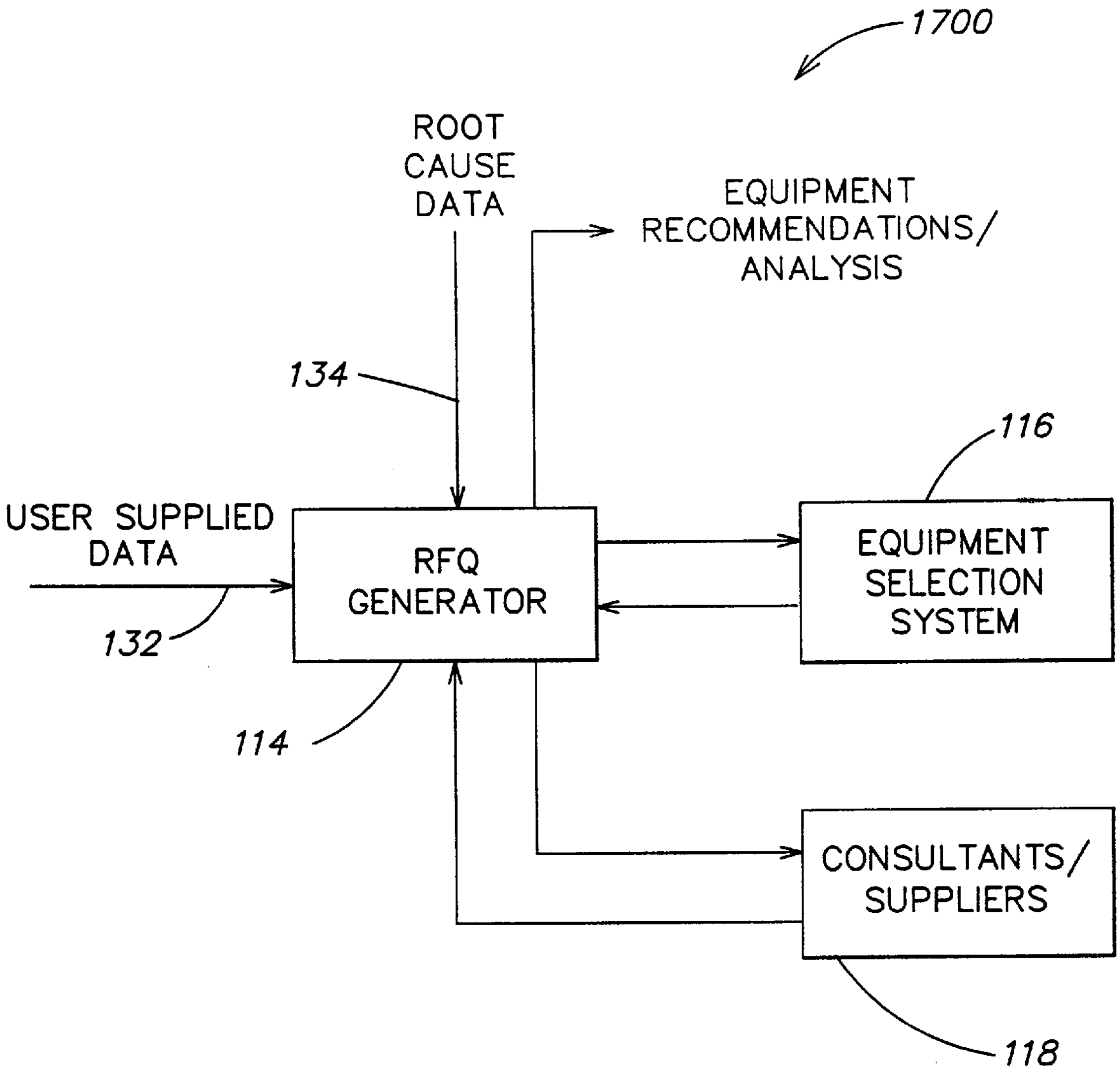
FIG. 17 is a block diagram of the RFQ process according to one aspect of the failure analysis system as shown in FIG. 1.

FIG. 17 illustrates one embodiment of the proposal, or RFQ, generator process 1700. The proposal, or request for quote (RFQ), generator module 114 receives input data from either an external source supplied by the user on input 132, or the root cause data and corrective action data may be obtained from the data information analyzer 110 via input 134. In the case of a user input on input 142, the data could be supplied from the user directly or from an external database supplied with the information corresponding to the piece or pieces of equipment that have failed. The RFQ generator module 114 receives the input data from either source, formats the data into a standard form template and provides this data to either an automated equipment selection system 116 such as the seal selection program described above, or to an outside supplier or consultant 118. The format of the data that is provided to the software equipment selection programs is defined by the input data specifications of those programs.

The data returned to RFQ generator process 114 by the automated equipment selection program such as a seal selection program may be supplied either to the user or to the data analysis module 110. When supplied to the data analysis module 114, the recommended equipment could then be electronically ordered from the manufacturer. In another embodiment, the user could approve of the equipment selection and proceed to order the equipment either electronically or by more traditional methods from the manufacturer. As described in the patent application, Apparatus and Method for Selecting a Mechanical Seal filed on Oct. 27, 1998, by Northeast Equipment, Inc., Ser. No. 09/179,506, the seal selection module could provide either a standard or a custom seal designed to specifications, and upon approval, automatically generate the instructions for the manufacturing plant to make and test the desired seal.

If a consultant or other manufacturing entity is used, analysis and recommendations from them can be received, evaluated by the user, and a decision made as to the implementation of those recommendations. This data may be provided to the equipment database 124 to update the data stored in the equipment database 124 associated with a piece of equipment about to be repaired.

Figure 16:
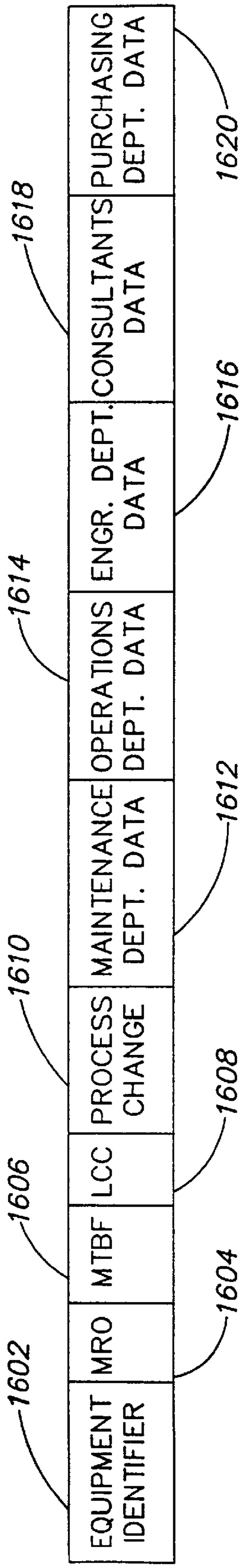
FIG. 16 is a schematic representation of data stored in the plant performance database according to one aspect of the failure analysis system as shown in FIG. 1.

As shown in FIG. 16, the plant performance database associates data with a particular piece of equipment 1602. The above-described downtime analysis. MRO analysis 1604, and MTBF 1606, and LCC costs 1608 are calculated using standard methods and are stored for each piece of equipment, along with any changes in the process fluid 1610, and the tracking of failure data and performed work data for each department and/or individual within each department responsible for carrying out analysis and repairs on a particular piece of equipment. As shown in FIG. 16 in one embodiment, there can also be included maintenance department data 1612, operations department data 1614, engineering department data 1616, contractor data 1618, and purchasing department data 1620. By tracking the data associated with each of these departments, the effectiveness and quality of the work, and the quality of the management of each department may be determined so that any corrective action may be taken. As an example, data associated with the purchasing department can be analyzed to show that a vendor may have been supplying low-quality parts that have contributed to equipment failures over time. Similarly, the effectiveness of the actions undertaken by various departments, such as the maintenance, operations, and engineering departments, may be tracked over time as well, and a similar metric may be defined in order to ascertain the quality of the services provided.

In one embodiment, as shown in FIG. 15, this data is available to the plant reliability manager. In one embodiment, the plant reliability manager has an additional screen listing tasks that are recommended by the system to be performed and allowing the reliability manager to determine whether to perform the task. In one embodiment the system can recommend the department to be assigned to perform the task, the sequence of events that is to occur, and allows the plant reliability manager to assign a person or persons within the department to perform the task. In one embodiment, the choice of whether management approval is required after the task is completed is provided. In one embodiment, the system has preassigned a department and sequence for each task to be performed, although the reliability manager has the ability to use system defaults or to change any and all of the entries. Thus, information can be changed and maintained by the plant reliability manager. The departments and the personnel involved thus have their performance checked and verified automatically. Thus, historical failure data collected over time will be able to show weaknesses in the plant operation and deficiencies in training or other personnel problems that may be corrected.

Figure 18:
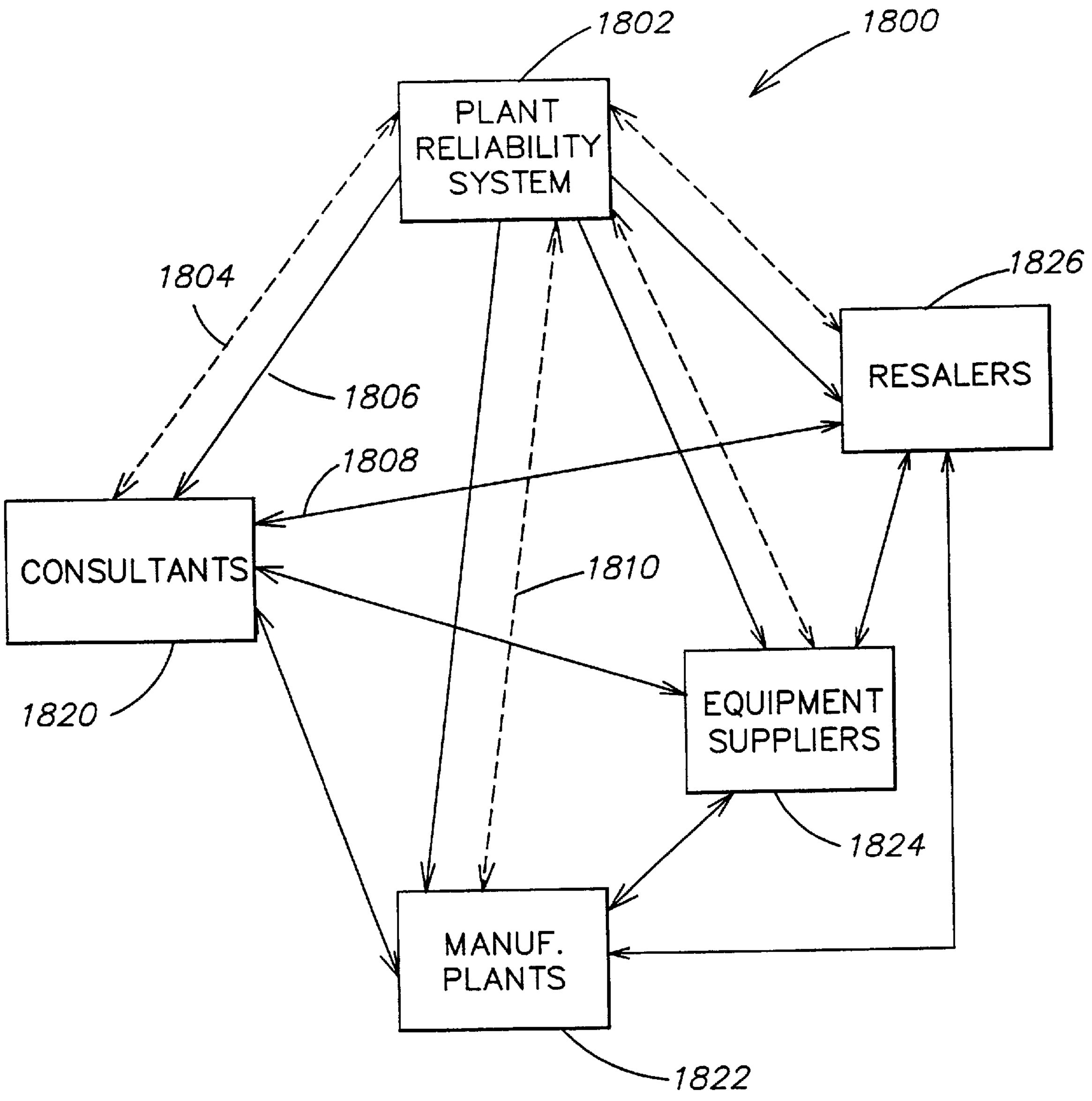
FIG. 18 is a block diagram of one embodiment of a deployment scheme of the failure analysis system.

FIG. 18 illustrates one embodiment of a potential deployment 1800 of the product reliability system. The plant reliability system 1802 forms the center of an operation with interconnections between the plant reliability system 1802 and various users and vendors. The plant reliability system could be used, for example, by consultants 1820. The consultants could either buy the plant reliability system 1802—a one way transaction, with one transaction cost 1806; or pay a fee and access the plant reliability system 1802 over a network 1804—a two way transaction with multiple transaction costs. In the case of accessing the plant reliability system 1802 over a network, the Internet, a LAN, dial-up line, or other remote access method could be used. The consultant may gather the necessary data, access the plant reliability system 1802, provide the necessary data and receive the results of the analysis.

In another embodiment, a user plant could either purchase the plant reliability system 1802, with the one way transaction cost 1808. In this case, the user plant would use the plant reliability system 1802 to analyze its failures and then could use the plant reliability system 1802 to generate RFQ documents electronically to a supplier (not shown). The supplier, for example, could utilize an automated equipment selection system which could generate a price quote and the entire transaction could be completed electronically. Alternatively, the user plant could access the plant reliability system 1802 remotely, and potentially pay for each transaction. The plant reliability system 1802 could be owned by an equipment supplier. The user plant would supply failure data, and the results of the plant reliability system 1802 could include a proposal indicating which of the seal or pump equipment supplier's particular products could fulfill the specifications, thus completing the transaction electronically. In a further development, manufacturing data for the products could be generated and provided to the equipment supplier for a fast and efficient manufacturing cycle.

In another embodiment, a user plant may retain a consultant who interacts with the equipment supplier on behalf of the manufacturing plant, and who utilizes the plant reliability system 1802 either locally or remotely in conduction with an equipment supplier.

The diverse methods of generating profit using the plant reliability system 1802 can be seen in the web that is formed between consultants, user plants, equipment suppliers, and resalers. Each transaction could be a single transaction for a sale of the plant reliability system 1802. In addition, the transaction could be one of a multiple number of transactions where many different customers may access the plant reliability system 1802. In this case, for example where the plant reliability system 1802 is operated by a seal or pump equipment supplier, the advantage would be that customers accessing the system would be more likely to purchase a piece of equipment from that supplier. In the case of a user plant. RFQ's may be generated for multiple suppliers for comparison.

Figure 19:
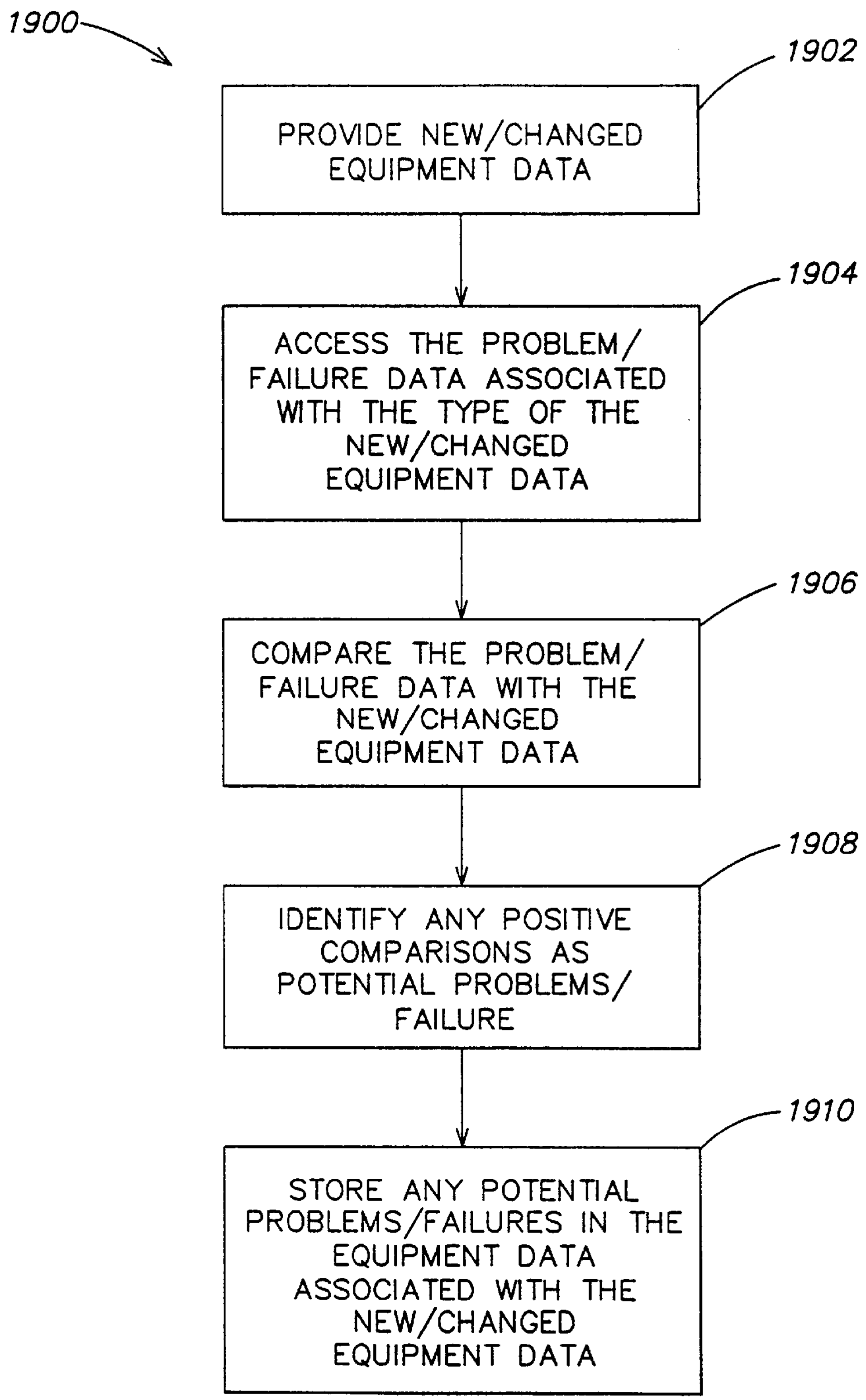
FIG. 19 together comprise a flowchart illustrating, according to one embodiment, a method of the input process performed by the failure analysis system shown in FIG. 1.

FIG. 19 illustrates one embodiment of a method for performing the input process 1900 functions of the failure analysis system. In particular, in step 1902 new/changed equipment data is provided. The data may be either data for new equipment that is being added to the system, or data that represents a modification to a piece of equipment already in use and entered by a user. In step 1904 the problem/failure database is accessed and problem/failure data is retrieved corresponding to the type of equipment. In one embodiment for example, if a new seal data was being entered, only problem/failure data relating to the particular type of seal would be retrieved. In step 1906 the new/changed equipment data is compared to the retrieved problem/failure data. In step 1908, a positive comparison is one in which the new/changed equipment data corresponds to a problem/failure data indicating that a potential problem exists. In step 1910 the data indicating that a potential problem exists is stored in the equipment database and is associated with new/changed equipment data. In this way, the equipment database is updated and a more accurate failure analysis is achieved.

Figure 20A:
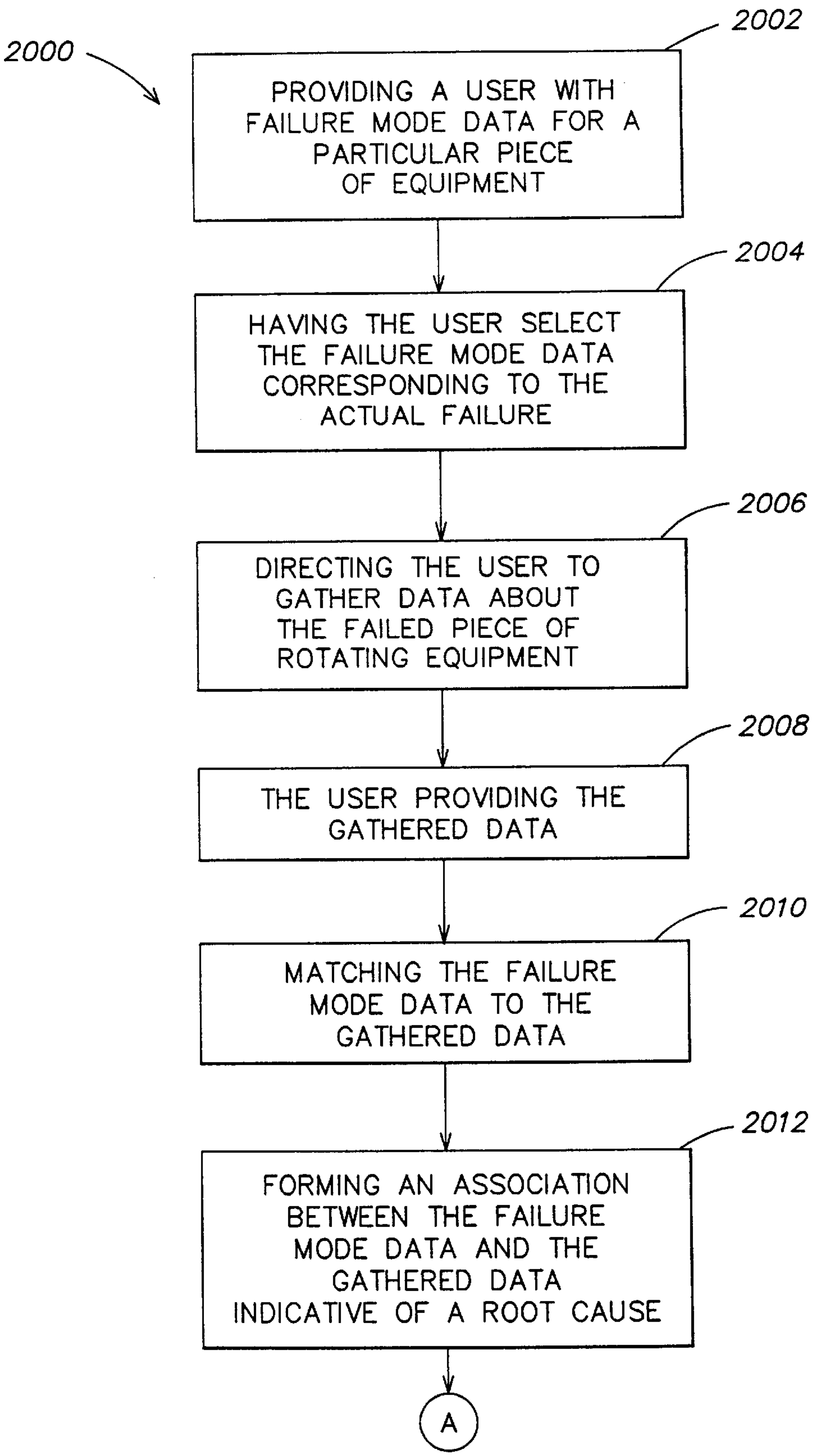
FIGS. 20*a*–20*b* together comprise a flowchart illustrating, according to one embodiment, a method of seal failure analysis performed by the failure analysis system shown in FIG. 1.
Figure 20B:
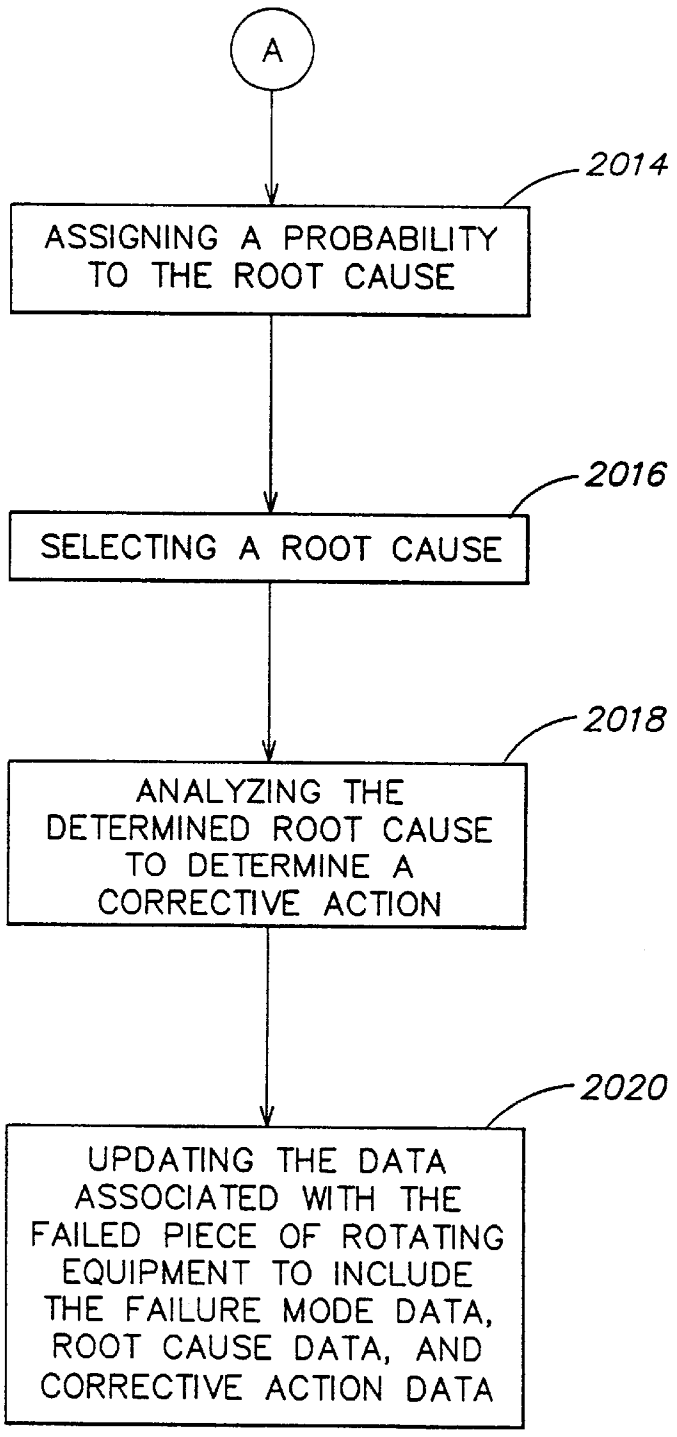

FIGS. 20*a*–20*b* illustrate a one embodiment of a method for practicing seal failure analysis 2000. In step 2002, the user is provided with failure mode data corresponding to a particular piece of equipment. The failure mode data could be visual images of failure modes of the corresponding rotating equipment. The user then selects the failure mode data corresponding to the actual failure of the rotating equipment. The user may select one or more visual images representing multiple failure modes of a piece of rotating equipment. In step 2006, the user is directed to gather data from about the failed piece of rotating equipment. This data could be observations of condition of the equipment, readings from telemetry instrumentation collecting data from the piece of rotating equipment. In step 2008, the user provides this data to the system. The user could enter the data from a keyboard or other input device such as a voice recognition system, or OCR system. In step 2010 the failure mode data and the user gathered data are matched together. In one embodiment, the data is entered into a form that automatically forms the matches between the failure mode data and the data gathered by the user or derived from other analysis modules. In step 2012 an association between these matches represent candidate root causes of the equipment failure. In step 2014 a probability weighting factor is assigned to the candidate root causes of the equipment failure. In one embodiment, the probability assigned to a candidate root cause may be determined empirically from historical failure data. In this embodiment these probabilities may be updated as new failure data is obtained. In another embodiment, the probability may be derived mathematically from known formulas and using standard techniques. In step 2016, a root cause from among the candidate root causes is selected. The selection process may involve the user evaluating the data and probabilistic weight attached to each of the candidate root causes and manually selecting a root cause. In another embodiment, the system itself may select the root cause based upon the analysis of the data. In step 2018 the selected root cause is analyzed to determine a proper corrective action to resolve the root cause problem. In step 2020, the data associated with the failed piece of rotating equipment is updated to include the selected failure mode, the selected root cause of the failure mode, and corrective action selected to resolve the root cause of the failure.

Figure 21:
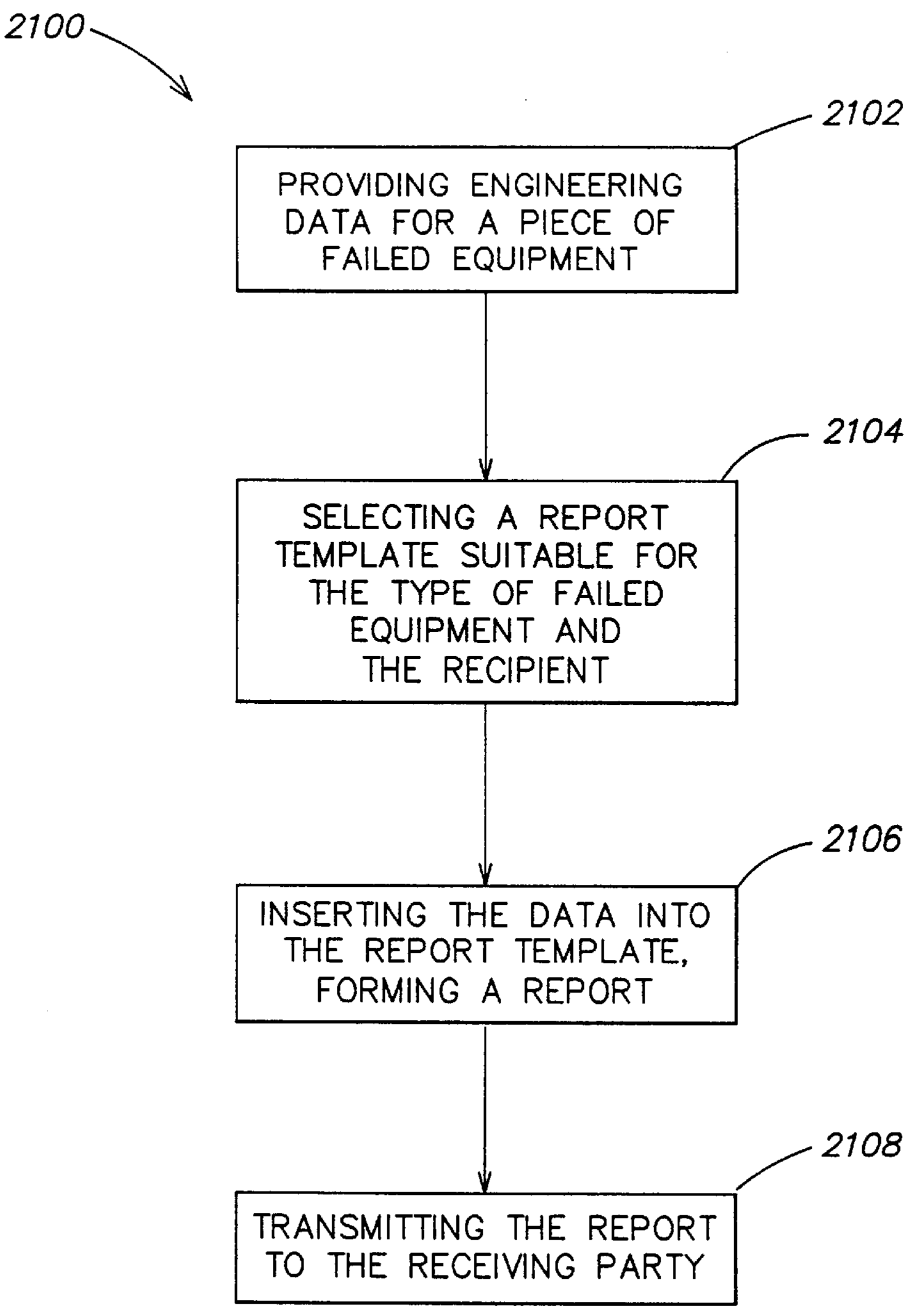
FIG. 21 is a flowchart illustrating, according to one embodiment, a method of the request for quote process performed by the failure analysis system shown in FIG. 1.

FIG. 21 illustrates one embodiment of a method for practicing a request for quote generation function of the failure analysis system. In step 2102, engineering data is provided the RFQ system for a piece of rotating equipment. The engineering data may be provided by the user, by another part of the failure analysis system, or an external source of data such as a equipment selection system. In step 2104 a template is selected based upon the type of equipment and the intended recipient. For example a manufacturer or supplier of one type of equipment may have different data requirements than a supplier of another type of equipment or a consultant. Thus, different templates may be required to ensure that the intended recipient receives their required data. In step 2106 the data is inserted into the template and a report is formed. In step 2108 the report is transmitted to the receiving party. The transmission may be, but is not limited to, electronically transmitting the report over a network such as the Internet or a LAN. In another embodiment, the report may mailed, faxed or otherwise physically delivered to the recipient.

Figure 22A:
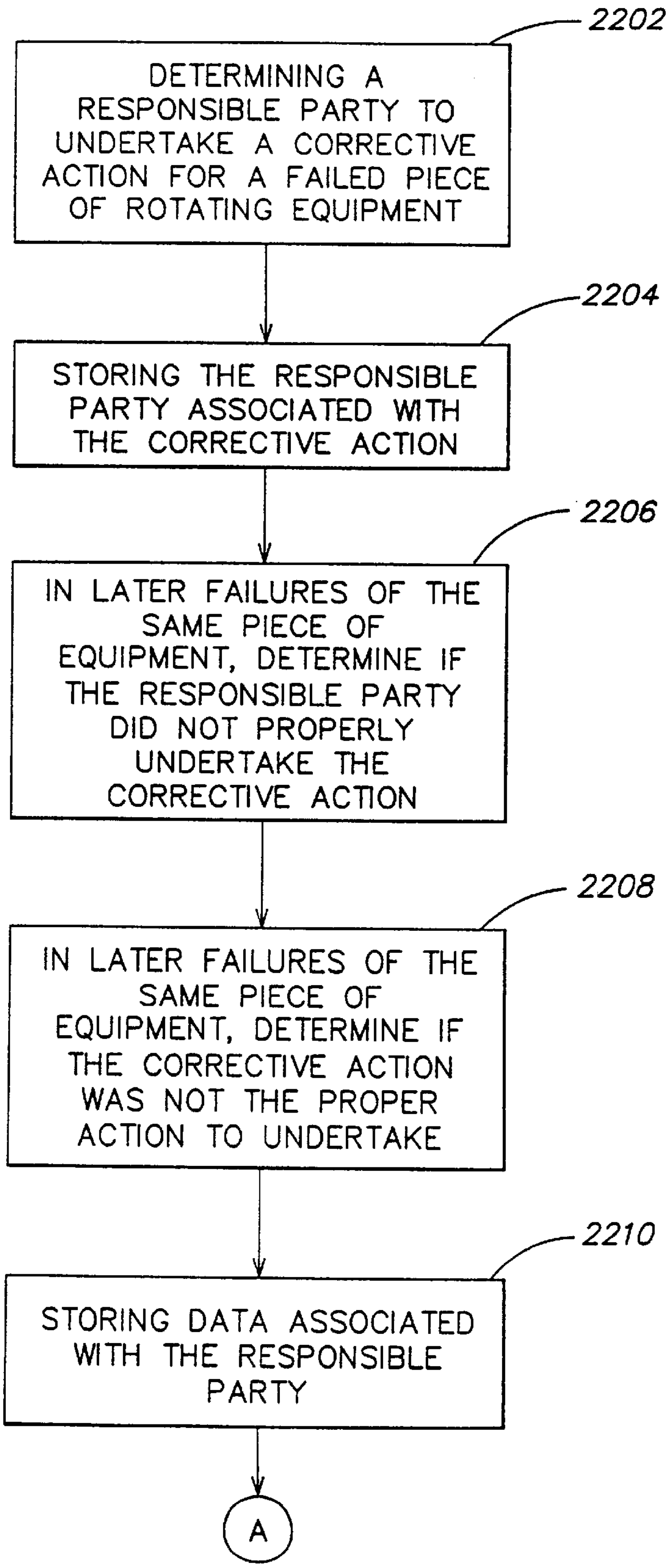
FIGS. 22*a*–22*b* comprise a flowchart illustrating, according to one embodiment, a method of the plant performance process performed by the failure analysis system shown in FIG. 1.
Figure 22B:
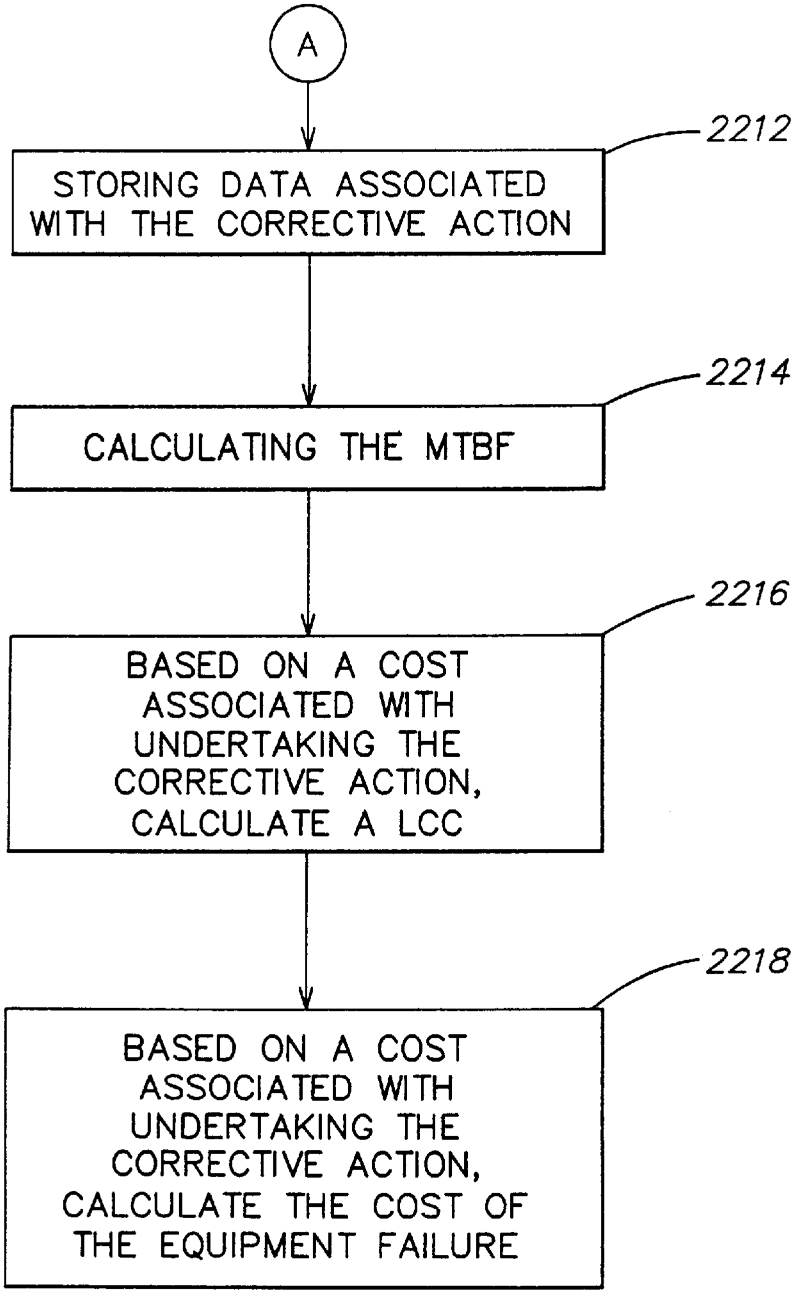

FIGS. 22*a* and 22*b* together form an illustration of one embodiment for practicing a plant reliability function of the system failure analysis system. In step 2202, the process begins with the identification of a responsible party for undertaking a corrective action for a failed piece of equipment. The responsible party may be a particular department or organization, or an individual assigned to the task. In step 2204, data indicative of the responsible party is then stored and is associated with the data indicative of the corrective action and data indicative of the failed piece of equipment. In step 2206 in later failures of the same equipment, a determination is made from the data analysis if the failed piece of equipment failed with the same failure mode as the previous failure. The responsible party may be determined to have contributed to the subsequent failure by the analysis of the failure data as detailed above. For example, as explained above, there may be direct evidence of the failure data, or as explained above, the absence of expected data may be used to infer the repeated failure of the responsible party in carrying out the corrective action. The repeated failure of the responsible party may indicate a weakness in the level of training of the responsible party, or a lack of ability on the part of the responsible party. In step 2208, later failures of the same piece equipment may indicate that the corrective action was not efficacious in correcting the root cause of the equipment failure. Because there may be multiple candidate root causes for each failure, the selected root cause may not be the correct one. If a piece of equipment fails repeatedly in the same manner, and the work has been performed to appropriate standards, then a different collective action may be indicated. In step 2210 the data associated with the responsible party is stored for each failure and is associated with the corrective action undertaken and the failed piece of equipment. In step 2212 the data associated with the corrective action undertaken is stored for each failure and is associated with the failed piece of equipment. In step 2214 a mean time between failure (MTBF) is calculated, in step 2216, using the cost associated with analyzing and resolving the failure of the piece of equipment, the life cycle costs (LCC) is calculated, and the cost of the particular failure is determined as well. It should be understood that these three reliability data are not the only reliability data that can be calculated. Many other forms of reliability data may be calculated and may be needed depending on the circumstances of the rotating equipment, the process fluids, the system design, operating condition, and other circumstances particular to individual industries.

This system may be developed using a number of computer programming tools, including general purpose programming languages and database programs. In one embodiment, the system of FIG. 1 is implemented using script files developed using a File Maker Pro software application running on a Windows95 operating system. The databases are implemented using database script files and the operations of the various modules also are implemented as scripts for accessing those data files. It should be understood that the present invention is not limited to a particular computer programming language or database programming system, or operating system. It also should be understood that the databases may be defined as a single data file, as a spreadsheet file, as a database script, or may be generated by more than one computer file.

Rotating equipment failure analysis software, including computer programs which implement aspects of the system, may be stored on some type of removable computer-readable storage media such as a CD-ROM, tape, or diskette. The software may be copied to a permanent form of storage media on the computer system (e.g. a hard disk) to preserve the removable storage media for back-up purposes. When the seal selection software is in use, the software is generally at least in part stored in RAM within memory, and is executed on the processor. When running the modeling software on the computer system, a user typically gives commands and enters data via the input device.

Having now described an embodiment of the invention, it should be apparent to those skilled in the art that the foregoing is merely illustrative and not limiting, having been presented by way of example only. Numerous modifications and other embodiments are within the scope of one of ordinary skill in the art. It should be understood that the foregoing is merely an example of a system for analyzing failures occurring in rotating equipment. The present invention also may be used to provide for the analysis of the failures of bearings, o-rings, couplings, pump parts, labyrinth seals and lip seals. It also should be understood that, although the invention has been described in the context of a predetermined set of possible failure modes, that the system may be expanded to include failure modes for auxiliary products that may be developed. Accordingly, the present invention is not limited to any particular set of seals, pumps, equipment, or other parts related to such systems. These and other modifications are contemplated as falling within the scope of the invention.

What is claimed is:

1. A method for analyzing a failure in a piece of equipment, the method comprising the steps of:

providing to a user, for comparison with symptoms of said failure, data representative of a plurality of possible failure modes corresponding with the piece of equipment, said data comprising visual images of physical features of equipment failures;

receiving from the user data based on observation of symptoms of said failure, including data identifying at least one of said possible failure modes based on said observation; and analyzing the received data to determine a cause of said failure.

2. The method as in claim 1, wherein the visual images are digitized photographs.

3. The method as in claim 1, wherein the visual images are schematic drawings.

4. The method as in claim 1, wherein the step of analyzing the received data includes determining a root cause of said failure and the method further comprises the step of: updating stored data characterizing the piece of equipment with data indicative of the root cause.

5. The method as in claim 1, wherein prior to the step of analyzing the received data the method further comprises the steps of:

directing the user to obtain data from the piece of equipment by visual observation thereof; and receiving from the user data obtained from the piece of equipment by said visual observation.

6. The method as in claim 5, wherein:

the step of directing the user to obtain data is one of (i) an independent step and (ii) included in the step of providing to a user; and the step of receiving from the user data obtained from the piece of equipment is one of (i) an independent step and (ii) included in the step of receiving from the user data representative of at least one failure mode.

7. The method as in claim 5, wherein the step of analyzing the received data comprises the steps of:

matching data representative of the failure mode with the user provided data obtained from the piece of equipment;

forming an association between the matched data and data indicative of the root cause of the failure; and selecting data indicative of a root cause of the failure corresponding to the association of the failure mode and the data obtained from the piece of equipment.

8. The method as in claim 5, wherein the step of directing the user to obtain the data from the piece of equipment includes obtaining the data during a period when the equipment is operating.

9. The method as in claim 5, wherein the step of directing the user to obtain the data from the piece of equipment includes obtaining the data during a period when the equipment is not operating.

10. The method as in claim 5, wherein the step of directing the user to obtain the data from the piece of equipment includes obtaining the data during a period when the equipment is not operating and prior to the disassembling of the piece of equipment.

11. The method as in claim 5, wherein the step of having the user obtain the data from the piece of equipment includes obtaining the data after the equipment is disassembled.

12. The method as in claim 7, wherein the method further comprises the step of:

utilizing the root cause data to determine corrective action.

13. The method as in claim 12, wherein the method further comprises the step of:

updating stored data characterizing the piece of equipment with data indicative of the root cause and corrective action.

14. The method as in claim 12, wherein the step of utilizing the root cause data comprises selecting a corrective action corresponding to the data indicative of the root cause.

15. The method as in claim 12, wherein the method further comprises the step of:

providing instructions to a user corresponding to the corrective action.

16. The method as in claim 15, wherein the step of providing instructions corresponding to the corrective action includes providing a user with a computer displayed engineering drawing of the corrective action.

17. The method as in claim 14, wherein the method further comprises the step of:

providing an approval of the corrective action by another user.

18. A method for analyzing a failure in a piece of equipment, the method comprising the steps of:

accessing a database comprising failure mode data accessible to provide data representative of possible failure modes of said piece of equipment;

providing to a user, for comparison with symptoms of said failure, data representative of a plurality of possible failure modes of said piece of equipment, said data comprising visual images of physical features of equipment failures receiving from the user data based on observation of symptoms of said failure, including data identifying at least one of said plurality of possible failure modes based on said observation;

accessing said database, with use of data received in the step of receiving from the user and matching data received from the user with failure mode data accessible in said database; and selecting data indicative of a root cause of said failure, to determine a cause of said failure.

19. A method as in claim 18, wherein the step of providing to a user comprises:

providing the user with visual images of failure modes.

20. The method as in claim 18, wherein prior to the step of accessing said database the method comprises:

directing the user to obtain data from the piece of equipment by visual observation thereof; and receiving from the user data obtained from the piece of equipment by said visual observation.

21. The method as in claim 18, wherein the method further comprises the step of:

utilizing the root cause data to determine corrective action.

22. An apparatus, for analyzing a failure in a piece of failed equipment, comprising:

a failure mode database (106) comprising data on equipment failure modes accessible to provide failure mode data representative of a plurality of possible failure modes of said failed equipment for comparison by a user to symptoms of said failure;

an equipment database (224) comprising data on characteristics of equipment, to provide at least one of access to stored data on said failed equipment prior to said failure and storage of data relating to said failure; and a system failure analyzer (900) coupled to the failure mode and equipment databases and responsive to (i) first data representative of a failure mode as selected by the user based on observation of the failed equipment in comparison to failure mode data provided to the user from the failure mode database, and (ii) second data received from the user based on observation of the failed equipment and identifying at least one symptom of said failure, the system failure analyzer arranged to process the first data and second data to provide output data representative of a cause of said failure.

23. Apparatus as in claim 22, wherein the database (106) comprises visual images representative of failure modes.

24. Apparatus as in claim 23, wherein the visual images are digitized photographs.

25. Apparatus as in claim 23, wherein the first and second data are based on observation of symptoms of the failure by a user able to directly observe the piece of equipment.

26. Apparatus as in claim 22, wherein the system failure analyzer is arranged to cross reference the first and second data for purposes of data validation.

27. Apparatus as in claim 22, further comprising a design deficiency module (503) coupled to the equipment database and the system failure analyzer and arranged to provide to the system failure analyzer data indicative of an incompatibility between the piece of equipment and the first or second data for use by the system failure analyzer in providing output comprising data indicative of the root cause.

28. Apparatus as in claim 22, further comprising:

an information analyzer (250) arranged to receive output data from the system failure analyzer and to provide output data comprising correction action data regarding correction of the failure.

29. Apparatus as in claim 28, wherein the equipment database (224) comprises data indicative of operating conditions of the piece of equipment and at least one of the system failure analyzer and the information analyzer is arranged to access such data indicative of operating conditions in the providing of output data.

30. An apparatus as in claim 28, wherein the information analyzer is arranged to provide output data comprising an action plan corresponding to the corrective action data.

31. An apparatus as in claim 30, wherein the information analyzer is arranged to provide output data comprising follow-up planning corresponding to the action plan.

32. An apparatus as in claim 28, wherein the information analyzer is arranged to provide output data comprising installation instructions compatible with the corrective action data.

33. An apparatus as in claim 28, wherein the information analyzer is arranged to provide output data comprising data related to the failure to be provided to a consultant.

34. An apparatus as in claim 28, wherein the information analyzer is arranged to provide output data to the equipment database to update data regarding characteristics of the piece of equipment based on the output data provided by the information analyzer.

35. An apparatus as in claim 28, wherein the information analyzer is arranged to provide output data comprising training information to execute corrective action.

36. Apparatus as in claim 28, further comprising:

a process fluid database comprising data indicative of a characteristic of a process fluid used with the piece of equipment; and a process fluid analyzer (512) coupled to the process fluid database and at least one of the system failure analyzer and the information analyzer, and arranged to provide output data comprising data indicative of a possible incompatibility of the piece of equipment and a process fluid.

37. Apparatus as in claim 28, further comprising:

a mechanical seal verifier (514) arranged to receive data indicative of a characteristic of the piece of equipment and data indicative of a characteristic of a mechanical seal used with that equipment, the mechanical seal verifier coupled to at least one of the system failure analyzer and the information analyzer, and arranged to provide output data indicative of a possible incompatibility of the piece of equipment and the mechanical seal.

38. Apparatus as in claim 37, wherein the mechanical seal verifier is coupled to the equipment database (224) and said database comprises data indicative of characteristics of at least one mechanical seal usable with the piece of equipment.

39. Apparatus as in claim 28, further comprising:

an input-output module (502) coupled to the equipment database and arranged to receive input data including new equipment data and provide data representative of input data to the equipment database for inclusion therein.

40. Apparatus as in claim 28, further comprising:

a plant performance database comprising data indicative of a characteristic of maintenance data of the piece of equipment; and a plant performance module (122) coupled to the plant performance database and at least one of the system failure analyzer and the information analyzer, and arranged to receive data indicative of a failure of the piece of equipment and provide output data comprising plant reliability data to the plant performance database for inclusion therein.

41. Apparatus as in claim 40, wherein the plant performance module is arranged to provide output data comprising life cycle cost data.

42. Apparatus as in claim 40, wherein the plant performance module is arranged to provide output data comprising mean time between failure data.

43. An apparatus, for analyzing a failure in a piece of failed equipment, comprising:

a failure mode database (106) comprising data on equipment failure modes accessible to provide failure mode data representative of a plurality of possible failure modes of said failed equipment for comparison by a user to symptoms of said failure; and a system failure analyzer (900) coupled to the failure mode database and responsive to (i) first data representative of at least one failure mode as selected by the user based on observation of the failed equipment in comparison to failure mode data provided to the user from the failure mode database, and (ii) second data received from the user based on observation of the failed equipment and relating to at least one symptom of said failure, the system failure analyzer arranged to process the first and second data to provide output data representative of a cause of said failure.

44. Apparatus as in claim 43, wherein the system failure analyzer is arranged to cross reference the first and second data for purposes of data validation.

45. Apparatus as in claim 43, further comprising a design deficiency module (503) coupled to the system failure analyzer and arranged to provide to the system failure analyzer data indicative of an incompatibility between the piece of equipment and the first or second data for use by the system failure analyzer in providing output comprising data indicative of the root cause.

46. Apparatus as in claim 43, further comprising:

a process fluid database comprising data indicative of a characteristic of a process fluid used with the piece of equipment; and a process fluid analyzer (512) coupled to the process fluid database and the system failure analyzer, and arranged to provide output data comprising data indicative of a possible incompatibility of the piece of equipment and a process fluid.

47. Apparatus as in claim 43, further comprising:

a mechanical seal verifier (514) arranged to receive data indicative of a characteristic of the piece of equipment and data indicative of a characteristic of a mechanical seal used with that equipment, the mechanical seal verifier coupled to the system failure analyzer and arranged to provide output data indicative of a possible incompatibility of the piece of equipment and the mechanical seal.

48. Apparatus as in claim 47, further comprising:

an equipment database (224) coupled to the mechanical seal verifier and comprising data indicative of characteristics of at least one mechanical seal usable with the piece of equipment.

49. Apparatus as in claim 48, further comprising:

an input-output module (502) coupled to the equipment database and arranged to receive input data including new equipment data and provide data representative of input data to the equipment database for inclusion therein.

50. Apparatus as in claim 43, further comprising:

a plant performance database comprising data indicative of a characteristic of maintenance data of the piece of equipment; and a plant performance module (122) coupled to the plant performance database and the system failure analyzer and arranged to receive data indicative of a failure of the piece of equipment and provide output data comprising plant reliability data to the plant performance database for inclusion therein.

51. Apparatus as in claim 50, wherein the plant performance module is arranged to provide output data comprising life cycle cost data.

52. Apparatus as in claim 50, wherein the plant performance module is arranged to provide output data comprising mean time between failure data.

53. A plant performance method, utilizing data corresponding to a piece of equipment, the method comprising the steps of:

storing equipment data indicative of at least one characteristic of a piece of equipment;

storing operating data representative of at least one of the installation, operation and maintenance of the piece of equipment;

storing action data representative of at least one of any failure, modification or corrective action on the piece of equipment;

accessing and analyzing at least a portion of the stored equipment, operating and action data for plant performance purposes comprising one or more of failure analysis, corrective action, reliability analysis, design analysis, and replacement proposal generation relating to the piece of equipment; and providing output data based on said analysis, storing data representative of a plurality of failure modes potentially affecting the piece of equipment, wherein the data representative of failure modes includes visual images of physical features of equipment failures.

54. A plant performance method as in claim 53, further comprising:

storing data indicative of a responsible party undertaking corrective action following a failure in the piece of equipment;

storing data indicative of subsequent failures of the piece of equipment;

storing maintenance data for the piece of equipment; and accessing and analyzing at least a portion of the stored data for plant performance purposes comprising tracking the reliability of the responsible party in undertaking corrective action.

55. A plant performance method as in claim 54, wherein the step of storing maintenance data includes storing at least one of mean time between failure data, life cycle cost data and downtime data relating to the piece of equipment.

56. A plant performance method as in claim 54, wherein the step of storing maintenance data includes storing at least one of mean time between failure data, life cycle cost data and downtime data relating to the piece of equipment.

57. A plant performance method as in claim 51, further comprising:

accessing at least a portion of the stored equipment, operating and action data to provide data comprising replacement part data indicative of at least one replacement part required for corrective action to resolve a failure of the piece of equipment.

58. A plant performance method as in claim 55, further comprising:

providing a template for replacement part data;

placing replacement part data into the template; and preparing a replacement part report for transmission.

59. A plant performance method as in claim 55, wherein the replacement part data comprises engineering data corresponding to at least one of the piece of equipment, a sub-assembly used therewith, and a component thereof.

60. A plant performance method as in claim 51, further comprising:

receiving a request for information regarding the piece of equipment;

accessing at least a portion of the stored equipment, operating and action data to retrieve information for the piece of equipment; and sending retrieved information in response to the request.

61. A plant performance method as in claim 51, further comprising:

storing data representative of at least one of specifications and computer numerically controlled machining instructions corresponding to at least one of the piece of equipment, a sub-assembly used therewith, and a component thereof, with at least said data indicative of a characteristic of the piece of equipment;

receiving information on a request for quote on an item comprising at least one of the piece of equipment, a sub-assembly used therewith, and a component therewith;

accessing at least a portion of the stored equipment, operating and action data to retrieve information for preparation of a quote on said item; and preparing a quote on said item using the retrieved information.

62. A plant performance method as in claim 55, wherein the request for quote is a request for at least one of a corrective action, a failure analysis, a specification, and machining instructions for said item.

63. A plant performance method as in claim 59, further comprising, before the step of receiving information, the step of:

providing a standard form template specifying information to be included in the request.

64. A plant performance method as in claim 51, further comprising:

receiving data indicative of a failure or problem affecting the piece of equipment;

accessing the stored data to retrieve information relevant to the failure or problem; and providing output data comprising information relevant to the failure or problem affecting the piece of equipment.

65. A plant performance method as in claim 62, wherein the step of providing output data comprises:

providing visual images of failure modes.

66. A plant performance method as in claim 63, wherein the visual images are digitized photographs.

* * * * *